US012199377B2

(12) United States Patent
Jin et al.

(10) Patent No.: US 12,199,377 B2
(45) Date of Patent: Jan. 14, 2025

(54) ELECTRICAL CONNECTOR AND METHOD OF MANUFACTURING THE SAME

(71) Applicant: LOTES CO., LTD, Keelung (TW)

(72) Inventors: Zuo Feng Jin, Keelung (TW); Chang Wei Huang, Keelung (TW); Chien Chih Ho, Keelung (TW)

(73) Assignee: LOTES CO., LTD, Keelung (TW)

( * ) Notice: Subject to any disclaimer, the term of this patent is extended or adjusted under 35 U.S.C. 154(b) by 333 days.

(21) Appl. No.: 17/900,958

(22) Filed: Sep. 1, 2022

(65) Prior Publication Data

US 2023/0070662 A1 Mar. 9, 2023

(30) Foreign Application Priority Data

Sep. 6, 2021 (CN) ......................... 202111037676.4
Sep. 27, 2021 (CN) ......................... 202111133455.7

(51) Int. Cl.

| | |
|---|---|
| ***H01R 13/40*** | (2006.01) |
| ***H01R 13/24*** | (2006.01) |
| ***H01R 13/514*** | (2006.01) |
| ***H01R 13/516*** | (2006.01) |
| ***H01R 13/631*** | (2006.01) |
| ***H01R 43/16*** | (2006.01) |

(52) U.S. Cl.
CPC ..... *H01R 13/6315* (2013.01); *H01R 13/2407* (2013.01); *H01R 13/514* (2013.01); *H01R 13/516* (2013.01); *H01R 43/16* (2013.01)

(58) Field of Classification Search
CPC ........................ H01R 13/2456; H01R 13/6315
See application file for complete search history.

(56) References Cited

U.S. PATENT DOCUMENTS 5,997,315 A * 12/1999 Akama .............. H01R 13/2442 439/862
6,227,869 B1 * 5/2001 Lin ...................... H05K 7/1069 439/515
10,116,080 B1 * 10/2018 Ju ........................ H01R 12/714
(Continued)

FOREIGN PATENT DOCUMENTS

CN 203760719 U 8/2014
CN 108847544 B 2/2020

*Primary Examiner* — Neil Abrams
(74) *Attorney, Agent, or Firm* — Locke Lord LLP; Tim Tingkang Xia, Esq.

(57) ABSTRACT

A method of manufacturing an electrical connector is provided. The method includes: providing a terminal and a strip, where the strip is connected to the terminal, and the terminal is formed with an elastic arm, a floating contact portion and a conducting portion; then, insert-molding an insulating block, such that the insulating block connects the elastic arm and the floating contact portion; separating the elastic arm and the floating contact portion; further cutting the strip to separate the terminal from the strip; and providing an insulating body, where the insulating body is formed with at least one accommodating slot running vertically therethrough, and inserting the terminal into the accommodating slot. When the electrical connector is mated, the elastic arm provides an elastic force such that the floating contact portion moves downward, and the floating contact portion and the conducting portion are directly electrically connected.

20 Claims, 64 Drawing Sheets

A

(56) References Cited

U.S. PATENT DOCUMENTS

| | | | | |
|---|---|---|---|---|
| 2006/0035484 | A1* | 2/2006 | Hsu | H01R 13/2435 439/66 |
| 2019/0288430 | A1* | 9/2019 | Ho | H01R 12/712 |
| 2023/0070662 | A1* | 3/2023 | Jin | H01R 43/007 |
| 2023/0075216 | A1* | 3/2023 | Jin | H01R 13/2435 |

* cited by examiner

A

A

A a'

A

A

A

A

A

ELECTRICAL CONNECTOR AND METHOD OF MANUFACTURING THE SAME

CROSS-REFERENCE TO RELATED PATENT APPLICATION

This non-provisional application claims priority to and the benefit of, pursuant to 35 U.S.C. § 119(a), patent application Serial No. CN202111037676.4 filed in China on Sep. 6, 2021, and patent application Serial No. CN202111133455.7 filed in China on Sep. 27, 2021. The disclosure of each of the above applications is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates to an electrical connector and a method of manufacturing the same, and particularly to an electrical connector having good high frequency characteristics and a method of manufacturing the same.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An existing electrical connector is used to electrically connect a chip module to a circuit board. The electrical connector has an insulating body, a plurality of accommodating slots running through the insulating body, and a plurality of terminals accommodated in the accommodating slots. Each terminal has an elastic arm, a contact portion and a conducting portion. The contact portion is located at one end of the elastic arm and is connected to the elastic arm. The electrical connector further has a conductor, and the conductor is located between the contact portion and the conducting portion. When the electrical connector is mated with the chip module and the circuit board, an upper end of the contact portion and the chip module are in contact with each other, a lower end of the conducting portion and the circuit board are in contact with each other, the contact portion is pressed to move downward to be in contact with an upper end of the conductor, and the conducting portion is pressed to move upward to be in contact with the conductor, such that signals of the chip module and the circuit board may be transmitted through the electrical connector.

However, since the contact portion is located at one end of the elastic arm and is connected to the elastic arm, when the electrical connector is mated with the chip module and the circuit board, the signals of the chip module and the signals of the circuit board will transmit to the elastic arm through the contact portion. Thus, the signals being transmitted to the elastic arm will diffuse to the surrounding, and the signals being diffused will cause signal interferences to the adjacent terminals, further affecting the high frequency characteristics of the electrical connector. Further, when the electrical connector is mated with the chip module and the circuit board, the upper end of the contact portion and the chip module are in contact with each other, the lower end of the conducting portion and the circuit board are in contact with each other, the contact portion is pressed to move downward to be in contact with an upper end of the conductor, and the conducting portion is pressed to move upward to be in contact with the conductor. Thus, the signals between the chip module and the circuit board must be transmitted to the conductor through the contact portion, and then transmitted to the conducting portion through the conductor. However, since the contact portion and the conducting portion are pressed to deviate, resulting in the contact portion not being stably in contact with the conductor, and the conducting portion not being stably in contact with the conductor. Thus, the electrical connector cannot stably transmit the signals between the chip module and the circuit board, further affecting the signal transmitting characteristics of the electrical connector.

Therefore, a heretofore unaddressed need to design an electrical connector and a method of manufacturing the same exists in the art to address the aforementioned deficiencies and inadequacies.

SUMMARY

The present invention is directed to an electrical connector and a method of manufacturing the same, in which an elastic arm and a floating contact portion are provided at an interval, and one end of the elastic arm is connected with the floating contact portion through an insulating block. When each terminal is mated with the first electronic component and the second electronic component, the conducting portion is electrically connected to the first electronic component, the floating contact portion is electrically connected to the second electronic component, the elastic arm provides an elastic force such that the floating contact portion moves downward, and the floating contact portion and the conducting portion are directly electrically connected, thus preventing signals of the first electronic component and signals of the second electronic component from being transmitted to the elastic arm, and improving the high frequency characteristics, such that the signals may be stably transmitted.

To achieve the foregoing objective, the present invention adopts the following technical solutions.

A method of manufacturing an electrical connector is provided. The electrical connector is configured to electrically connect a first electronic component to a second electronic component. The method includes: step 1: providing at least one terminal and a strip, wherein the strip is connected to the terminal, and the terminal is provided with an elastic arm, a floating contact portion and a conducting portion; step 2: after the step 1, insert-molding at least one insulating block, such that the insulating block connects the elastic arm and the floating contact portion; step 3: after the step 1, separating the elastic arm and the floating contact portion; step 4: after the step 2 and the step 3, further cutting the strip, such that the terminal is separated from the strip; and step 5: after the step 2 and the step 3, providing an insulating body, wherein the insulating body is formed with at least one accommodating slot running vertically through the insulating body, and inserting the terminal into the accommodating slot. When manufacturing of the electrical connector is complete and the electrical connector is mated with the first electronic component and the second electronic component, the conducting portion is conductively connected to the first electronic component, the floating contact portion is electrically connected to the second electronic component, the elastic arm provides an elastic force such that the floating contact portion downward, and the floating contact portion and the conducting portion are directly electrically connected.

In certain embodiments, in the step 1, the floating contact portion has two clamping portions; and when manufacturing of the electrical connector is complete and the electrical connector is mated with the first electronic component and the second electronic component, the conducting portion is located between the two clamping portions, and the conducting portion is respectively in contact with the two clamping portion.

In certain embodiments, in the step 5, a first gap is formed between one side of the floating contact portion away from the elastic arm and an inner wall of the accommodating slot, and a second gap is formed between one side of the conducting portion away from the elastic arm and the inner wall of the accommodating slot; and when manufacturing of the electrical connector is complete and the electrical connector is mated with the first electronic component and the second electronic component, the floating contact portion deflects along a clockwise direction and enters the first gap, and the conducting portion deflects along a counterclockwise direction and enters the second gap.

In certain embodiments, in the step 1, one side of the floating contact portion away from the elastic arm is cut to form a first contact surface, the conducting portion is cut to form a second contact surface corresponding to the first contact surface; in the step 2, along the vertical direction, a lower end of the floating contact portion does not pass downward beyond the insulating block, and the first contact surface is located between the insulating block and the second contact surface; and when manufacturing of the electrical connector is complete and the electrical connector is mated with the first electronic component and the second electronic component, the first contact surface is in contact with the second contact surface.

In certain embodiments, in the step 1, the strip comprises a base strip, an extending section and a connecting section, the terminal has a fixing portion, the fixing portion is connected to the elastic arm, the base strip is connected to the fixing portion, the extending section is connected to the floating contact portion, the connecting section is connected to the conducting portion, and any two of the elastic arm, the floating contact portion and the conducting portion are separate from each other; and in the step 4, the base strip, the extending section and the connecting section are cut.

In certain embodiments, in the step 1, the terminal is cut to form a deformation arm; in the step 2, a plastic block is insert-molded, such that the plastic block connects the deformation arm and the conducting portion; in the step 3, the conducting portion and the deformation arm are separate from each other; and when manufacturing of the electrical connector is complete and the electrical connector is mated with the first electronic component and the second electronic component, the deformation arm provides an elastic force such that the conducting portion moves upward.

In certain embodiments, in the step 1, the strip comprises an extending section, a connecting section, a first sub strip and a second sub strip, the extending section is connected to the floating contact portion, the connecting section is connected to the conducting portion, the elastic arm is connected to the floating contact portion through the first sub strip, and the deformation arm is connected to the conducting portion through the second sub strip; in the step 3, the first sub strip is cut such that the elastic arm and the floating contact portion are separate from each other, and the second sub strip is cut such that the deformation arm and the conducting portion are separate from each other; and in the step 4, the extending section and the connecting section are cut.

In certain embodiments, in the step 1, the strip comprises a base strip, a first sub strip and a second sub strip, the terminal has a fixing portion, the fixing portion is connected to the elastic arm, the base strip is connected to the fixing portion, the elastic arm is connected to the floating contact portion through the first sub strip, and the deformation arm is connected to the conducting portion through the second sub strip; in the step 3, the first sub strip is cut such that the elastic arm and the floating contact portion are separate from each other, and the second sub strip is cut such that the deformation arm and the conducting portion are separate from each other; and in the step 4, the base strip is cut.

In certain embodiments, the terminal is provided with a fixing portion and the floating contact portion and the conducting portion integrally connected, the fixing portion is located at one end of the elastic arm away from the floating contact portion and is connected to the elastic arm, the terminal is further provided with a first connecting portion and a second connecting portion, the second connecting portion is located below the first connecting portion and is connected to a lower end of the first connecting portion, an upper end of the first connecting portion is connected to a lower end of the floating contact portion, a lower end of the second connecting portion is connected to the conducting portion, and the first connecting portion and the second connecting portion are provided to form an angle therebetween; and when manufacturing of the electrical connector is complete and the electrical connector is mated with the first electronic component and the second electronic component, the first connecting portion and the second connecting portion forming the angle therebetween provide elastic forces, such that the floating contact portion moves downward and the conducting portion moves upward.

In certain embodiments, in the step 1, the strip comprises at least one base strip, a first main strip and a second main strip, one end of the base strip is connected to the fixing portion, the first main strip is connected to the first connecting portion, and the second main strip is connected to the second connected portion; and in the step 4, the base strip, the first main strip and the second main strip are cut.

In certain embodiments, in the step 1, the terminal is provided with a deformation arm, a first bridging portion and a second bridging portion, the floating contact portion is located between the elastic arm and the deformation arm, an upper end of the elastic arm is connected to the floating contact portion through the first bridging portion, and an upper end of the deformation arm is connected to the floating contact portion through the second bridging portion.

In certain embodiments, in the step 2, the insulating block is insert-molded, such that the upper end of elastic arm and the upper end of the deformation arm are embedded in the insulating block, the insulating block is provided with a first hollow hole running through the insulating block, and the first bridging portion and the second bridging portion are exposed in the first hollow hole; and in the step 3, the first bridging portion and the second bridging portion are cut, such that the elastic arm and the floating contact portion are separate from each other, and the deformation arm and the floating contact portion are separate from each other.

In certain embodiments, in the step 1, the terminal is cut to form the deformation arm, a third bridging portion and a fourth bridging portion, the conducting portion is located between the elastic arm and the deformation arm, a lower end of the elastic arm is connected to the conducting portion through the third bridging portion, and a lower end of the deformation arm is connected to the conducting portion through the fourth bridging portion.

In certain embodiments, in the step 2, the insulating block and a plastic block are insert-molded, such that the insulating block is provided with a first hollow hole running through the insulating block, one end of the plastic block is connected to the lower end of the elastic arm, the conducting portion is partially embedded in the plastic block, another end of the plastic block is connected to the lower end of the deformation arm, the plastic block is provided with a second hollow hole running through the plastic block, and the third bridging portion and the fourth bridging portion are exposed in the second hollow hole; and in the step 3, the third bridging portion and the fourth bridging portion are cut, such that the elastic arm and the conducting portion are separate from each other, and the deformation arm and the conducting portion are separate from each other.

In certain embodiments, in the step 1, the strip comprises an extending portion, and the extending portion is connected to the elastic arm; and in the step 4, the extending portion is cut.

In certain embodiments, in the step 1, the terminal is cut to form a deformation arm, the floating contact portion is located above the conducting portion, the floating contact portion is located between the elastic arm and the deformation arm, the floating contact portion and the elastic arm are separate from each other, the floating contact portion and the deformation arm are separate from each other, the conducting portion is located between the elastic arm and the deformation arm, the conducting portion and the elastic arm are separate from each other, and the conducting portion and the deformation arm are separate from each other.

In certain embodiments, in the step 1, the strip comprises a first upper strip and a second upper strip, the first upper strip is located above the elastic arm, the first upper strip has an upper vertical strip and an upper horizontal strip connected to the upper vertical strip, the upper vertical strip is connected to the elastic arm, the upper horizontal strip is connected to the floating contact portion, and the second upper strip is located above the deformation arm and is connected to the deformation arm; and in the step 4, the first upper strip and the second upper strip are cut.

In certain embodiments, in the step 1, the strip comprises a first lower strip and a second lower strip, the first lower strip is located below the elastic arm and is connected to the elastic arm, the second lower strip is located below the deformation arm, the second lower strip has a lower vertical strip and a lower horizontal strip connected to the lower vertical strip, the lower vertical strip is connected to the deformation arm, and the lower horizontal strip is connected to the conducting portion; and in the step 4, the first lower strip and the second lower strip are cut.

In certain embodiments, in the step 2, the insulating block is insert-molded, such that an upper end of the deformation arm is embedded in the insulating block; and a plastic block is insert-molded simultaneously, such that one end of the plastic block is connected to the elastic arm, the conducting portion is partially embedded in the plastic block, and another end of the plastic block is connected to the deformation arm.

In certain embodiments, in the step 1, the terminal is provided with a fixing portion and an abutting arm, one end of the abutting arm adjacent to the fixing portion is connected to the fixing portion; and when manufacturing of the electrical connector is complete and the electrical connector is mated with the first electronic component and the second electronic component, the fixing portion is upward exposed to the accommodating slot to be electrically connected to the first electronic component, and the abutting arm is downward exposed to the accommodating slot to be electrically connected to the second electronic component.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

Figure 1:
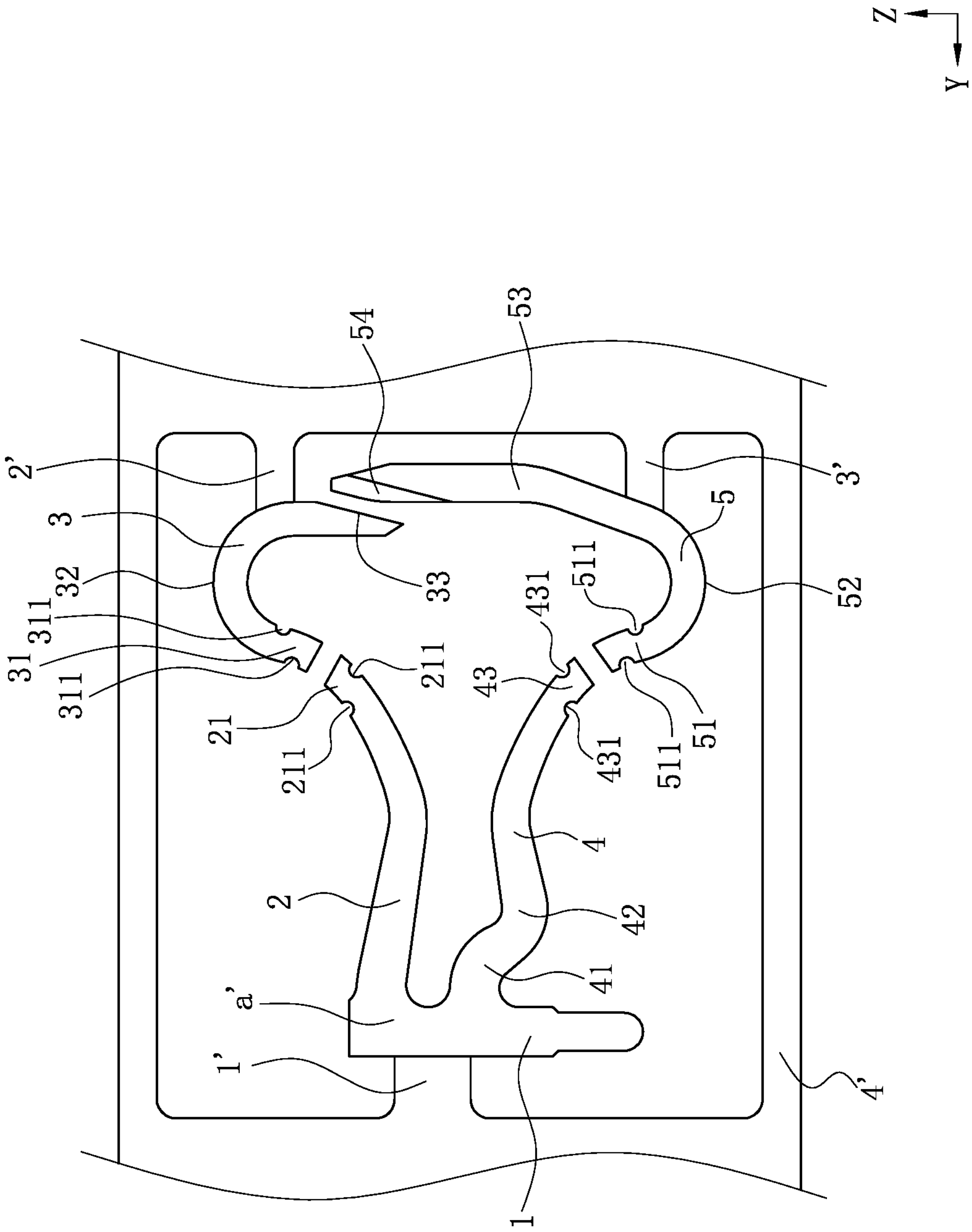
FIG. 1 is a schematic view of cutting and forming the terminal and the strip of an electrical connector and a method of manufacturing the same according to a first embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of “a”, “an”, and “the” includes plural reference unless the context clearly dictates otherwise. Also, as used in the description herein and throughout the claims that follow, the meaning of “in” includes “in” and “on” unless the context clearly dictates otherwise. Moreover, titles or subtitles may be used in the specification for the convenience of a reader, which shall have no influence on the scope of the present invention.

It will be understood that when an element is referred to as being “on” another element, it can be directly on the other element or intervening elements may be present therebetween. In contrast, when an element is referred to as being “directly on” another element, there are no intervening elements present. As used herein, the term “and/or” includes any and all combinations of one or more of the associated listed items.

Furthermore, relative terms, such as “lower” or “bottom” and “upper” or “top,” may be used herein to describe one element’s relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising", "including", "carrying", "having", "containing", "involving", and the like are to be understood to be open-ended, i.e., to mean including but not limited to.

The description will be made as to the embodiments of the present invention in conjunction with the accompanying drawings in FIGS. 1-64. In accordance with the purposes of this invention, as embodied and broadly described herein, this invention, in one aspect, relates to an electrical connector and a method of manufacturing the same.

Figure 64:
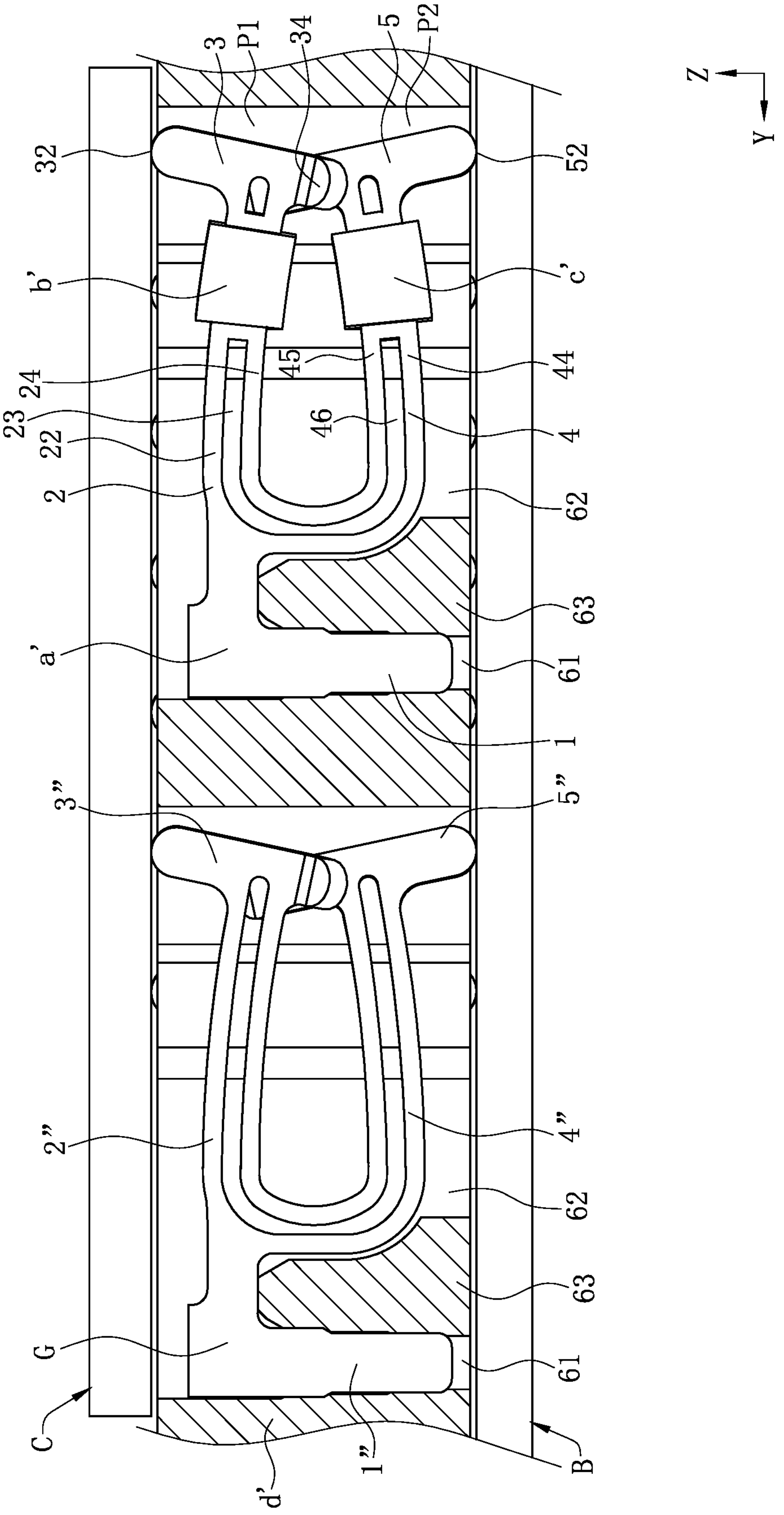
FIG. 64 is a sectional view of the electrical connector and the method of manufacturing the same when the electrical connector is mated with the first electronic component and the second electronic component according to the seventeenth embodiment of the present invention.

As shown in FIG. 1 to FIG. 64, the electrical connector A and the method of manufacturing the electrical connector A according to certain embodiments of the present invention defines a front-rear direction and a left-right direction and an up-down direction (a vertical direction) perpendicularly to the front-rear direction. For convenience of understanding of the accompanying drawings, the forward direction in the front-rear direction is a positive direction of the X-axis, the leftward direction in the left-right direction is a positive direction of the Y-axis, and the upward direction in the vertical direction is a positive direction of the Z-axis.

FIG. 1 to FIG. 5 show an electrical connector A and a method of manufacturing the electrical connector A according to a first embodiment of the present invention.

As shown in FIG. 1 to FIG. 5, in this embodiment, the electrical connector A is electrically connected downward to a first electronic component B (in this embodiment, the first electronic component B is a circuit board), and is electrically connected upward to a second electronic component C (in this embodiment, the second electronic component C is a chip module).

As shown in FIG. 1, in step I (corresponding to the step 1 and the step 3 of claim 1): firstly, forming a plurality of terminals a' and a strip (not numbered, same below) by punching and cutting. Each terminal a' has a fixing portion 1, an elastic arm 2, a floating contact portion 3, a deformation arm 4 and a conducting portion 5. Along the left-right direction, the elastic arm 2 is located between the fixing portion 1 and the floating contact portion 3. One end of the elastic arm 2 adjacent to the fixing portion 1 is connected to the fixing portion 1, and the elastic arm 2 and the floating contact portion 3 are separate from each other. The deformation arm 4 is located below the elastic arm 2, and along the left-right direction, the deformation arm 4 is located between the fixing portion 1 and the conducting portion 5. One end of the deformation arm 4 adjacent to the fixing portion 1 is connected to the fixing portion 1, and the deformation arm 4 and the conducting portion 5 are separate from each other. The conducting portion 5 is located below the floating contact portion 3, and the conducting portion 5 and the floating contact portion 3 are separate from each other.

As shown in FIG. 1, one end of the elastic arm 2 adjacent to the floating contact portion 3 is provided with a first embedded portion 21. The first embedded portion 21 is formed with two first through slots 211 running through the first embedded portion 21 (and in other embodiments, there may be one first through slot 211 or three first through slots 211).

As shown in FIG. 1, one end of the floating contact portion 3 adjacent to the first embedded portion 21 if provided with a second embedded portion 31. The second embedded portion 31 is provided with two second through slots 311 running through the second embedded portion 31 (and in other embodiments, there may be one second through slot 311 or three second through slots 311). The second embedded portion 31 bends upward and extends to form an upper contact portion 32, and the upper contact portion 32 is used to be in contact with the second electronic component C. The floating contact portion 3 is further provided with a first contact surface 33. The first contact surface 33 is located at one side of the floating contact portion 3 away from the elastic arm 2, and the first contact surface 33 is formed by extending obliquely upward from the lower end of the floating contact portion 3 and toward one side away from the elastic arm 2.

As shown in FIG. 1, the deformation arm 4 is provided with a first bending section 41. The first bending section 41 is formed by bending downward from one end of the deformation arm 4 adjacent to the fixing portion 1. The deformation arm 4 is further provided with a second bending section 42. The second bending section 42 is located at one side of the first bending section 41 away from the fixing portion 1, and the second bending section 42 is formed by bending upward and extending from the first bending section 41. The deformation arm 4 is further provided with the third embedded portion 43. The third embedded portion 43 is located at one side of the second bending section 42 away from the fixing portion 1, and the third embedded portion 43 is provided with two third through slots 431 (and in other embodiments, there may be one third through slot 431 or three through slots 431).

As shown in FIG. 1, one end of the conducting portion 5 adjacent to the third embedded portion 43 is further provided with a fourth embedded portion 51. The fourth embedded portion 51 is provided with two fourth through slots 511 running through the fourth embedded portion 51 (and in other embodiments, there may be one fourth through slot 511 or three fourth through slots 511). A lower contact portion 52 is formed by bending downward and extending from the fourth embedded portion 51 toward one side away from the fixing portion 1. The lower contact portion 52 is used to be in contact with the first electronic component B. A conduction portion 53 is formed by bending upward and extending from one end of the lower contact portion 52 away from the fixing portion 1. One side of an upper end of the conduction portion 53 adjacent to the floating contact portion 3 is provided with a second contact surface 54. The second contact surface 54 corresponds to the first contact surface 33, and the second contact surface 54 is formed by extending obliquely downward from a top end of the conduction portion 53 and toward one side adjacent to the floating contact portion 3.

As shown in FIG. 1, the strip formed by punching and cutting include a base strip 1', an extending section 2', and a connecting section 3'. The base strip 1', the extending section 2' and the connecting section 3' may be connected to one another through an outer frame 4' (and in other embodiments, it is possible that the base strip 1' and the extending section 2' are connected to each other through the outer frame 4', and the connecting section 3' is connected to another frame).

As shown in FIG. 1, the base strip 1' is located at one side of the fixing portion 1 away from the elastic arm 2. That is, the base strip 1' is located at a left side of the fixing portion 1 (and in other embodiments, the base strip 1' may be located at other locations of the fixing portion 1, such as above or below the fixing portion 1). One end of the base strip 1' adjacent to the fixing portion 1 is connected to the fixing portion 1, and the other end thereof is connected to the outer frame 4'.

As shown in FIG. 1, the extending section 2' is located at one side of the floating contact portion 3 away from the elastic arm 2. That is, the extending section 2' is located at a right side of the floating contact portion 3 (and in other embodiments, the extending section 2' may be located at other locations of the floating contact portion 3, such as above or below the floating contact portion 3). One end of the extending section 2' adjacent to the floating contact portion 3 is connected to the floating contact portion 3, and the other end thereof is connected to the outer frame 4'.

As shown in FIG. 1, the connecting section 3' is located below the extending section 3, and the connecting section 3' is located at one side of the conducting portion 5 away from the elastic arm 2. That is, the connecting section 3' is located at a right side of the conducting portion 5 (and in other embodiments, the connecting section 3' may be located at other locations of the conducting portion 5, such as above or below the conducting portion 5). One end of the connecting section 3' adjacent to the conducting portion 5 is connected to the conducting portion 5, and the other end thereof is connected to the outer frame 4'.

Figure 2:
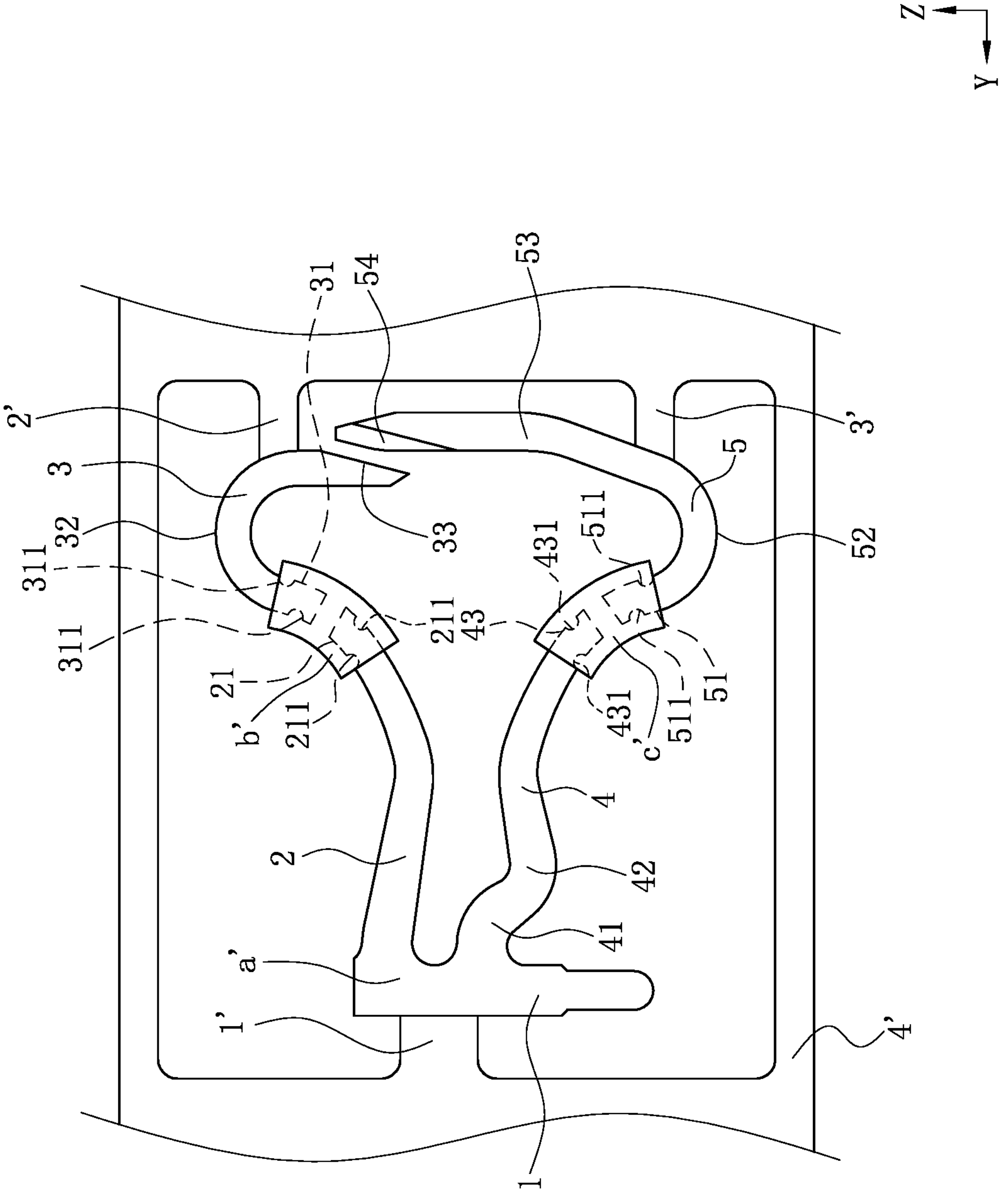
FIG. 2 is a schematic view of insert-molding the insulating block and the plastic block of the electrical connector and the method of manufacturing the same according to the first embodiment of the present invention.

As shown in FIG. 2, in step II (corresponding to the step 2 of claim 1): then, insert-molding an insulating block b', such that the insulating block b' connects the elastic arm 2 and the floating contact portion 3. Specifically, the insulating block b' is insert-molded between the elastic arm 2 and the floating contact portion 3, such that one end of the insulating block b' is connected to the elastic arm 2, the other end thereof is connected to the floating contact portion 3, and the insulating block b' covers outside the first embedded portion 21 and the second embedded portion 31. Portions of the insulating material of the insulating block b' pass through the two first through slots 211 and the two second through slots 311, such that there is a strong bonding force between the insulating block b' and the elastic arm 2, and there is a strong bonding force between the insulating block b' and the floating contact portion 3. Further, along the vertical direction, the floating contact portion 3 does not pass downward beyond the insulating block b', thus preventing the floating contact portion 3 from being in contact with the elastic arm 2 after being pressed. Along the left-right direction, the first contact surface 33 is located between the insulating block b' and the second contact surface 54, thus preventing the second contact surface 54 from being in contact with the elastic arm 2 after being pressed.

As shown in FIG. 2, in the step II: simultaneously when insert-molding the insulating block b', insert-molding a plastic block c', such that the plastic block c' connects the deformation arm 4 and the conducting portion 5. Specifically, the plastic block c' is insert-molded between the deformation arm 4 and the conducting portion 5, such that one end of the plastic block c' is connected to the deformation arm 4, the other end thereof is connected to the conducting portion 5, and the plastic block c' covers outside the third embedded portion 43 and the fourth embedded portion 51. Portions of the plastic material of the plastic block c' pass through the two third through slots 431 and the two fourth through slots 511, such that there is a strong bonding force between the plastic block c' and the deformation arm 4, and there is a strong bonding force between the plastic block c' and the conducting portion 5.

Figure 3:
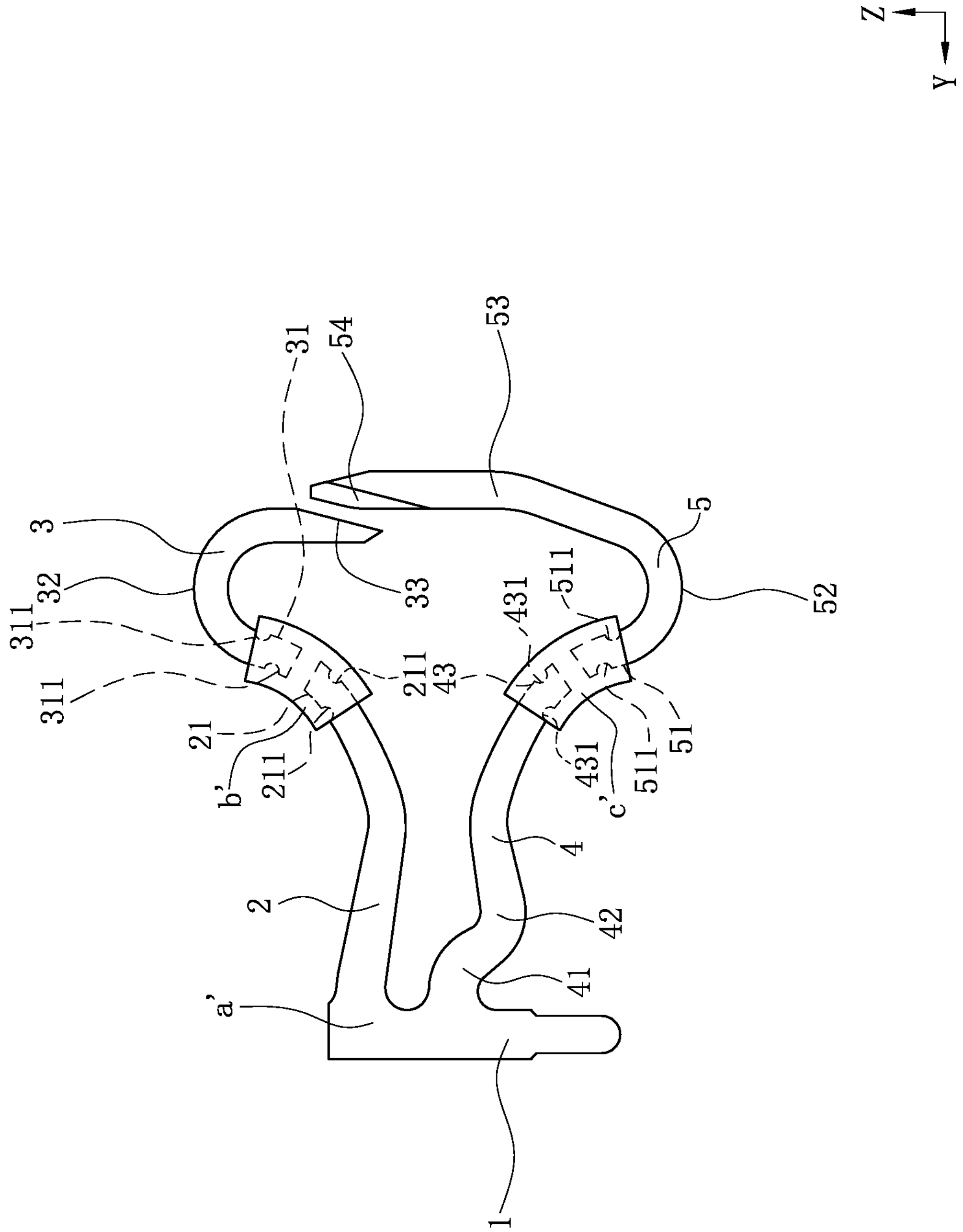
FIG. 3 is a schematic view of the terminal of the electrical connector and the method of manufacturing the same according to certain embodiments of the present invention.

As shown in FIG. 3, in step III (corresponding to the step 4 of claim 1), after this, further cutting the base strip 1', such that the base strip 1' and the fixing portion 1 are separate; cutting the extending section 2', such that the extending section 2' and the floating contact portion 3 are separate; and cutting the connecting section 3', such that the connecting section 3' and the conducting portion 5 are separate.

Figure 4:
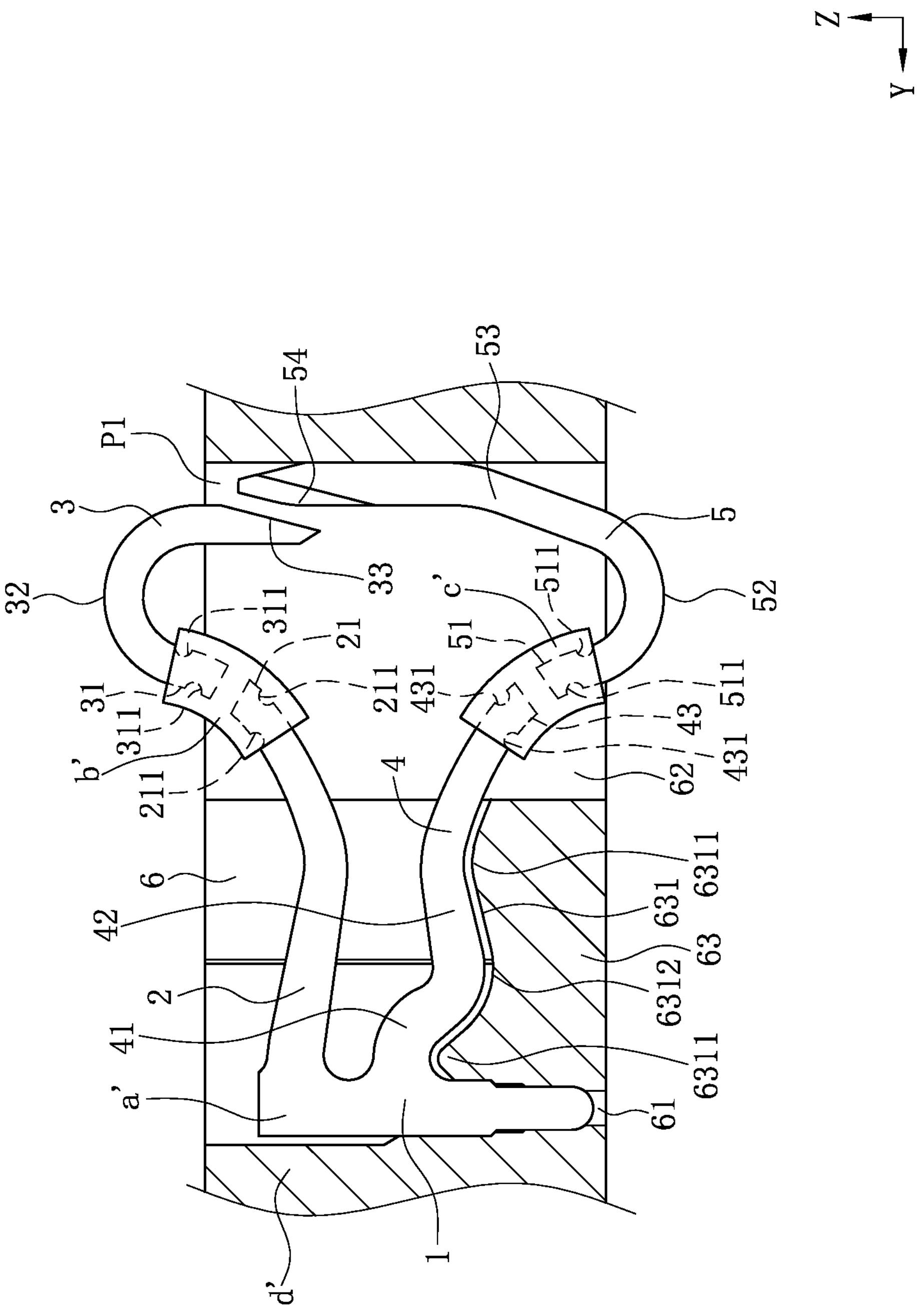
FIG. 4 is a sectional view of the terminal being installed in the accommodating slot of the electrical connector and the method of manufacturing the same according to certain embodiments of the present invention.

As shown in FIG. 4, in step IV (corresponding to the step 5 of claim 1), then, further providing an insulating body d', where the insulating body d' is provided with a plurality of accommodating slots 6 running vertically through the insulating body d', and inserting the terminals a' into the accommodating slots 6 (and in other embodiments, it is possible to firstly insert the terminals a' with the base strip 1', the extending section 2' and the connecting section 3' being connected into the accommodating slots 6, and then cutting base strip 1', the extending section 2' and the connecting section 3').

As shown in FIG. 4, each accommodating slot 6 has a fixing cavity 61 and a receiving cavity 62 in communication with each other. A positioning post 63 is located between the fixing cavity 61 and the receiving cavity 62. An upper surface of the positioning post 63 is lower than an upper surface of the insulating body d', and a lower surface of the positioning post 63 is flush with a lower surface of the insulating body d'. The fixing cavity 61 runs vertically through the insulating body d'. The fixing portion 1 is inserted into the fixing cavity 61, and the fixing portion 1 interferes with the inner wall of the fixing cavity 61 and the positioning post 63, such that the terminal a' is stably fixed in the accommodating slot 6.

As shown in FIG. 4, the elastic arm 2, the floating contact portion 3, the deformation arm 4 and the conducting portion 5 are all accommodated in the receiving cavity 62. A first gap P1 exists between one side of the floating contact portion 3 away from the elastic arm 2 and the receiving cavity 62, and an upper end of the conduction portion 53 protrudes into the first gap P1. One side of the conduction portion 53 away from the deformation arm 4 abuts an inner wall surface of the receiving cavity 62, and the second contact surface 54 protrudes into the first gap P1. The insulating block b' and the plastic block c' are also accommodated in the receiving cavity 62, and a gap exists between the insulating block b' and an inner wall surface of the receiving cavity 62, and a gap exists between the plastic block c' and the inner wall surface of the receiving cavity 62.

As shown in FIG. 4, the positioning post 63 is provided with a curved surface supporting portion 631 corresponding to the deformation arm 4. The curved surface supporting portion 631 is provided with two protrusion portions 6311 and a recess portion 6312 located between the two protrusion portions 6311. One end of the first bending section 41 adjacent to the fixing portion 1 is located above one of the two protrusion portions 6311 that is adjacent to the fixing portion 1, and one end of the first bending section 41 away from the fixing portion 1 protrudes into the recess portion 6312. One end of the second bending section 42 adjacent to the fixing portion 1 protrudes into the recess portion 6312, and one end of the second bending section 42 away from the fixing portion 1 is located above one of the two protrusion portions 6311 that is away from the fixing portion 1. Thus, the curved surface supporting portion 631 may support the deformation arm 4, and may limit the deformation arm 4 from deflecting excessively along the left-right direction.

Figure 5:
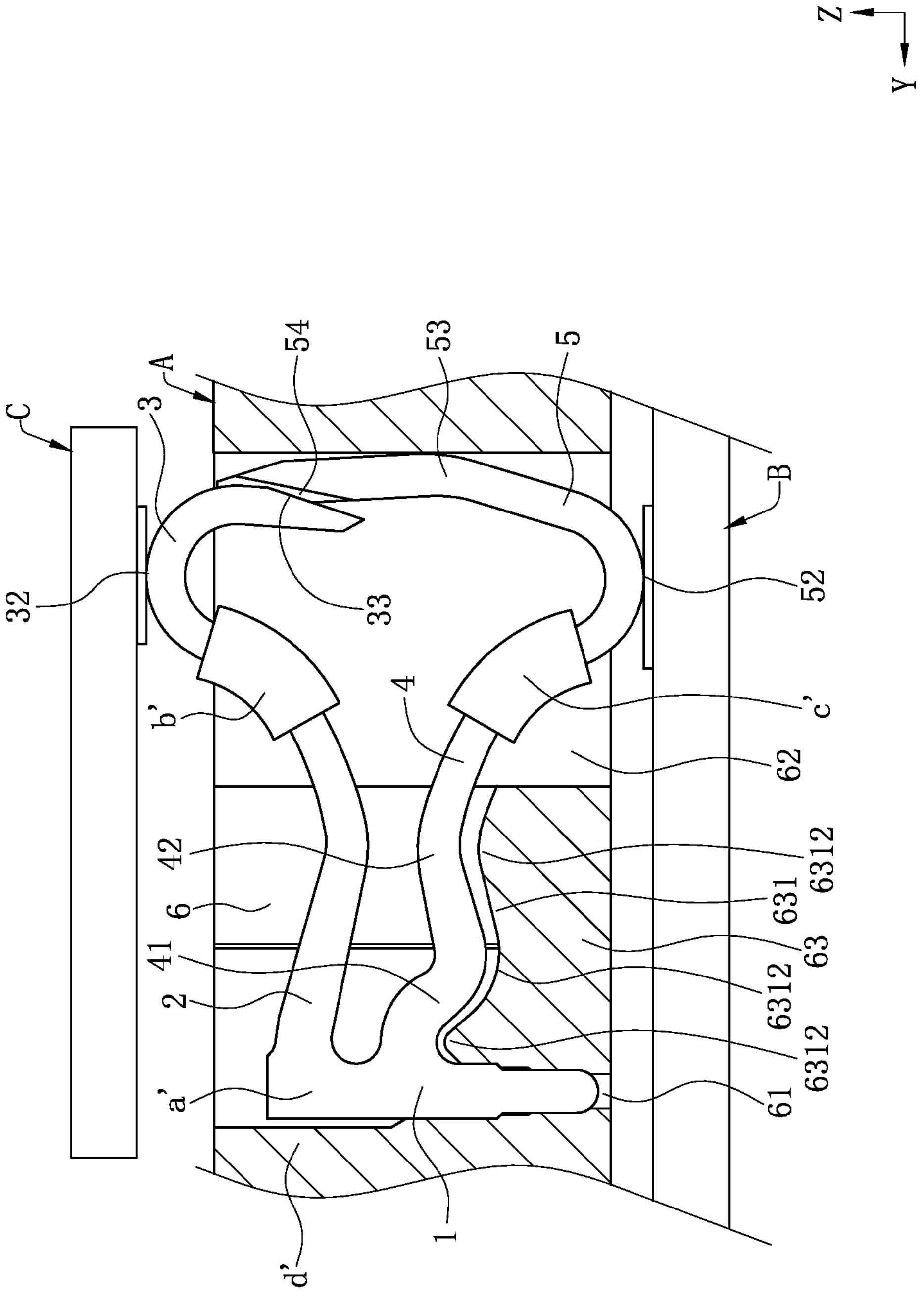
FIG. 5 is a sectional view of the electrical connector and the method of manufacturing the same when the electrical connector is mated with the first electronic component and the second electronic component according to certain embodiments of the present invention.

As shown in FIG. 5, when manufacturing of the electrical connector A is complete and the electrical connector A is mated with the first electronic component B and the second electronic component C, the upper contact portion 32 is exposed upward to an upper surface of the accommodating slot 6 and is electrically connected to the second electronic component C, and the lower contact portion 52 is exposed downward to a lower surface of the accommodating slot 6 and is electrically connected to the first electronic component B. The elastic arm 2 is given a force to generate an elastic deformation, thus driving the floating contact portion 3 to move downward through the insulating block b'. The deformation arm 4 is given a force to generate an elastic deformation, thus driving the conducting portion 5 to move upward through the plastic block c'. Thus, the first contact surface 33 of the floating contact portion 3 and the second contact surface 54 of the conducting portion 5 are in direct contact, such that the first electronic component B and the second electronic component C may perform signal exchange through the direct contact of the floating contact portion 3 and the conducting portion 5.

Figure 6:
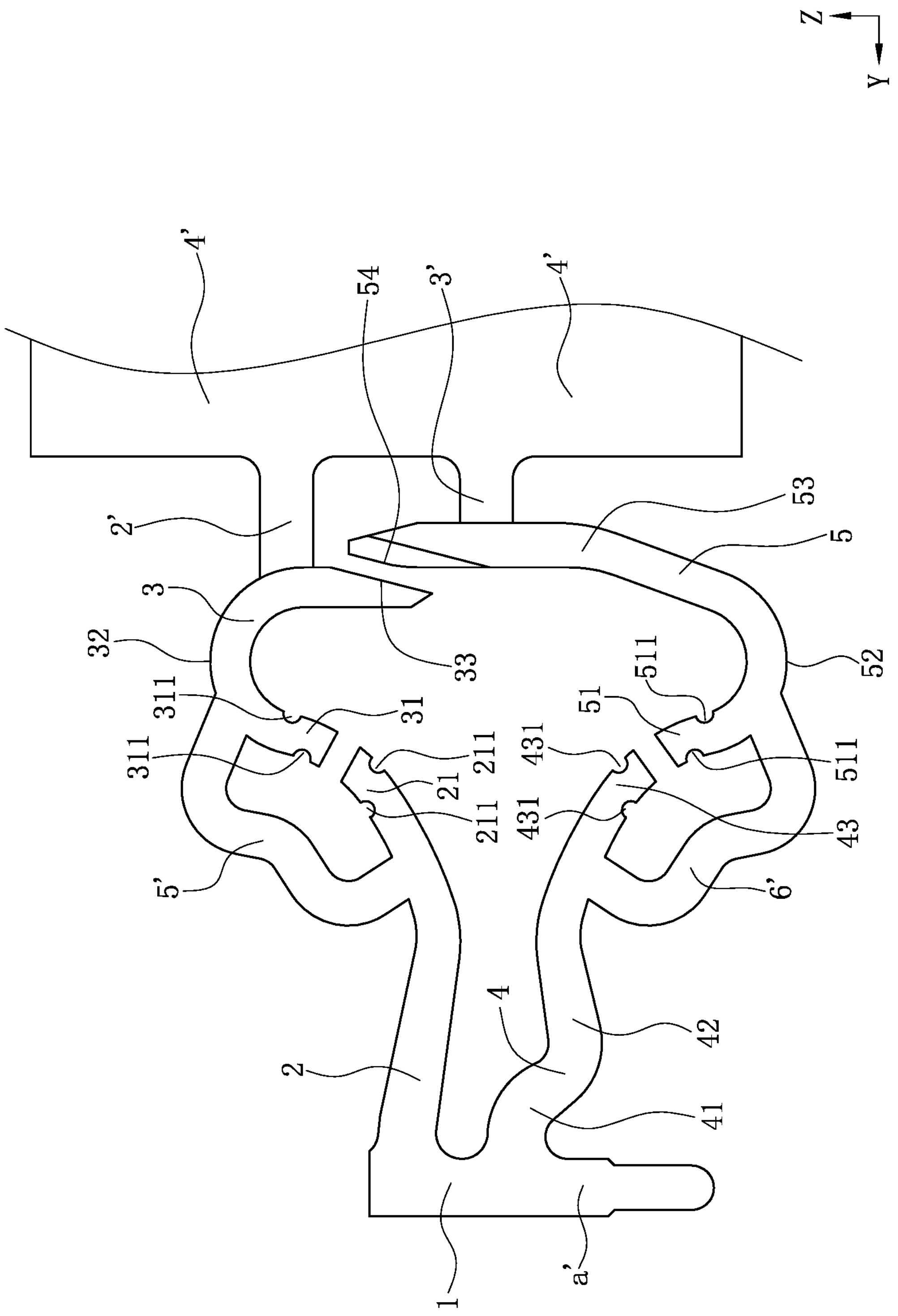
FIG. 6 is a schematic view of cutting and forming the terminal and the strip of an electrical connector and a method of manufacturing the same according to a second embodiment of the present invention.

FIG. 3 to FIG. 8 show an electrical connector A and a method of manufacturing the electrical connector A according to a second embodiment of the present invention, which are different from the electrical connector A and the method of manufacturing the electrical connector A according to the first embodiment of the present invention in that, with the remaining structures and connection relationships being identical to those of the first embodiment: as shown in FIG. 6, in the step 1, firstly, forming a plurality of strips and a plurality of terminals a' by punching and cutting. The strip formed by punching and cutting include an extending section 2', a connecting section 3', a first sub strip 5' and a second sub strip 6', without forming the base strip 1' by punching. One end of the extending section 2' adjacent to the floating contact portion 3 is connected to the floating contact portion 3, and the other end thereof is connected to the outer frame 4'. One end of the connecting section 3' adjacent to the conducting portion 5 is connected to the conducting portion 5, and the other end thereof is connected to the outer frame 4'. The first sub strip 5' is substantially located above the elastic arm 2 and the floating contact portion 3. One end of the first sub strip 5' is connected to the elastic arm 2, and another end thereof is connected to the floating contact portion 3. The second sub strip 6' is substantially located below the deformation arm 4 and the conducting portion 5. One end of the second sub strip 6' is connected to the deformation arm 4, and another end thereof is connected to the conducting portion 5.

Figure 7:
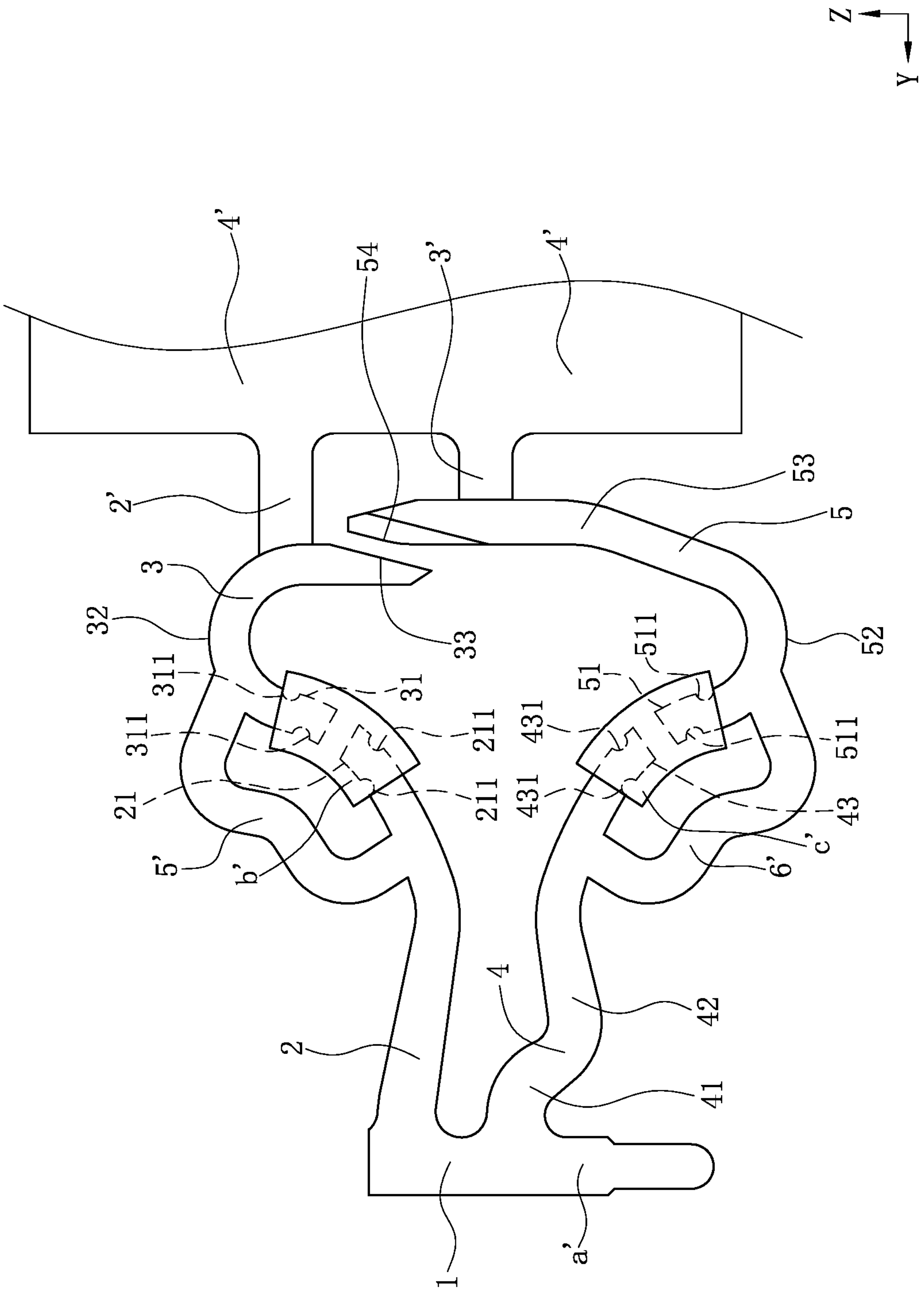
FIG. 7 is a schematic view of insert-molding the insulating block and the plastic block of the electrical connector and the method of manufacturing the same according to the second embodiment of the present invention.

As shown in FIG. 7, in the step 2, when insert-molding the insulating block b' and the plastic block c', along the left-right direction, the insulating block b' is located between a connecting location of the first sub strip 5' and the elastic arm 2 and a connecting location of the first sub strip 5' and the floating contact portion 3. That is, the insulating block b' does not extend beyond the connecting location of the first sub strip 5' and the elastic arm 2, and the insulating block b' does not extend beyond the connecting location of the first sub strip 5' and the floating contact portion 3. Along the left-right direction, the plastic block c' is located between a connecting location of the second sub strip 6' and the deformation arm 4 and a connecting location of the second sub strip 6' and the conducting portion 5. That is, the plastic block c' does not extend beyond the connecting location of the second sub strip 6' and the deformation arm 4, and the plastic block c' does not extend beyond the connecting location of the second sub strip 6' and the conducting portion 5.

Figure 8:
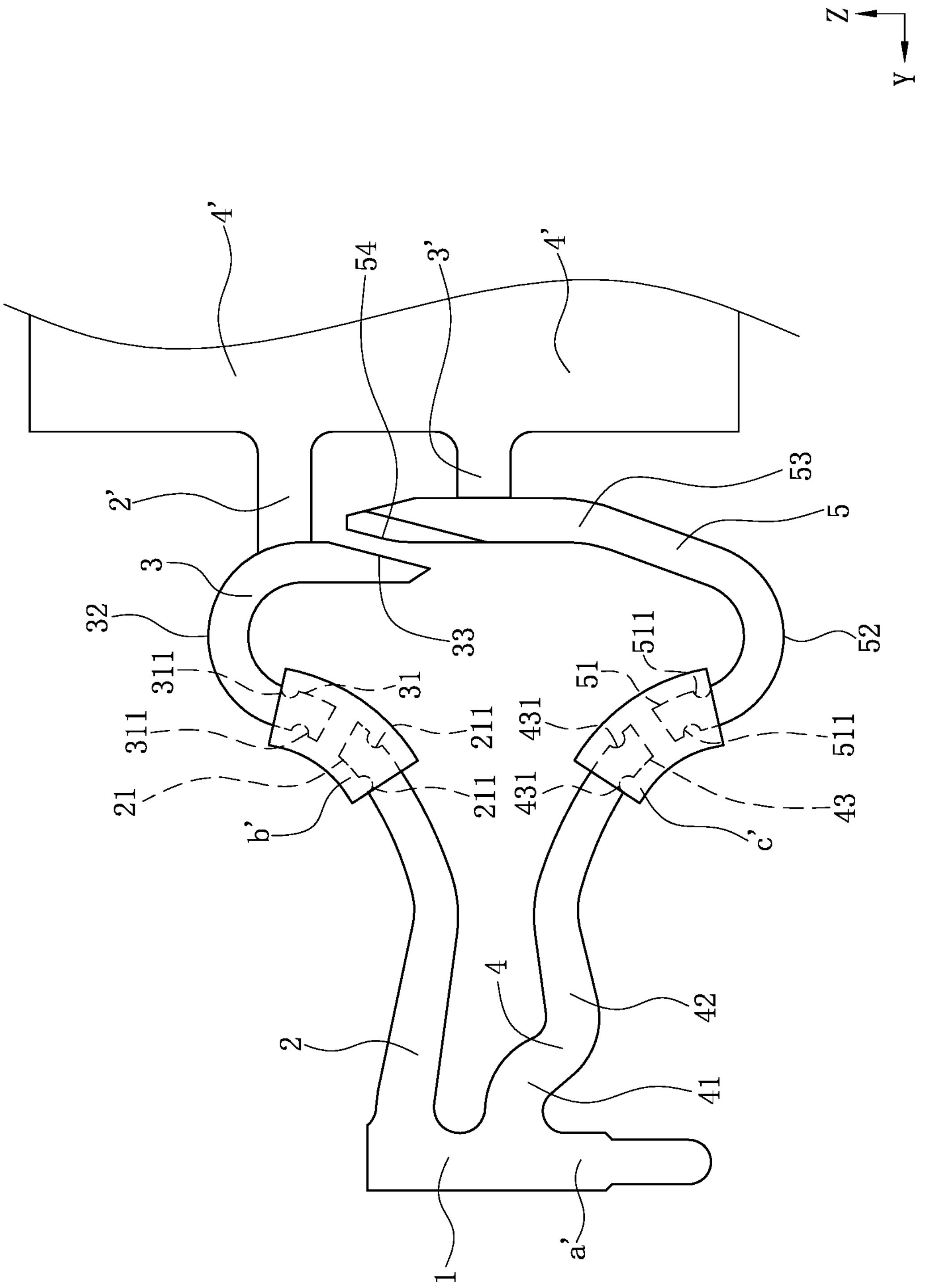
FIG. 8 is a schematic view of the terminal being connected to the extending section and the connecting section of the electrical connector and the method of manufacturing the same according to the second embodiment of the present invention.

As shown in FIG. 8, in the step 3, after insert-molding the insulating block b' and the plastic block c', and prior to cutting the extending section 2' and the connecting section 3', the first sub strip 5' is cut, such that the floating contact portion 3 and the elastic arm 2 are indirectly connected through the insulating block b'. In other words, after cutting the first sub strip 5', the floating contact portion 3 and the elastic arm 2 are not electrically connected. Simultaneously, the second sub strip 6' is cut, such that the conducting portion 5 and the deformation arm 4 are indirectly connected through the plastic block c'. In other words, after cutting the second sub strip 6', the conducting portion 5 and the deformation arm 4 are not electrically connected.

As shown in FIG. 3, in the step 4, after this, the extending section 2' and the connecting section 3' are cut, such that the terminal a' is not connected to the extending section 2' and the connecting section 3'.

As shown in FIG. 4, in the step 5, afterwards, further providing an insulating body d', where the insulating body d' is provided with a plurality of accommodating slot 6 running vertically through the insulating body d'. The terminal a' not being connected to the extending section 2' and the connecting section 3' is inserted into the accommodating slot 6 (and in other embodiments, it is possible to firstly insert the terminal a' being connected to the extending section 2' and the connecting section 3' into the accommodating slot 6, and then cut the extending section 2' and the connecting section 3').

Figure 9:
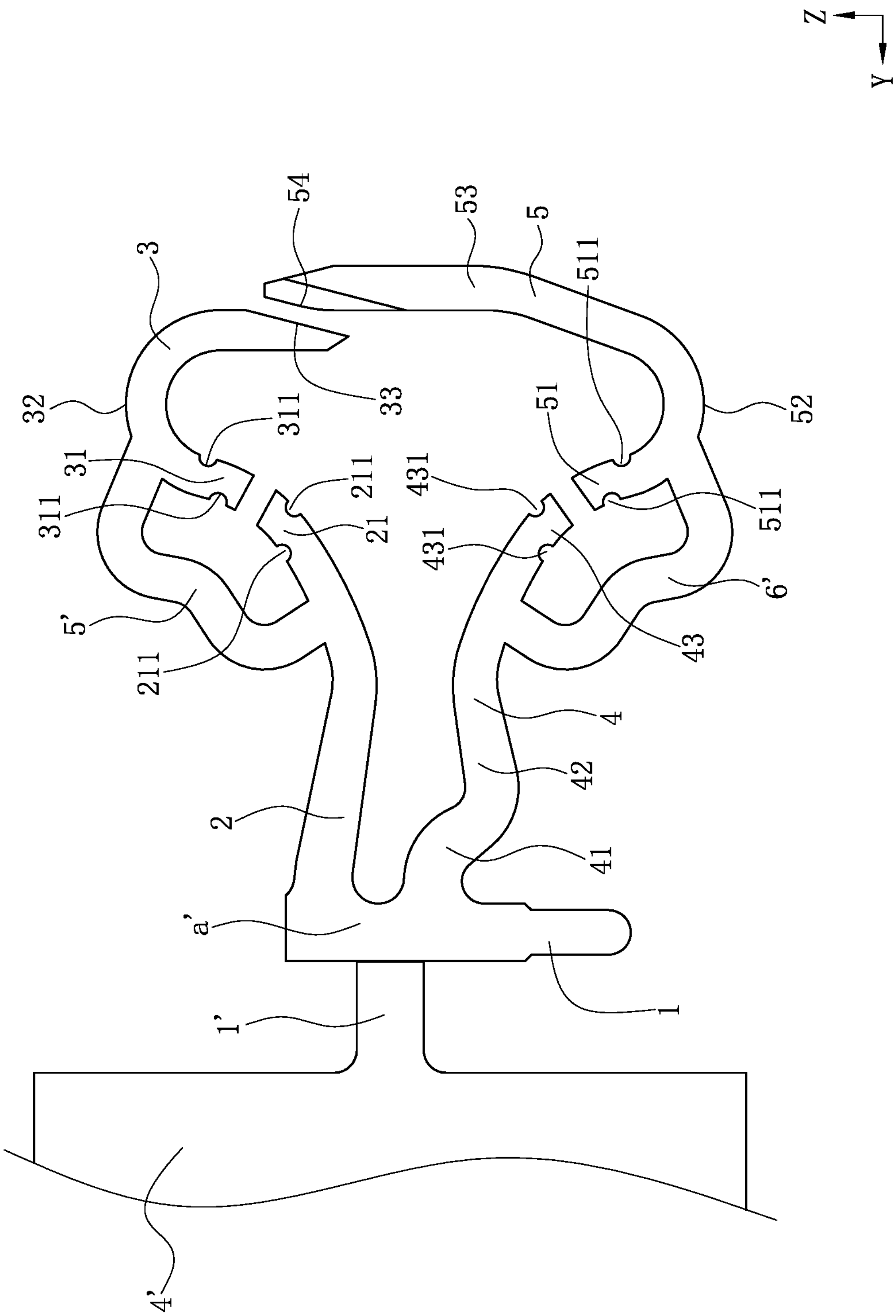
FIG. 9 is a schematic view of cutting and forming the terminal and the strip of an electrical connector and a method of manufacturing the same according to a third embodiment of the present invention.

FIG. 3, FIG. 4, FIG. 5 and FIG. 9 to FIG. 11 show an electrical connector A and a method of manufacturing the electrical connector A according to a third embodiment of the present invention, which are different from the electrical connector A and the method of manufacturing the electrical connector A according to the second embodiment of the present invention in that, with the remaining structures and connection relationships being identical to those of the second embodiment: as shown in FIG. 9, in the step 1, firstly, forming a plurality of strips and a plurality of terminals a' by punching and cutting. The strip formed by punching and cutting include a base strip 1', a first sub strip 5' and a second sub strip 6', without forming the extending section 2' and the connecting section 3' by punching. One end of the base strip 1' adjacent to the fixing portion 1 is connected to the fixing portion 1, and another end thereof is connected to the outer frame 4'. The first sub strip 5' is substantially located above the elastic arm 2 and the floating contact portion 3. One end of the first sub strip 5' is connected to the elastic arm 2, and another end thereof is connected to the floating contact portion 3. The second sub strip 6' is substantially located below the deformation arm 4 and the conducting portion 5. One end of the second sub strip 6' is connected to the deformation arm 4, and another end thereof is connected to the conducting portion 5.

Figure 10:
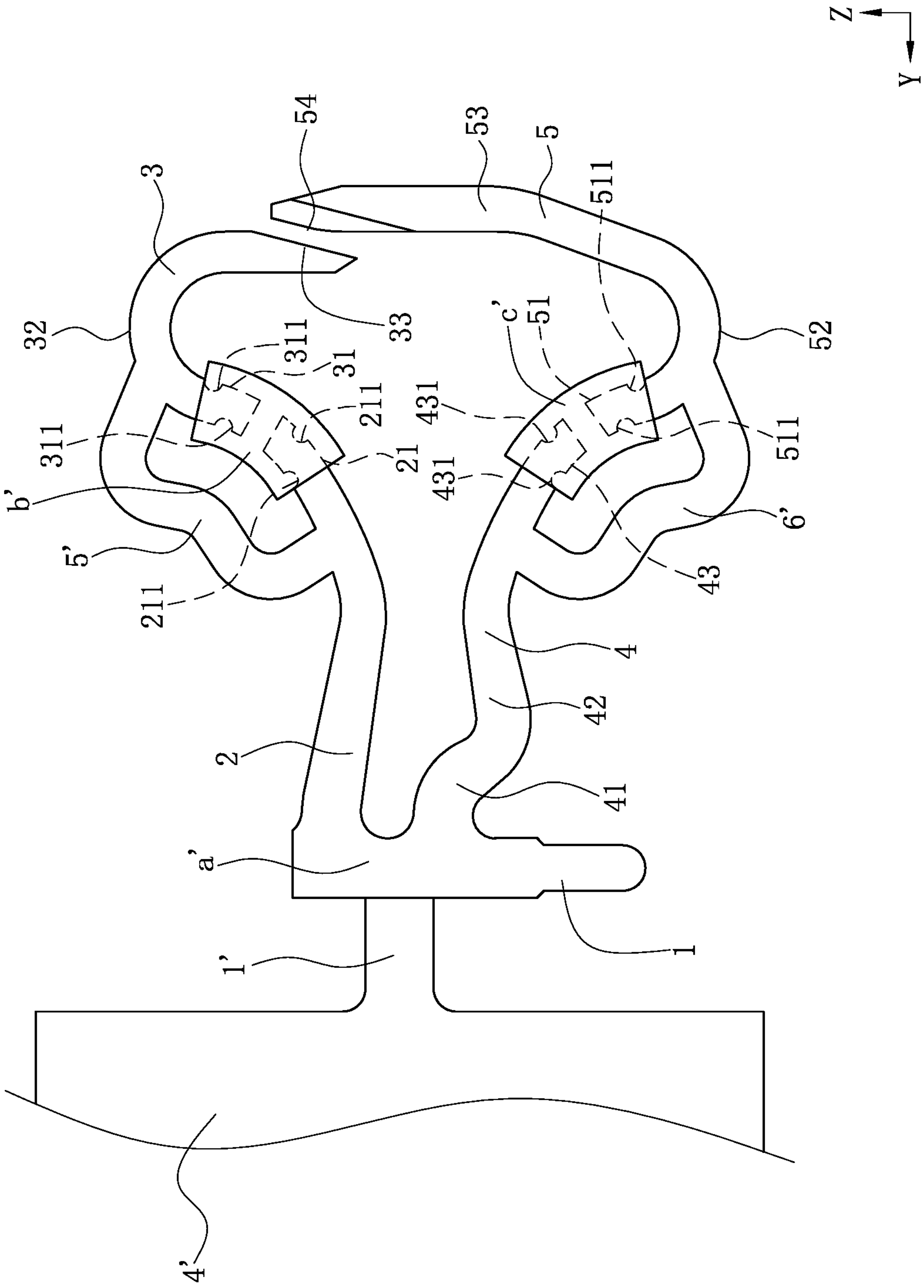
FIG. 10 is a schematic view of insert-molding the insulating block and the plastic block of the electrical connector and the method of manufacturing the same according to the third embodiment of the present invention.
Figure 11:
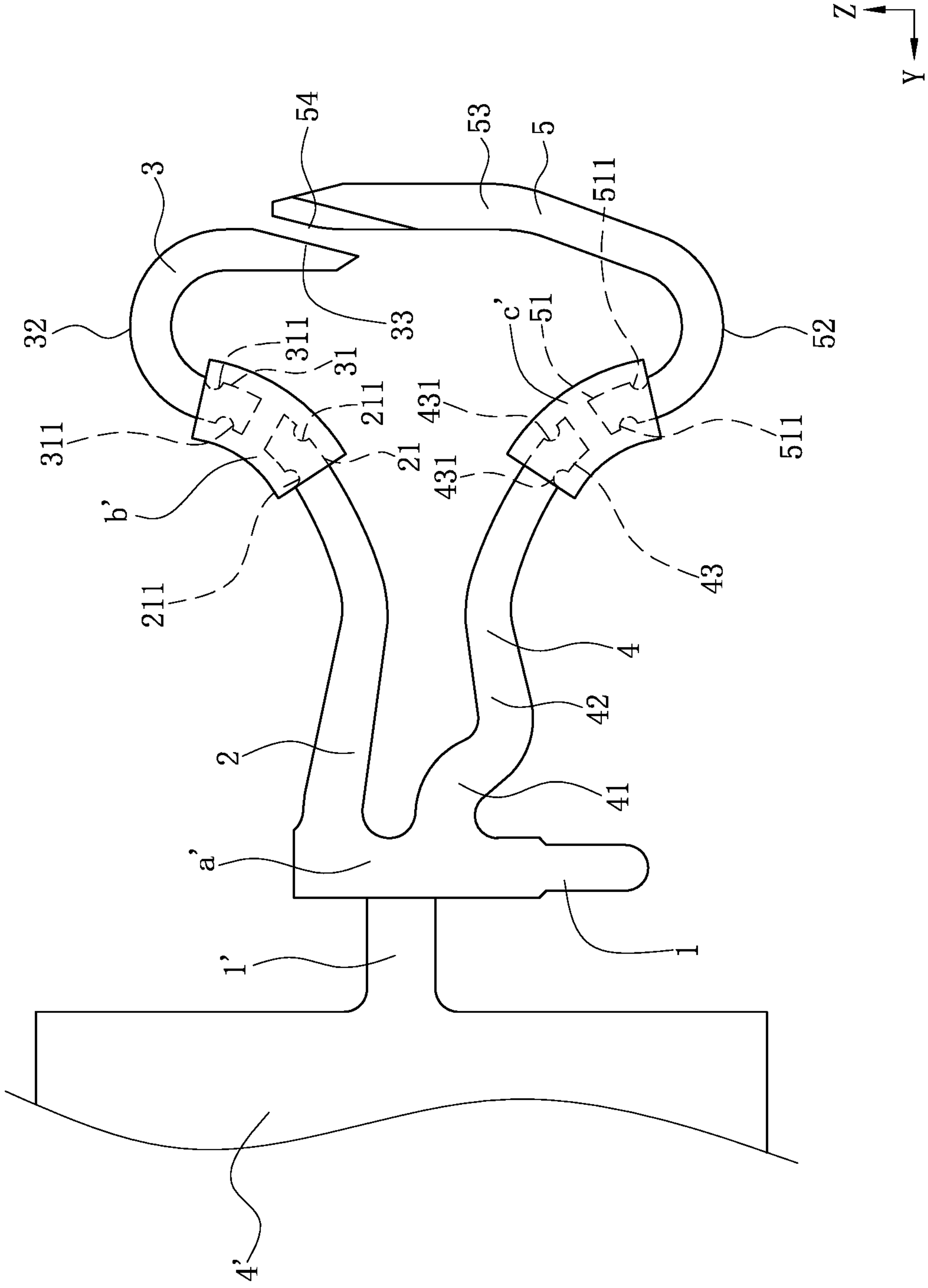
FIG. 11 is a schematic view of the terminal being connected to the base strip of the electrical connector and the method of manufacturing the same according to the third embodiment of the present invention.

As shown in FIG. 10 to FIG. 11, in the step 2, when insert-molding the insulating block b' and the plastic block c', along the left-right direction, the insulating block b' is located between a connecting location of the first sub strip 5' and the elastic arm 2 and a connecting location of the first sub strip 5' and the floating contact portion 3. That is, the insulating block b' does not extend beyond the connecting location of the first sub strip 5' and the elastic arm 2, and the insulating block b' does not extend beyond the connecting location of the first sub strip 5' and the floating contact portion 3. Along the left-right direction, the plastic block c' is located between a connecting location of the second sub strip 6' and the deformation arm 4 and a connecting location of the second sub strip 6' and the conducting portion 5. That is, the plastic block c' does not extend beyond the connecting location of the second sub strip 6' and the deformation arm 4, and the plastic block c' does not extend beyond the connecting location of the second sub strip 6' and the conducting portion 5.

As shown in FIG. 10 to FIG. 11, in the step 3, after insert-molding the insulating block b' and the plastic block c', and prior to cutting the base strip 1', the first sub strip 5' is cut, such that the floating contact portion 3 and the elastic arm 2 are indirectly connected through the insulating block b', and the conducting portion 5 and the deformation arm 4 are indirectly connected through the plastic block c'.

As shown in FIG. 3, in the step 4, the base strip 1' is cut, such that the terminal a' is not connected to any strip.

As shown in FIG. 4, in the step 5, further providing an insulating body d', where the insulating body d' is provided with a plurality of accommodating slot 6 running vertically through the insulating body d'. The terminal a' not being connected to any strip is inserted into the accommodating slot 6 (and in other embodiments, it is possible to firstly insert the terminal a' being connected to the base strip 1' into the accommodating slot 6, and then cut the base strip 1').

Figure 12:
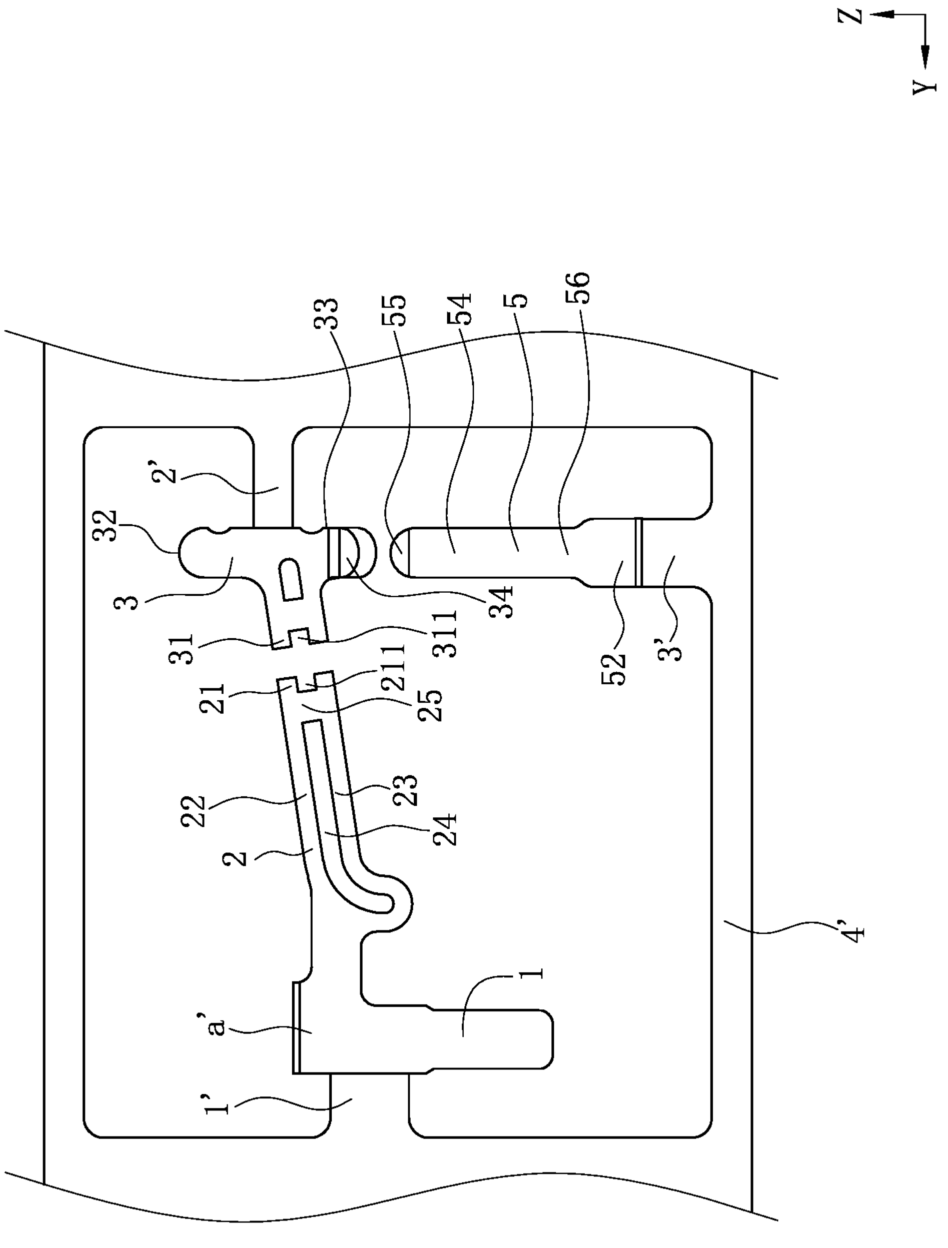
FIG. 12 is a schematic view of cutting and forming the terminal and the strip of an electrical connector and a method of manufacturing the same according to a fourth embodiment of the present invention.

FIG. 12 to FIG. 16 show an electrical connector A and a method of manufacturing the electrical connector A according to a fourth embodiment of the present invention, which are different from the electrical connector A and the method of manufacturing the electrical connector A according to the first embodiment of the present invention in that, with the remaining structures and connection relationships being identical to those of the first embodiment: as shown in FIG. 12, in the step E1 (corresponding to the step 1 and the step 3 of claim 1), firstly, forming the terminals a' and the strip by punching and cutting. Each terminal a' is provided with a fixing portion 1, an elastic arm 2, a floating contact portion 3 and a conducting portion 5, without providing the deformation arm 4. Along the left-right direction, the elastic arm 2 is located between the fixing portion 1 and the floating contact portion 3. One end of the elastic arm 2 adjacent to the fixing portion 1 is connected to the fixing portion 1, and the elastic arm 2 and the floating contact portion 3 are separate from each other. The floating contact portion 3 is located above the conducting portion 5, and the conducting portion 5 and the floating contact portion 3 are separate from each other.

As shown in FIG. 12, the elastic arm 2 is provided with a first elastic portion 22 and a second elastic portion 23 located at an inner side of the first elastic portion 22. The elastic arm 2 is further provided with an elongated slot 24, and the elongated slot 24 is located between the first elastic portion 22 and the second elastic portion 23.

As shown in FIG. 12, the elastic arm 2 is further provided with a stopping portion 25. The stopping portion 25 is located closer to the floating contact portion 3 than the elongated slot 24. An upper end of the stopping portion 25 is connected to the first elastic portion 22, and a lower end of the stopping portion 25 is connected to the second elastic portion 23. The elastic arm 2 further has the first embedded portion 21, and the first embedded portion 21 is located at one side of the stopping portion 25 adjacent to the floating contact portion 3. The first embedded portion 21 has a first through slot 211 (and in other embodiments, there may be two or three first through slots 211), and the first through slot 211 runs through the first embedded portion 21. The stopping portion 25 is located between the first through slot 211 and the elongated slot 24. That is, the elongated slot 24 and the first through slot 211 are separated by the stopping portion 25.

As shown in FIG. 12, the floating contact portion 3 is provided with the upper contact portion 32, and the upper contact portion 32 is located at the upper end of the floating contact portion 3. A lower end of the floating contact portion 3 is provided with a first guiding portion 34. The first guiding portion 34 is formed by bending. The first guiding portion 34 is used to be mated with the conducting portion 5, guiding the floating contact portion 3 to be in contact with the conducting portion 5. The floating contact portion 3 is further provided with the first contact surface 33. The first contact surface 33 is located above the first guiding portion 34 to be in contact with the conducting portion 5. The floating contact portion 3 is further provided with the second embedded portion 31 corresponding to the first embedded portion 21. The second embedded portion 31 is provided with a second through slot 311 running through the second embedded portion 31 (and in other embodiments, there may be two or three second through slots 311).

As shown in FIG. 12, an upper end of the conducting portion 5 is provided with a second guiding portion 55 corresponding to the first guiding portion 34. The second guiding portion 55 is an oblique surface, and the oblique surface is formed upward from bottom thereof and extends obliquely backward from a front plate surface of the conducting portion 5 (and in other embodiments, the oblique surface may be formed upward from bottom thereof and extends obliquely forward from a rear plate surface of the conducting portion 5). The conducting portion 5 is further provided with the second contact surface 54 corresponding to the first contact surface 33. The second contact surface 54 is located below the second guiding portion 55 to be in contact with the first contact surface 33. The conducting portion 5 is further provided with a positioning portion 56 and the lower contact portion 52. Along the vertical direction, the positioning portion 56 is located between the second contact surface 54 and the lower contact portion 52. An upper end of the positioning portion 56 is connected to the second contact surface 54, and a lower end of the positioning portion 56 is connected to the lower contact portion 52.

As shown in FIG. 12, the strip formed by punching and cutting include a base strip 1', an extending section 2' and a connecting section 3'. The base strip 1', the extending section 2' and the connecting section 3' may be connected to one another through the outer frame 4' (and in other embodiments, it is possible that the base strip 1' and the extending section 2' are connected to each other through an outer frame, and the connecting section 3' is connected to another frame).

As shown in FIG. 12, the base strip 1' is located at one side of the fixing portion 1 away from the elastic arm 2 (and in other embodiments, the base strip 1' may be located at other locations of the fixing portion 1, such as above or below the fixing portion 1). One end of the base strip 1' adjacent to the fixing portion 1 is connected to the fixing portion 1, and another end thereof is connected to the outer frame 4'. The extending section 2' is located at one side of the floating contact portion 3 away from the elastic arm 2 (and in other embodiments, the extending section 2' may be located at other locations of the floating contact portion 3, such as above or below the floating contact portion 3). One end of the extending section 2' adjacent to the floating contact portion 3 is connected to the floating contact portion 3, and the other end thereof is connected to the outer frame 4'. The connecting section 3' is located below the conducting portion 5 (and in other embodiments, the connecting section 3' may be located at one side of the conducting portion 5 away from the elastic arm 2 or at other locations thereof). One end of the connecting section 3' adjacent to the conducting portion 5 is connected to the conducting portion 5, and the other end thereof is connected to the outer frame 4'.

Figure 13:
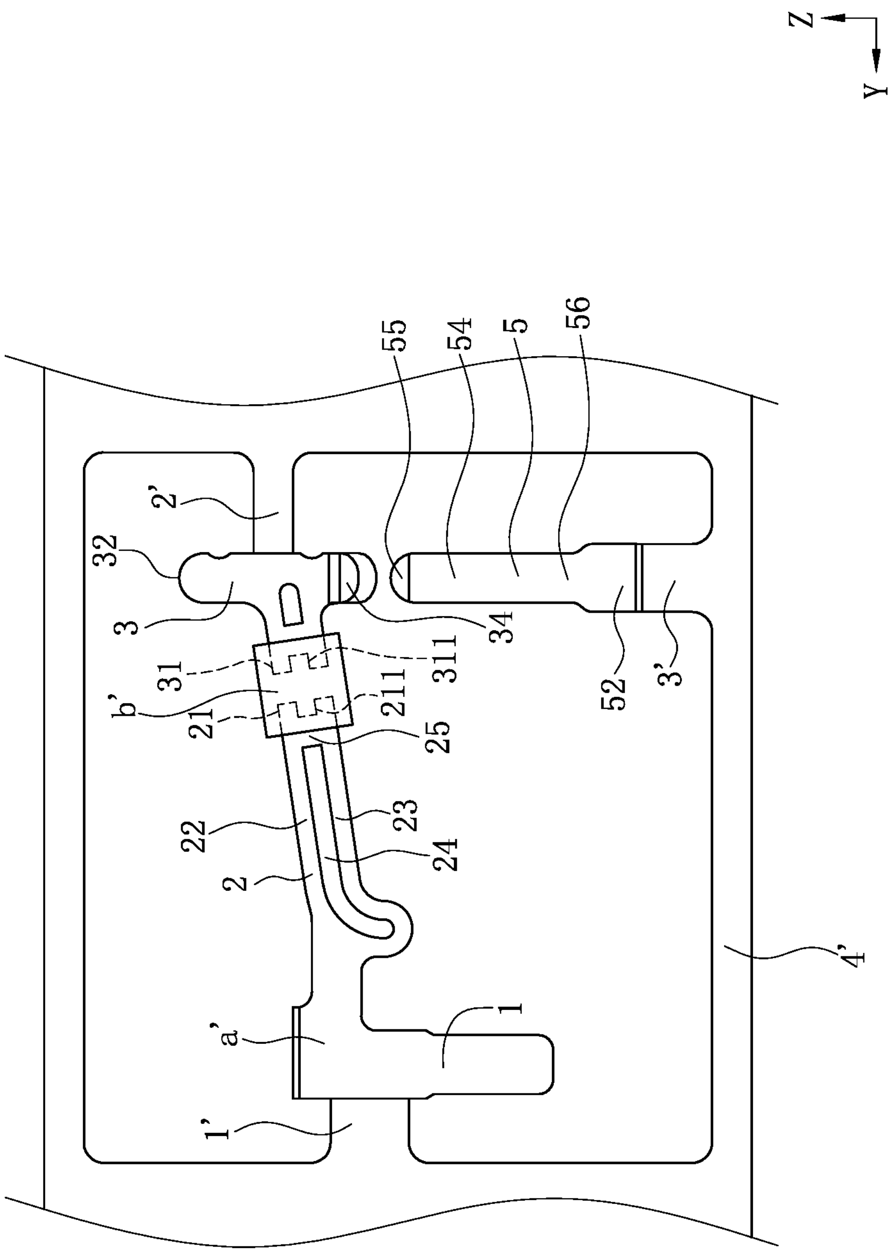
FIG. 13 is a schematic view of insert-molding the insulating block of the electrical connector and the method of manufacturing the same according to the fourth embodiment of the present invention.

As shown in FIG. 13, in the step E2 (corresponding to the step 2 of claim 1): then, insert-molding the insulating block b', such that the insulating block b' connects the elastic arm 2 and the floating contact portion 3 (and in this embodiment there is no plastic block c' being formed). Specifically, the insulating block b' is insert-molded between the elastic arm 2 and the floating contact portion 3, such that one end of the insulating block b' is connected to the elastic arm 2, the other end thereof is connected to the floating contact portion 3, and the insulating block b' covers outside the first embedded portion 21 and a portion of the stopping portion 25 (and in other embodiments, the insulating block b' may cover outside the whole stopping portion 25). Portions of the insulating material of the insulating block b' pass through the first through slots 211, such that there is a strong bonding force between the insulating block b' and the elastic arm 2. The stopping portion 25 may stop the insulating material of the insulating block b' from flowing into the elongated slot 24. The insulating block b' further covers outside the second embedded portion 31, and portions of the insulating material of the insulating block b' pass through the second through slots 311, such that there is a strong bonding force between the insulating block b' and the floating contact portion 3.

Figure 14:
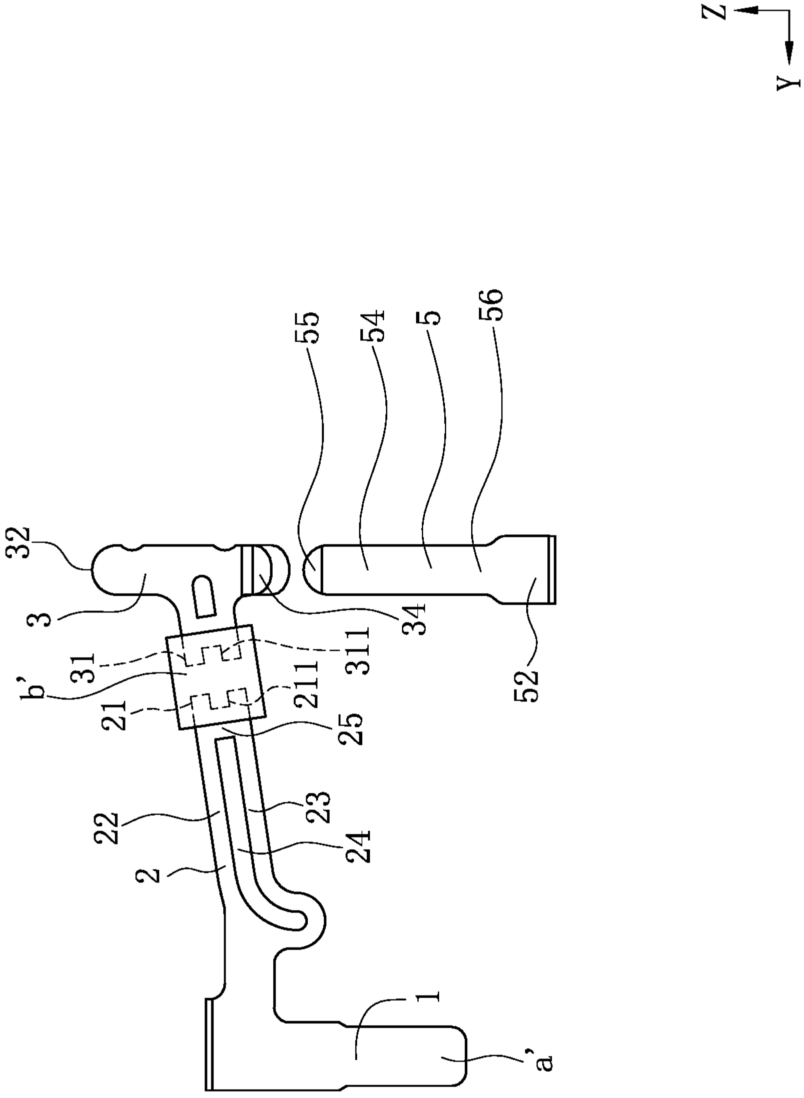
FIG. 14 is a schematic view of the terminal of the electrical connector and the method of manufacturing the same according to certain embodiments of the present invention.

As shown in FIG. 14, in the step E3 (corresponding to the step 4 of claim 1): further cutting the base strip 1', such that the base strip 1' and the fixing portion are separate; cutting the extending section 2', such that the extending section 2' and the floating contact portion 3 are separate; and cutting the connecting section 3', such that the connecting section 3' and the conducting portion 5 are separate.

Figure 15:
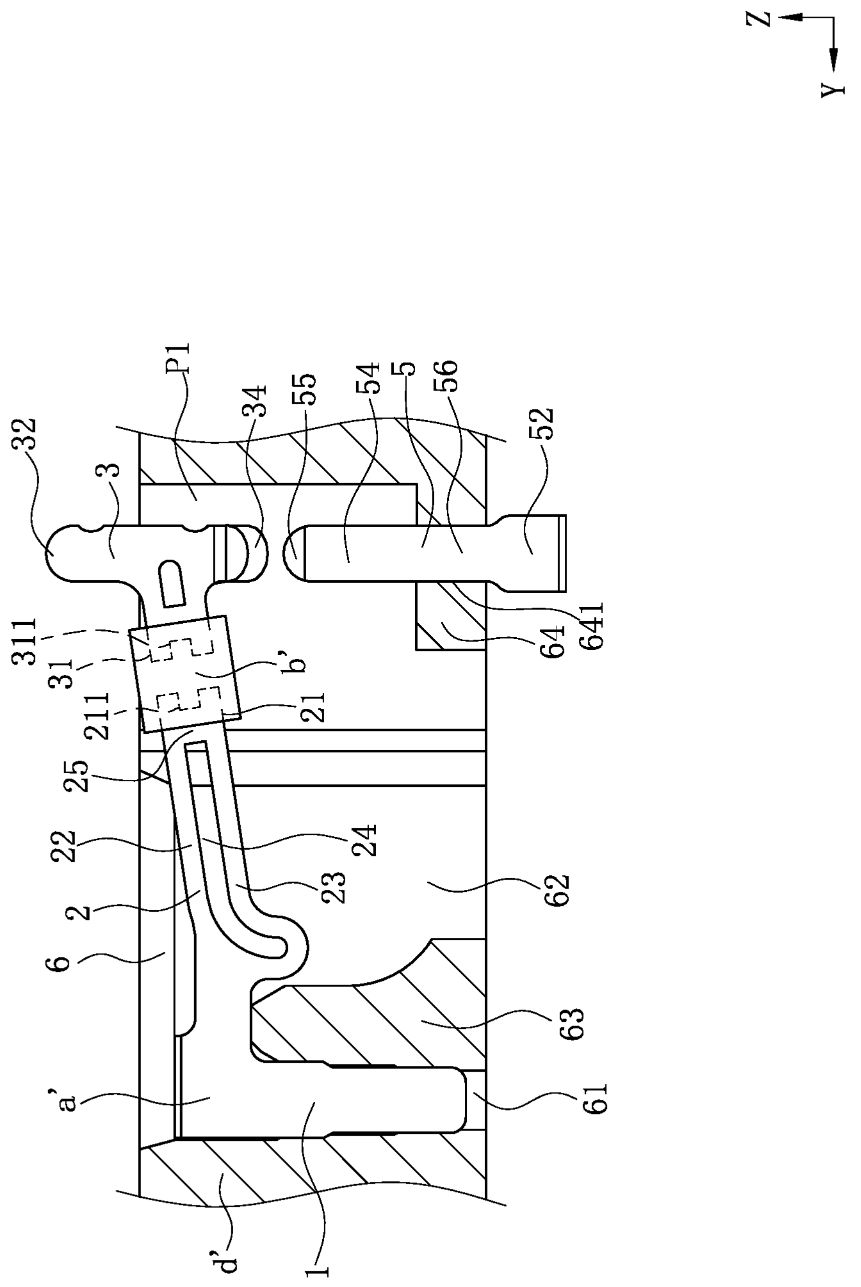
FIG. 15 is a sectional view of the terminal being installed in the accommodating slot of the electrical connector and the method of manufacturing the same according to certain embodiments of the present invention.

As shown in FIG. 15, in the step E4 (corresponding to the step 5 of claim 1), after this, further providing the insulating body d'. The insulating body d' is provided with the accommodating slots 6 running vertically through the insulating body d'. Each accommodating slot 6 is provided with the fixing cavity 61 and the receiving cavity 62 in communication with each other. The positioning post 63 is located between the fixing cavity 61 and the receiving cavity 62. The fixing portion 1 is inserted into the fixing cavity 61, and the fixing portion 1 interferes with the inner wall surface of the fixing cavity 61 and the positioning post 63, such that the terminal a' is stably fixed in the accommodating slot 6.

As shown in FIG. 15, the receiving cavity 62 runs vertically through the insulating body d'. The elastic arm 2, the floating contact portion 3 and the conducting portion 5 are accommodated in the receiving cavity 62. The first gap P1 exists between one side of the floating contact portion 3 away from the elastic arm 2 and the inner wall surface of the receiving cavity 62. The first gap P1 is reserved for the floating contact portion 3. The insulating block b' is also accommodated in the receiving cavity 62, and a gap exists between the insulating block b' and the receiving cavity 62.

As shown in FIG. 15, the receiving cavity 62 is provided with a retaining portion 64, and the retaining portion 64 is formed by extending from the inner wall surface at one side of the receiving cavity 62 away from the fixing cavity 61 toward one side thereof adjacent to the fixing cavity 61. A lower surface of the retaining portion 64 is flush with a lower surface of the insulating body d', and an upper surface of the retaining portion 64 is lower than an upper surface of the insulating body d'. The retaining portion 64 is provided with a retaining hole 641, and the retaining hole 641 runs vertically through the retaining portion 64. The conducting portion 5 is retained in the retaining hole 641 through the positioning portion 56, and the second guiding portion 55 and the second contact surface 54 extend upward out of the retaining hole 641 to be mated with the floating contact portion 3. The lower contact portion 52 passes downward out of the retaining hole 641.

Figure 16:
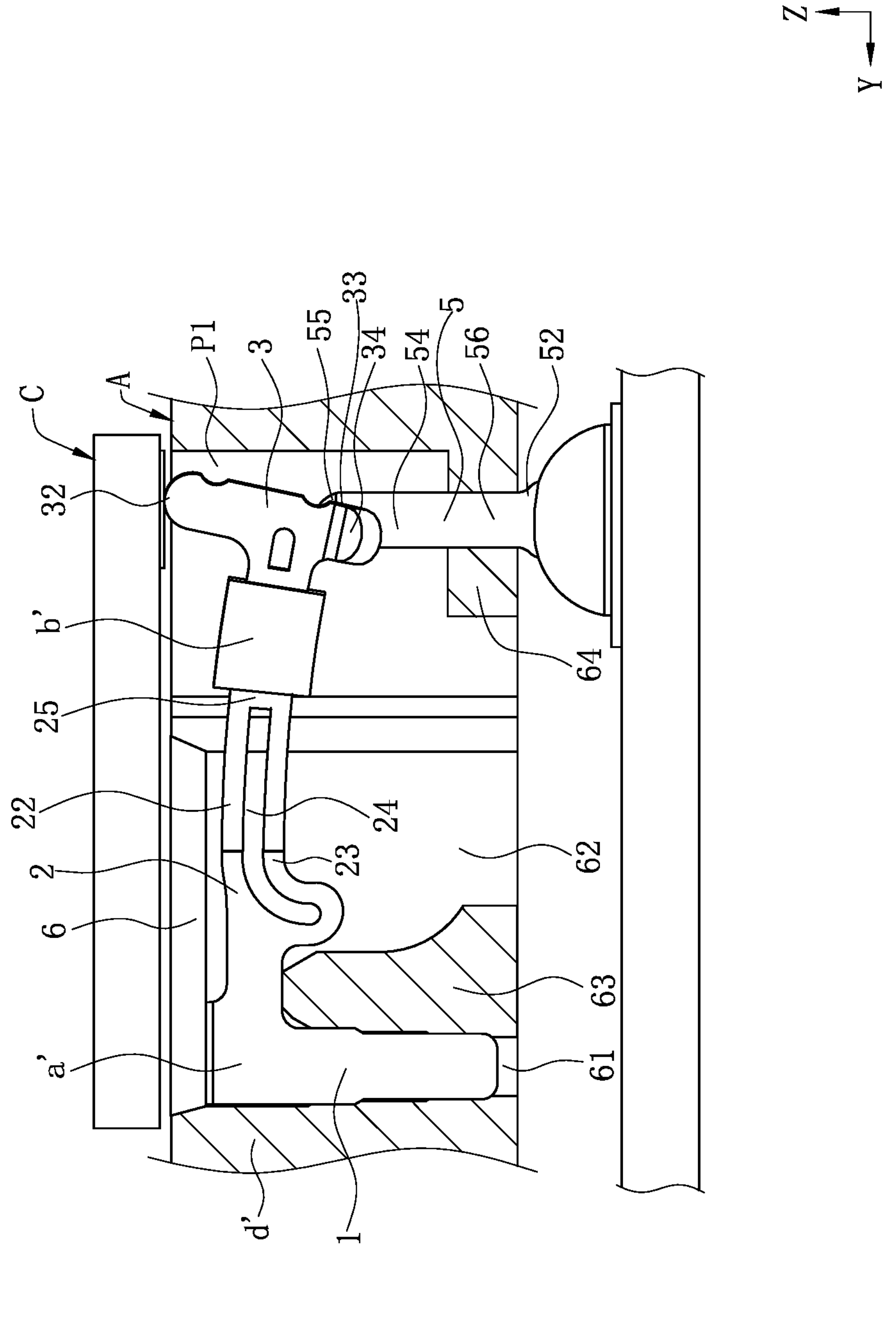
FIG. 16 is a sectional view of the electrical connector and the method of manufacturing the same when the electrical connector is mated with the first electronic component and the second electronic component according to certain embodiments of the present invention.

As shown in FIG. 16, when manufacturing of the electrical connector A is complete and the electrical connector A is mated with the first electronic component B and the second electronic component C, the upper contact portion 32 is exposed upward to an upper surface of the accommodating slot 6 and abuts the second electronic component C, and the lower contact portion 52 is exposed downward to a lower surface of the accommodating slot 6 and is soldered to the first electronic component B. The floating contact portion 3 is pressed and may deflect along the clockwise direction and enter the first gap P1, and the elastic arm 2 is given a force to generate an elastic deformation, thus driving the floating contact portion 3 to move downward through the insulating block b'. Thus, the first guiding portion 34 and the second guiding portion 55 are mated with each other, guiding the first contact surface 33 of the floating contact portion 3 and the second contact surface 54 of the conducting portion 5 to be in direct contact, such that the first electronic component B and the second electronic component C may perform signal exchange through the direct contact of the floating contact portion 3 and the conducting portion 5.

Figure 17:
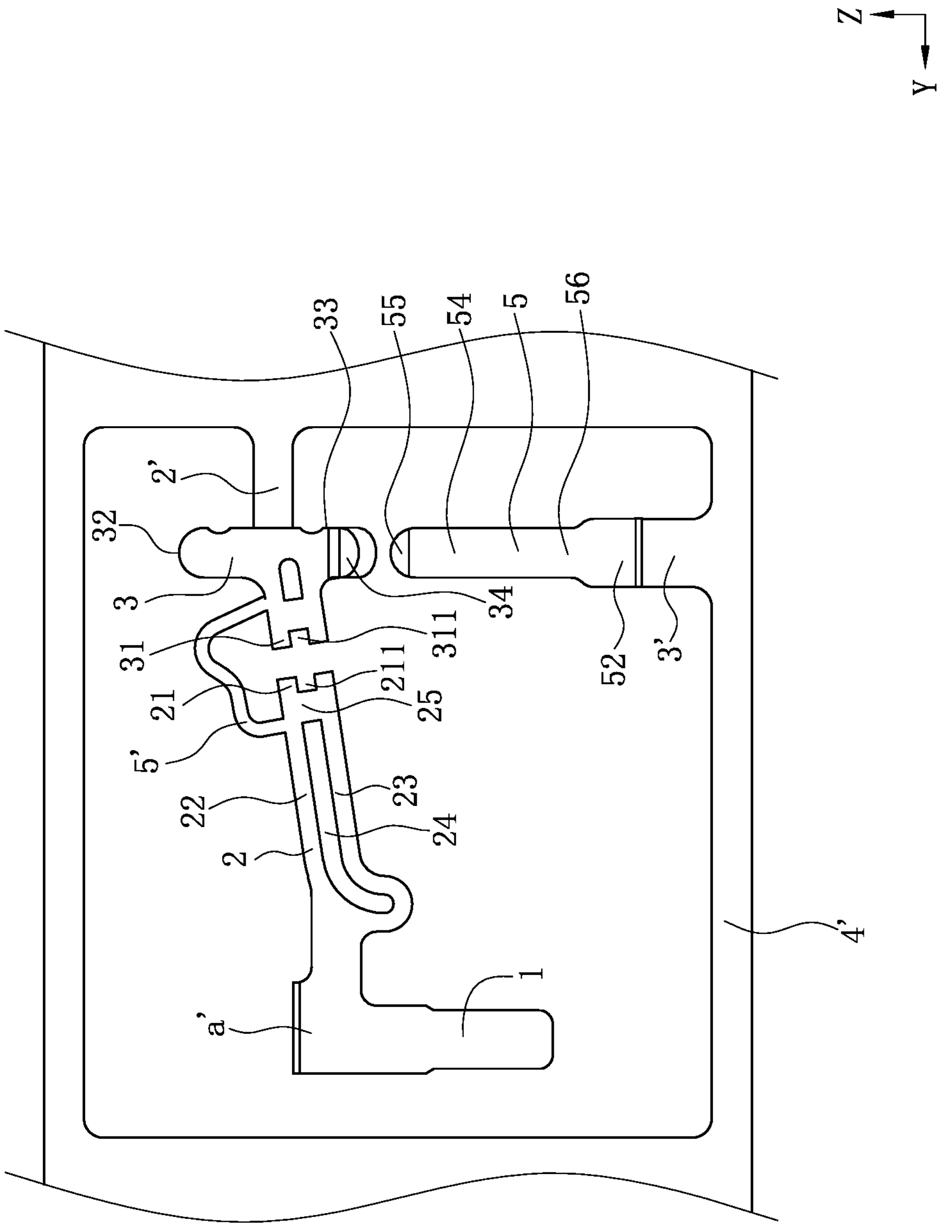
FIG. 17 is a schematic view of cutting and forming the terminal and the strip of an electrical connector and a method of manufacturing the same according to a fifth embodiment of the present invention.

FIG. 14 to FIG. 19 show an electrical connector A and a method of manufacturing the electrical connector A according to a fifth embodiment of the present invention, which are different from the electrical connector A and the method of manufacturing the electrical connector A according to the fourth embodiment of the present invention in that, with the remaining structures and connection relationships being identical to those of the fourth embodiment: as shown in FIG. 17, in the step 1, firstly, forming a plurality of terminals a' and a strip by punching and cutting. The strip formed by punching and cutting include an extending section 2', a connecting section 3' and a first sub strip 5', without forming the base strip 1' by punching. The first sub strip 5' is substantially located above the elastic arm 2. One end of the first sub strip 5' is connected to the elastic arm 2, and another end thereof is connected to the floating contact portion 3.

Figure 18:
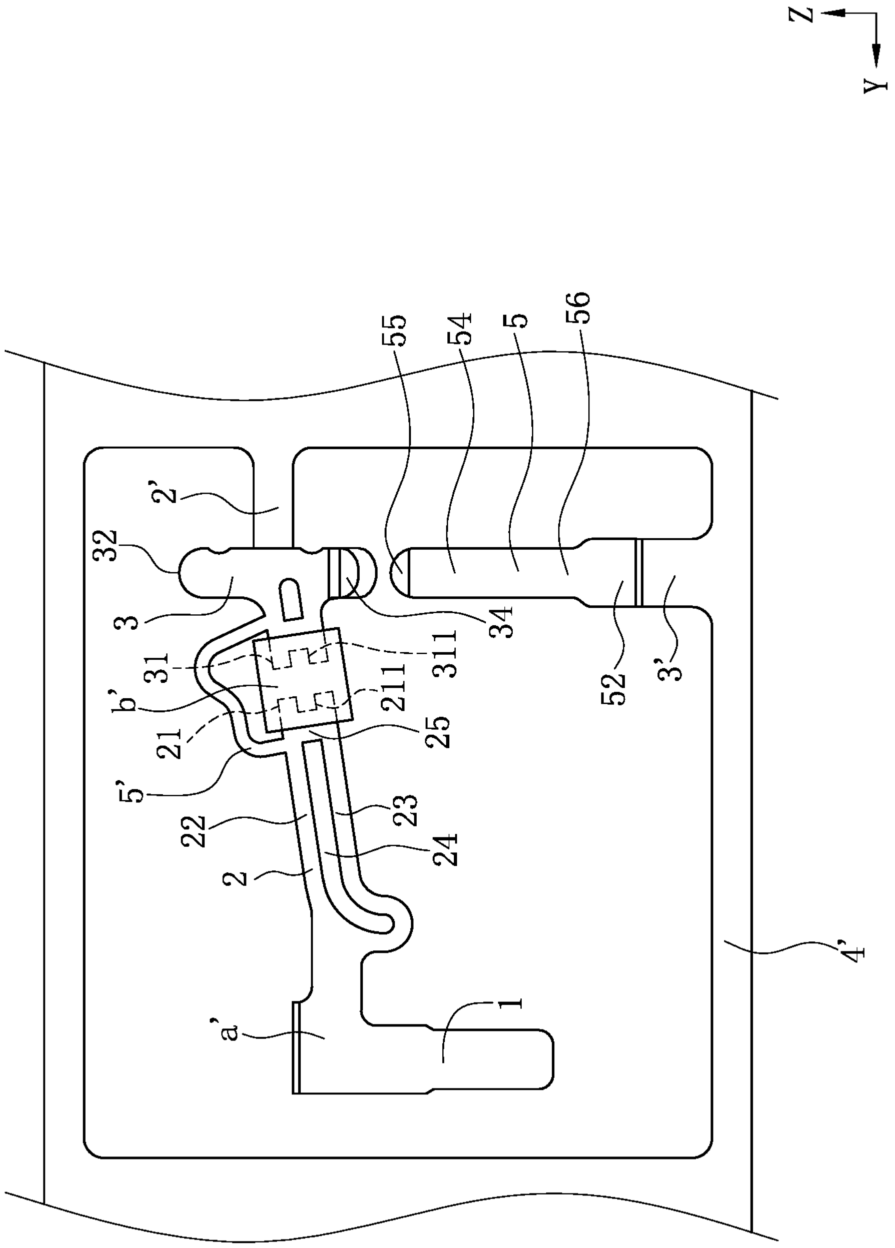
FIG. 18 is a schematic view of insert-molding the insulating block of the electrical connector and the method of manufacturing the same according to the fifth embodiment of the present invention.

As shown in FIG. 18, in the step 2, when insert-molding the insulating block b', along the left-right direction, the insulating block b' is located between a connecting location of the first sub strip 5' and the elastic arm 2 and a connecting location of the first sub strip 5' and the floating contact portion 3. That is, the insulating block b' does not extend beyond the connecting location of the first sub strip 5' and the elastic arm 2, and the insulating block b' does not extend beyond the connecting location of the first sub strip 5' and the floating contact portion 3.

Figure 19:
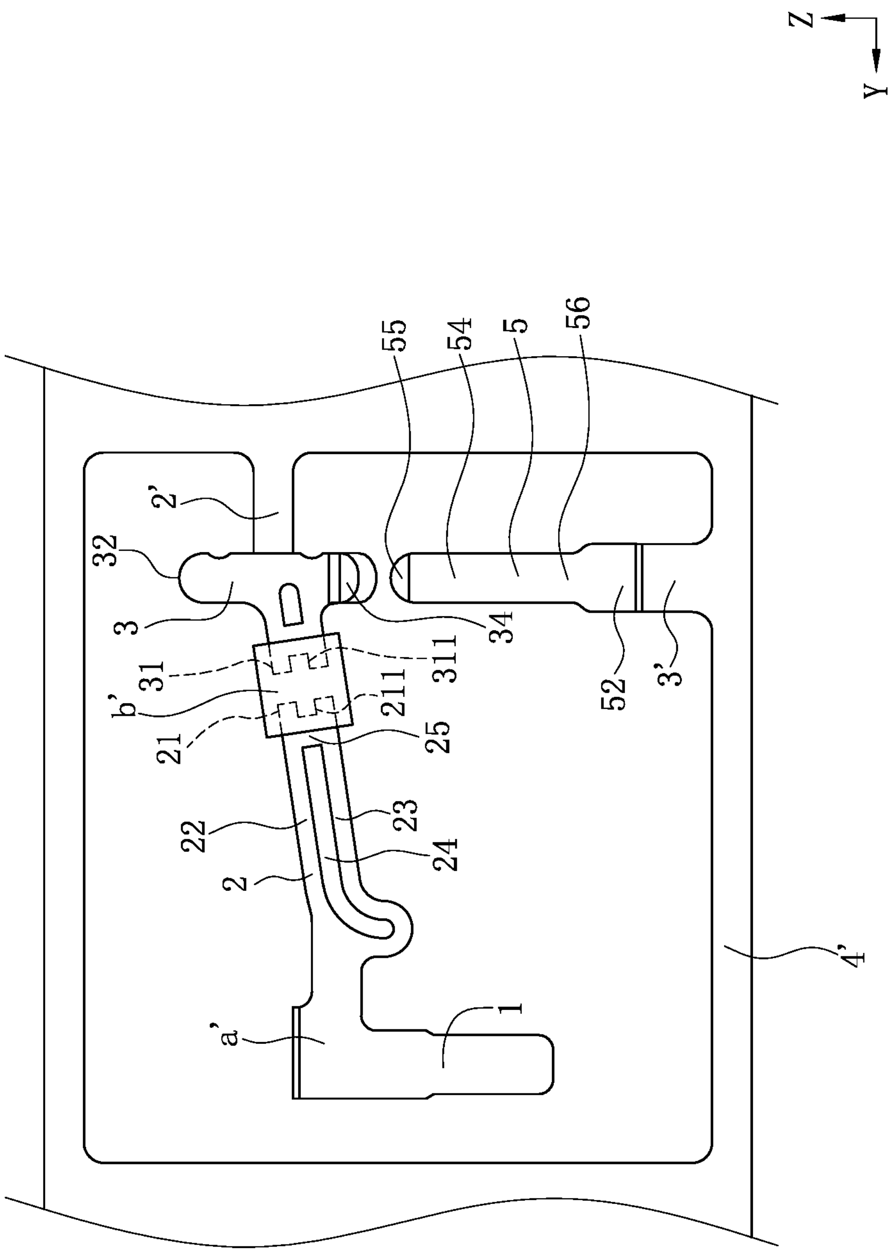
FIG. 19 is a schematic view of the terminal being connected to the extending section and the conducting section of an electrical connector and a method of manufacturing the same according to the fifth embodiment of the present invention.

As shown in FIG. 19, in the step 3, after insert-molding the insulating block b', and prior to cutting the extending section 2' and the connecting section 3', the first sub strip 5' is cut, such that the floating contact portion 3 and the elastic arm 2 are indirectly connected through the insulating block b'. In other words, after cutting the first sub strip 5', the floating contact portion 3 and the elastic arm 2 are not electrically connected.

As shown in FIG. 14, in the step 4, the extending section 2' and the connecting section 3' are cut, such that the terminal a' is not connected to any strip.

As shown in FIG. 15, in the step 5, the terminal a' not being connected to any strip is then inserted into the accommodating slot 6 (and in other embodiments, it is possible to firstly insert the terminal a' being connected to the extending section 2' and the connecting section 3' into the accommodating slot 6, and then cut the extending section 2' and the connecting section 3').

Figure 20:
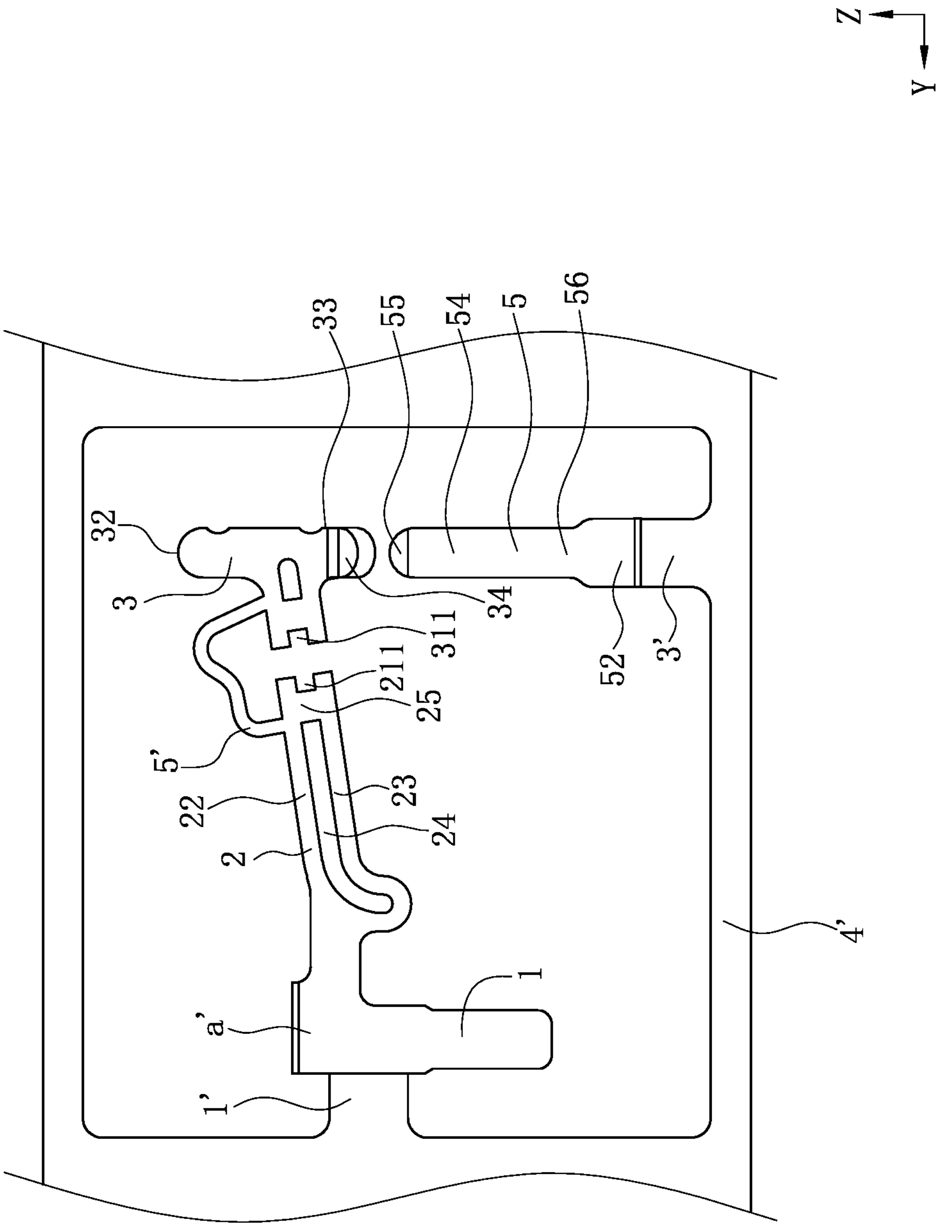
FIG. 20 is a schematic view of cutting and forming the terminal and the strip of an electrical connector and a method of manufacturing the same according to a sixth embodiment of the present invention.

FIG. 14, FIG. 15, FIG. 16 and FIG. 20 show an electrical connector A and a method of manufacturing the electrical connector A according to a sixth embodiment of the present invention, which are different from the electrical connector A and the method of manufacturing the electrical connector A according to the fifth embodiment of the present invention in that, with the remaining structures and connection relationships being identical to those of the fifth embodiment: As shown in FIG. 20, in the step 1, when forming the strip by punching and cutting, the strip formed by punching and cutting include a base strip 1', a connecting section 3' and a first sub strip 5', without forming the extending section 2' by punching. The base strip 1' is located at one side of the fixing portion 1 away from the elastic arm 2. That is, the base strip 1' is located at a left side of the fixing portion 1 (and in other embodiments, the base strip 1' may be located at other locations of the fixing portion 1, such as above or below the fixing portion 1).

As shown in FIG. 14, in the step 4, after cutting the first sub strip 5', the base strip 1' and the connecting section 3' are cut, such that the terminal a' is not connected to any strip.

Figure 21:
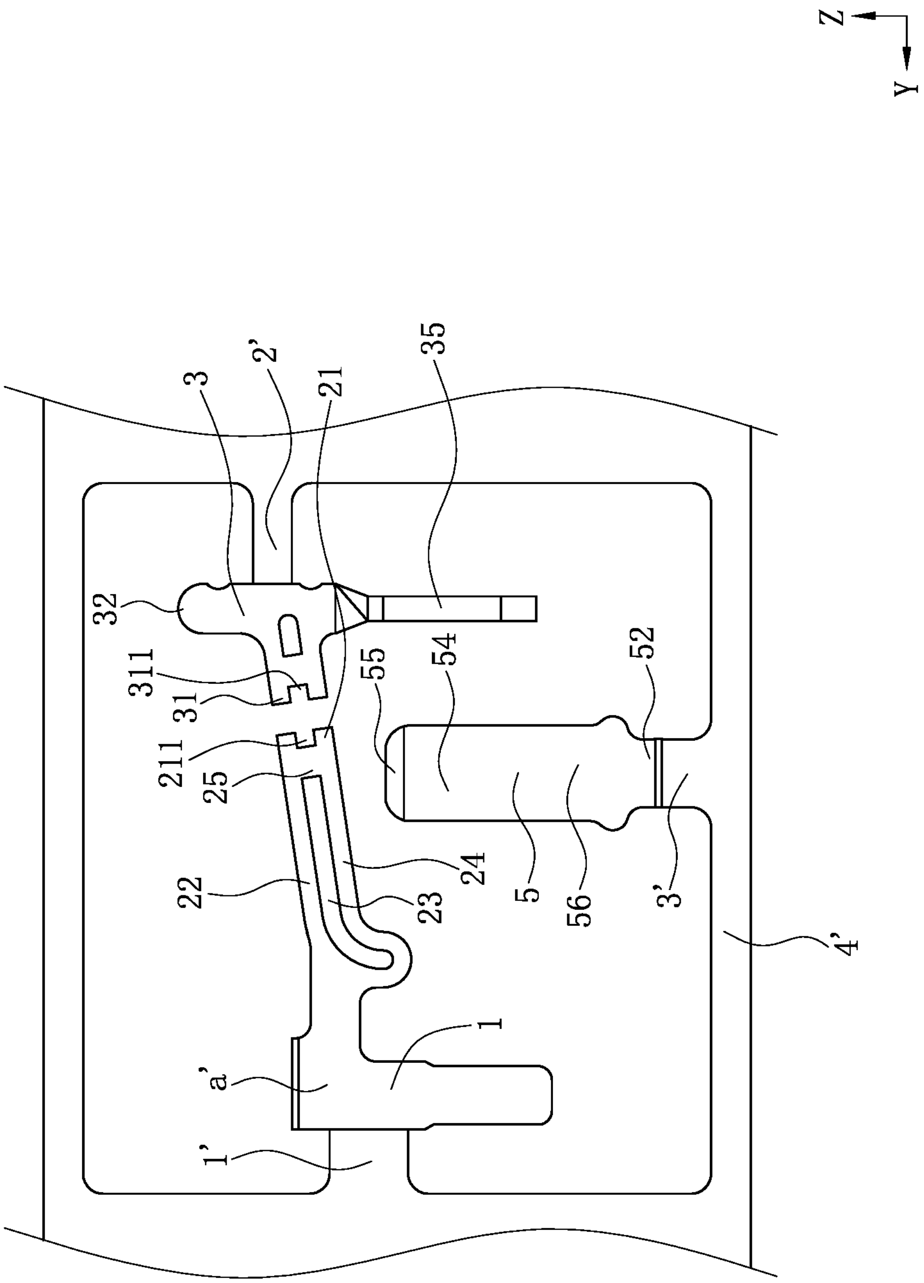
FIG. 21 is a schematic view of cutting and forming the terminal and the strip of an electrical connector and a method of manufacturing the same according to a seventh embodiment of the present invention.
Figure 22:
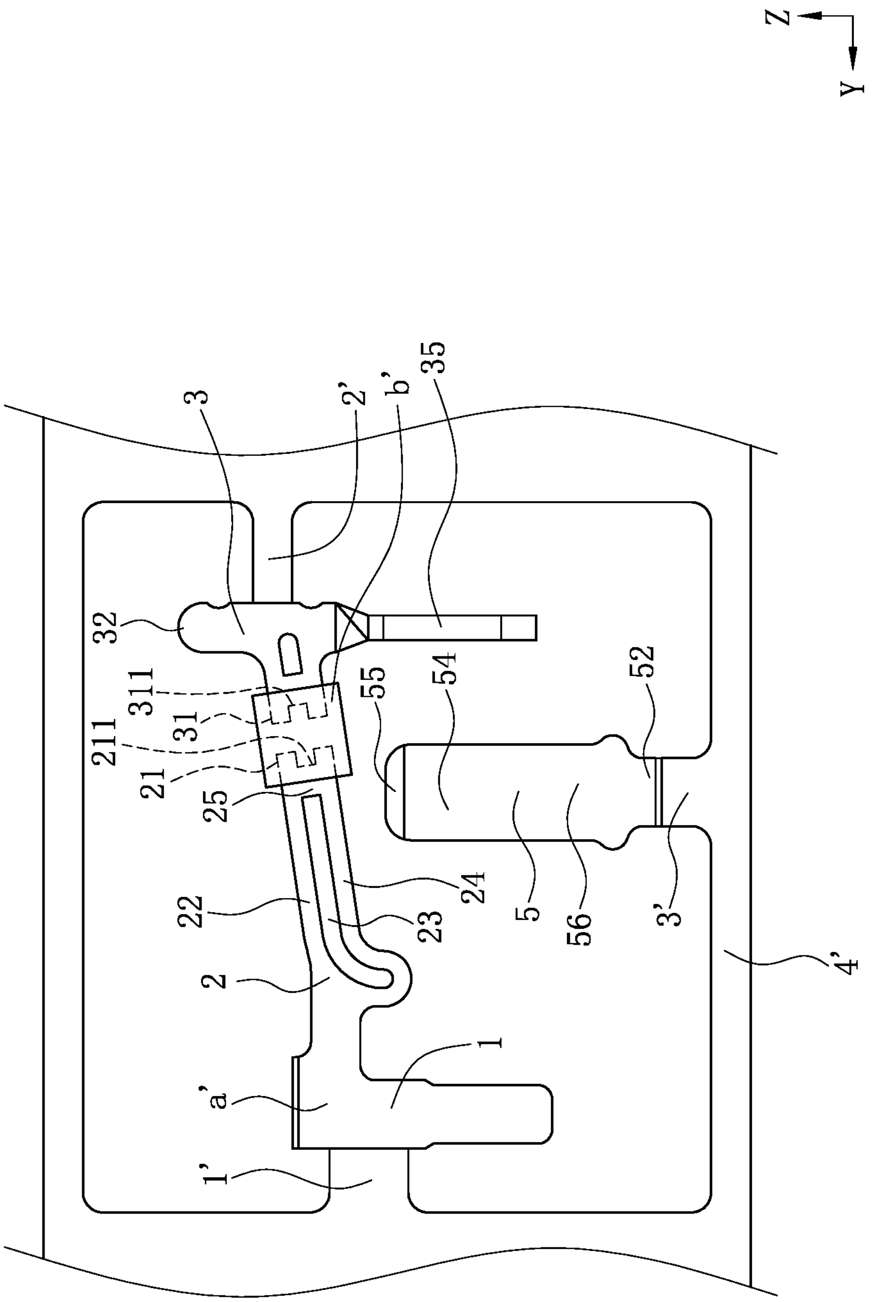
FIG. 22 is a schematic view of insert-molding the insulating block of the electrical connector and the method of manufacturing the same according to the seventh embodiment of the present invention.
Figure 23:
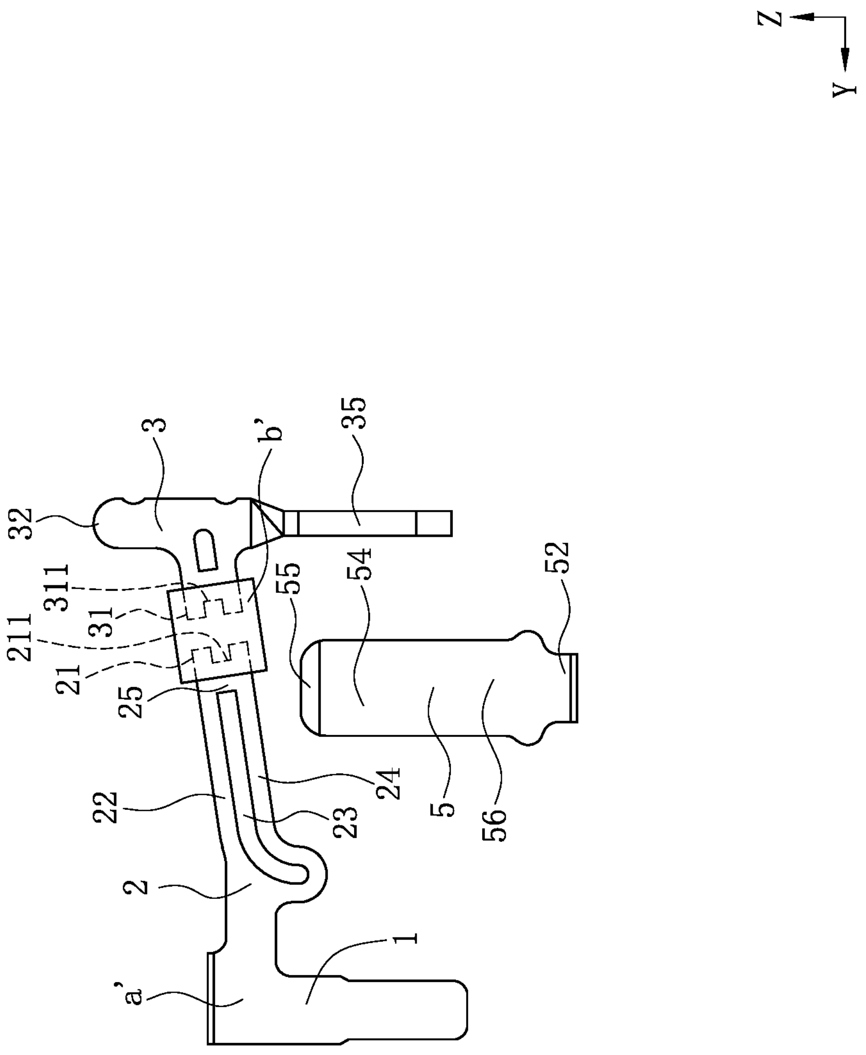
FIG. 23 is a schematic view of the terminal of the electrical connector and the method of manufacturing the same according to certain embodiments of the present invention.

FIG. 21 to FIG. 26 show an electrical connector A and a method of manufacturing the electrical connector A according to a seventh embodiment of the present invention, which are different from the electrical connector A and the method of manufacturing the electrical connector A according to the fourth embodiment of the present invention in that, with the remaining structures and connection relationships being identical to those of the fourth embodiment: as shown in FIG. 21 and FIG. 23, in the step F1 (corresponding to the step 1 and the step 3 of claim 1), firstly, forming a plurality of terminals a' and a strip by punching and cutting. The strip formed by punching and cutting include a base strip 1', an extending section 2' and a connecting section 3'. In each terminal a' formed by punching and cutting, a lower end of the floating contact portion 3 has two clamping portion 35, and an opening 351 exists between the two clamping portions 35. The opening 351 runs downward through the lower end of the floating contact portion 3. Each clamping portion 35 is provided with one first guiding portion 34, and the first guiding portion 34 is an oblique surface. The two first guiding portions 34 are provided opposite to each other, and the opening 351 is located between the two first guiding portions 34. The conducting portion 5 has two second guiding portions 55. Each second guiding portion 55 is an oblique surface, and the two oblique surfaces are respectively located on the two plate surfaces of the conducting portion 5. The two first guiding portions 34 and the two second guiding portion 55 are mated with each other to guide the conducting portion 5 to be inserted into the opening 351.

As shown in FIG. 22, in the step F2 (corresponding to the step 2 of claim 1), further insert-molding the insulating block b', such that the one end of the insulating block b' is connected to the elastic arm 2, and the other end thereof is connected to the floating contact portion 3.

As shown in FIG. 23, in the step F3 (corresponding to the step 4 of claim 1) and in the step F2, afterwards, the base strip 1', the extending section 2' and the connecting section 3' are cut.

Figure 26:
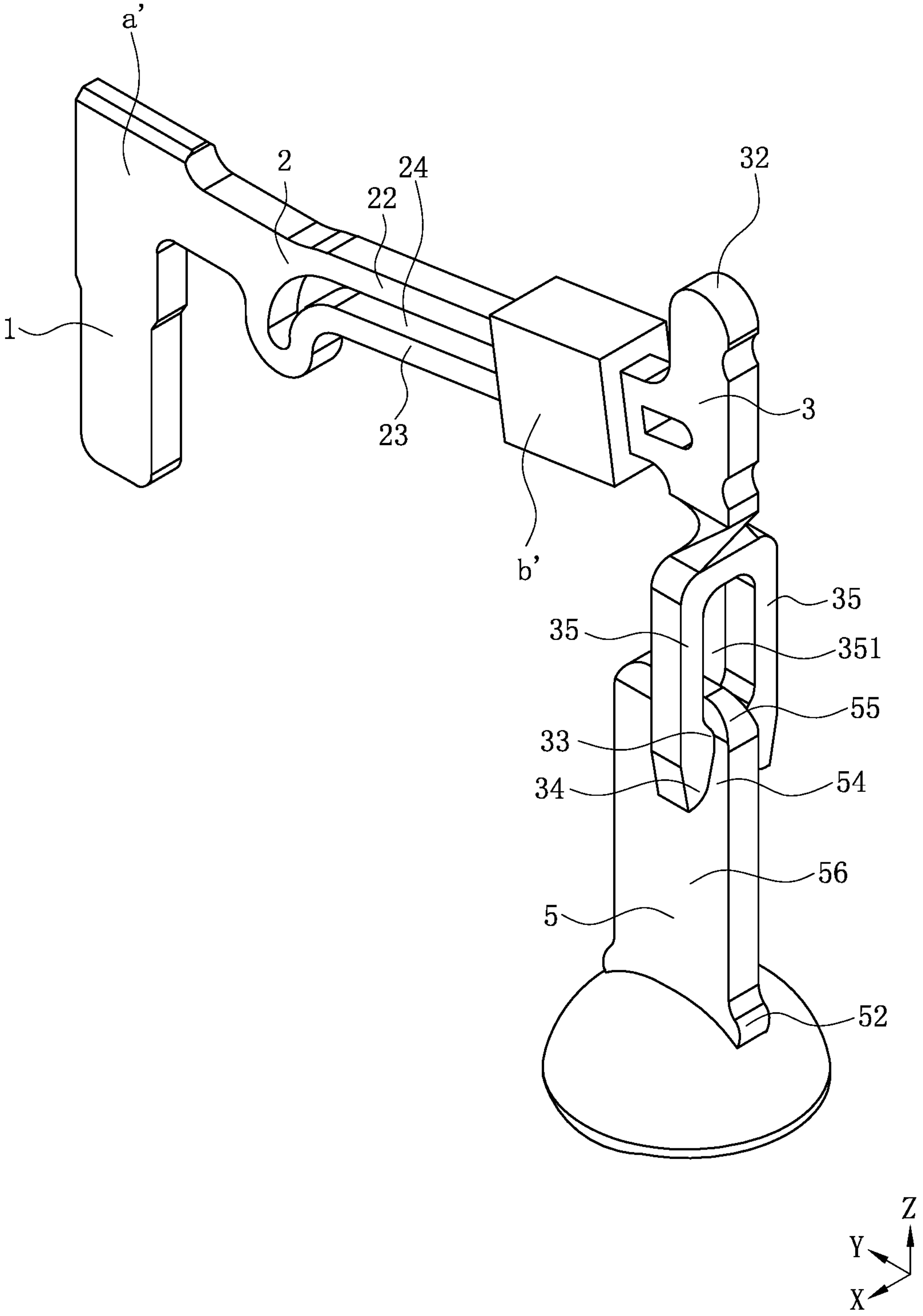
FIG. 26 is a schematic view of the terminal of the electrical connector and the method of manufacturing the same in another viewing angle according to certain embodiments of the present invention.

As shown in FIG. 24*to* FIG. 26, in the step F4 (corresponding to the step 5 of claim 1), when the terminal a' is inserted into the accommodating slot 6, the conducting portion 5 is located between the two clamping portions 35 and protrudes into the opening 351, and the two plate surfaces of the conducting portion 5 are respectively in contact with the two clamping portions 35 (and in other embodiments, it is possible that when the terminal a' is inserted into the accommodating slot 6, the conducting portion 5 is located below the floating contact portion 3 and the two are separate from each other. That is, the conducting portion 5 and the two clamping portions 35 are not in contact).

Figure 25:
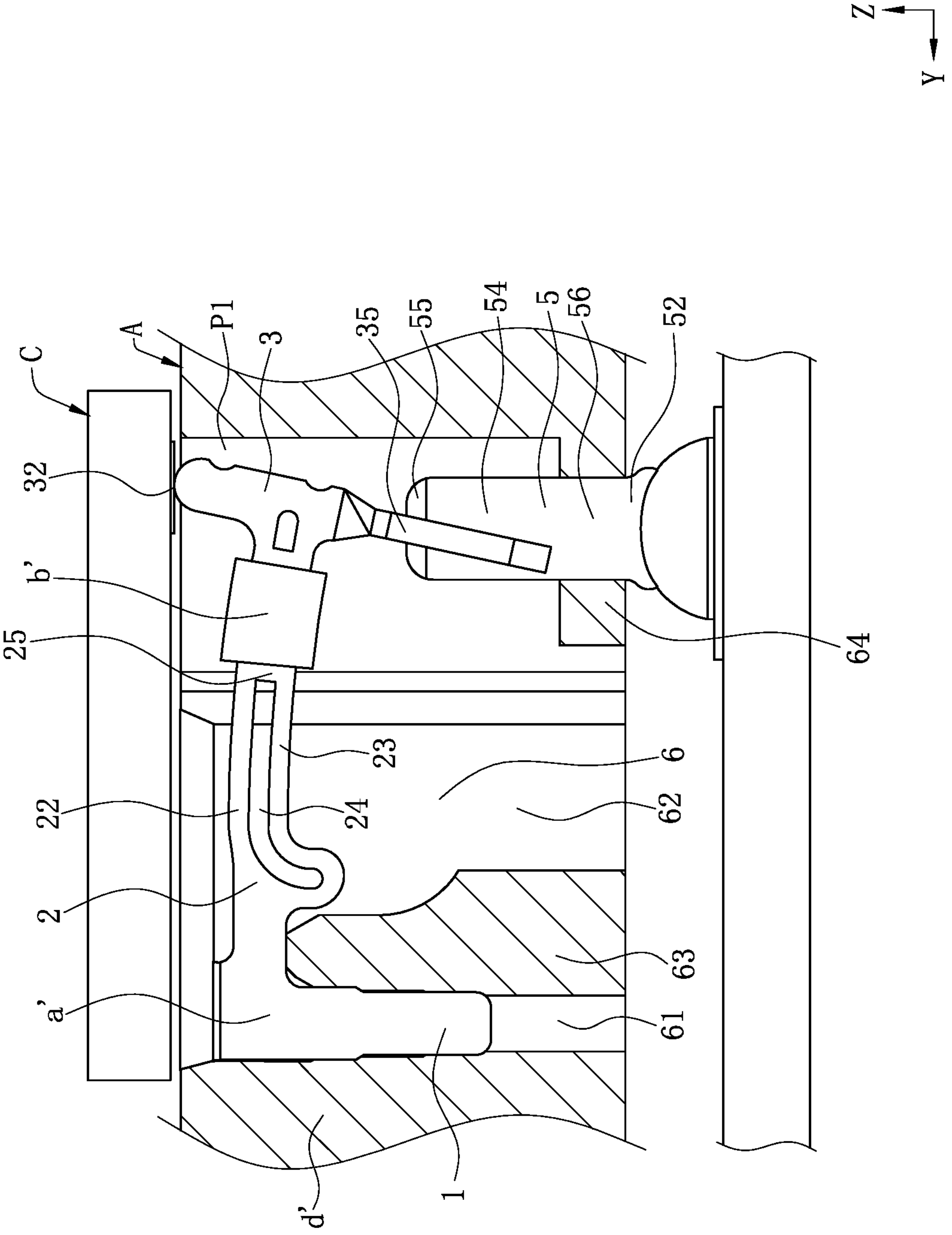
FIG. 25 is a sectional view of the electrical connector and the method of manufacturing the same when the electrical connector is mated with the first electronic component and the second electronic component according to certain embodiments of the present invention.

As shown in FIG. 25 to FIG. 26, when the terminal a' is mated with the first electronic component B and the second electronic component C, the elastic arm 2 is pressed, such that the floating contact portion 3 moves downward, such that the contact between the floating contact portion 3 and the conducting portion 5 is more stable (and in other embodiments, it is possible that before the terminal a' is mated with the first electronic component B and the second electronic component C, the floating contact portion 3 and the conducting portion 5 are provided at an interval. That is, the floating contact portion 3 and the conducting portion 5 are not in contact and not electrically connected. When the terminal a' is mated with the first electronic component B and the second electronic component C, the elastic arm 2 is pressed, and the floating contact portion 3 moves downward, such that the two first guiding portions 34 and the two second guiding portions 55 are mated with each other, the conducting portion 5 is located between the two clamping portions 35 and protrudes into the opening 351, and the floating contact portion 3 and the conducting portion 5 are in contact with each other).

Figure 27:
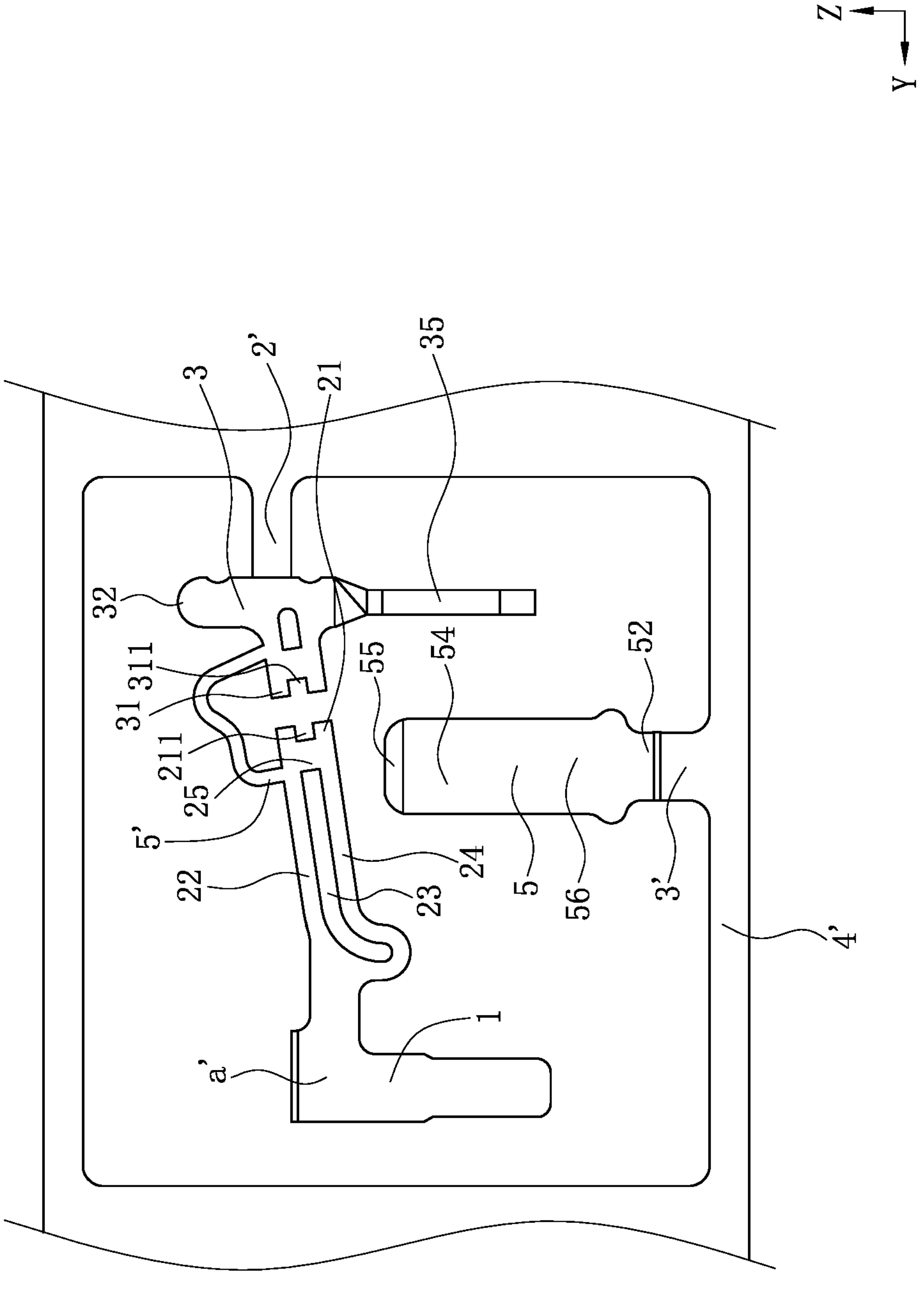
FIG. 27 is a schematic view of cutting and forming the terminal and the strip of an electrical connector and a method of manufacturing the same according to an eighth embodiment of the present invention.

FIG. 23 to FIG. 29 show an electrical connector A and a method of manufacturing the electrical connector A according to an eighth embodiment of the present invention, which are different from the electrical connector A and the method of manufacturing the electrical connector A according to the seventh embodiment of the present invention in that, with the remaining structures and connection relationships being identical to those of the seventh embodiment: as shown in FIG. 27, in the step 1, when forming the strip by punching and cutting, the strip formed by punching and cutting include an extending section 2', a connecting section 3' and a first sub strip 5', without forming the base strip 1' by punching. The first sub strip 5' is substantially located above the elastic arm 2. One end of the first sub strip 5' is connected to the elastic arm 2, and another end thereof is connected to the floating contact portion 3.

Figure 28:
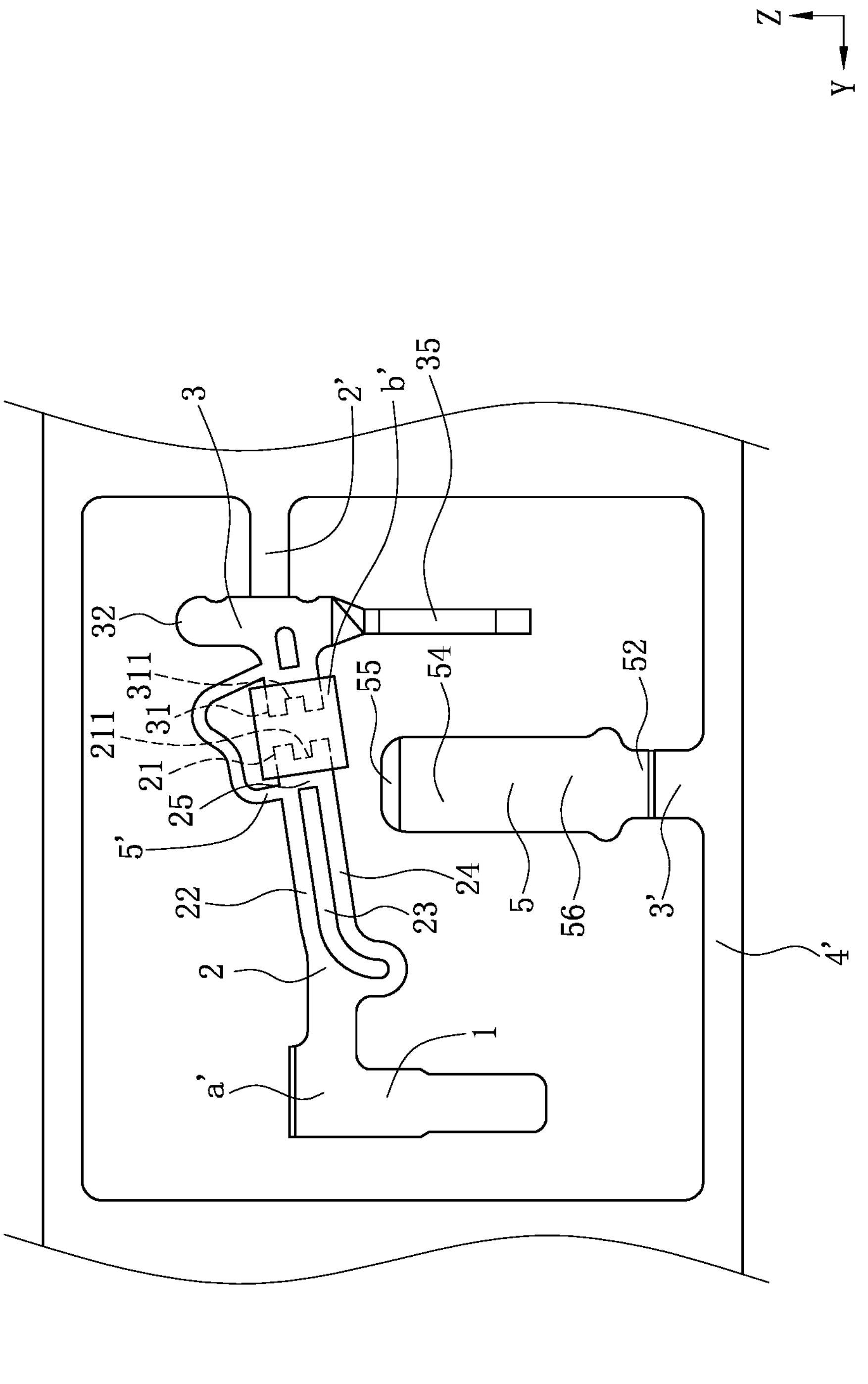
FIG. 28 is a schematic view of insert-molding the insulating block and the plastic block of the electrical connector and the method of manufacturing the same according to the eighth embodiment of the present invention.

As shown in FIG. 28, in the step 2, when insert-molding the insulating block b', along the left-right direction, the insulating block b' is located between a connecting location of the first sub strip 5' and the elastic arm 2 and a connecting location of the first sub strip 5' and the floating contact portion 3. That is, the insulating block b' does not extend beyond the connecting location of the first sub strip 5' and the elastic arm 2, and the insulating block b' does not extend beyond the connecting location of the first sub strip 5' and the floating contact portion 3.

Figure 29:
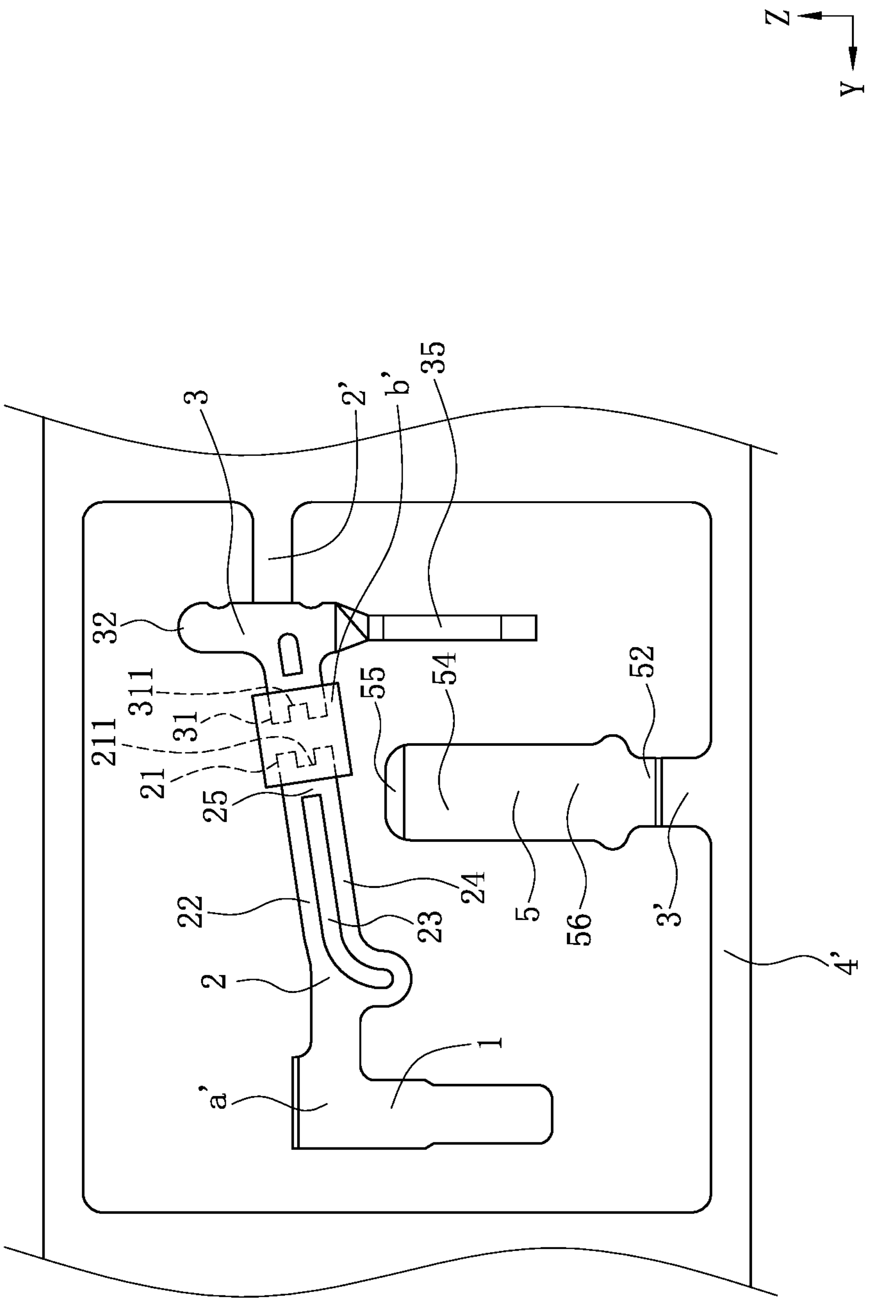
FIG. 29 is a schematic view of the terminal being connected to the extending section and the conducting section of an electrical connector and a method of manufacturing the same according to the eighth embodiment of the present invention.

As shown in FIG. 29, in the step 3, after insert-molding the insulating block b', and prior to cutting the extending section 2' and the connecting section 3', the first sub strip 5' is cut, such that the floating contact portion 3 and the elastic arm 2 are indirectly connected through the insulating block b'. In other words, after cutting the first sub strip 5', the floating contact portion 3 and the elastic arm 2 are not electrically connected.

Figure 24:
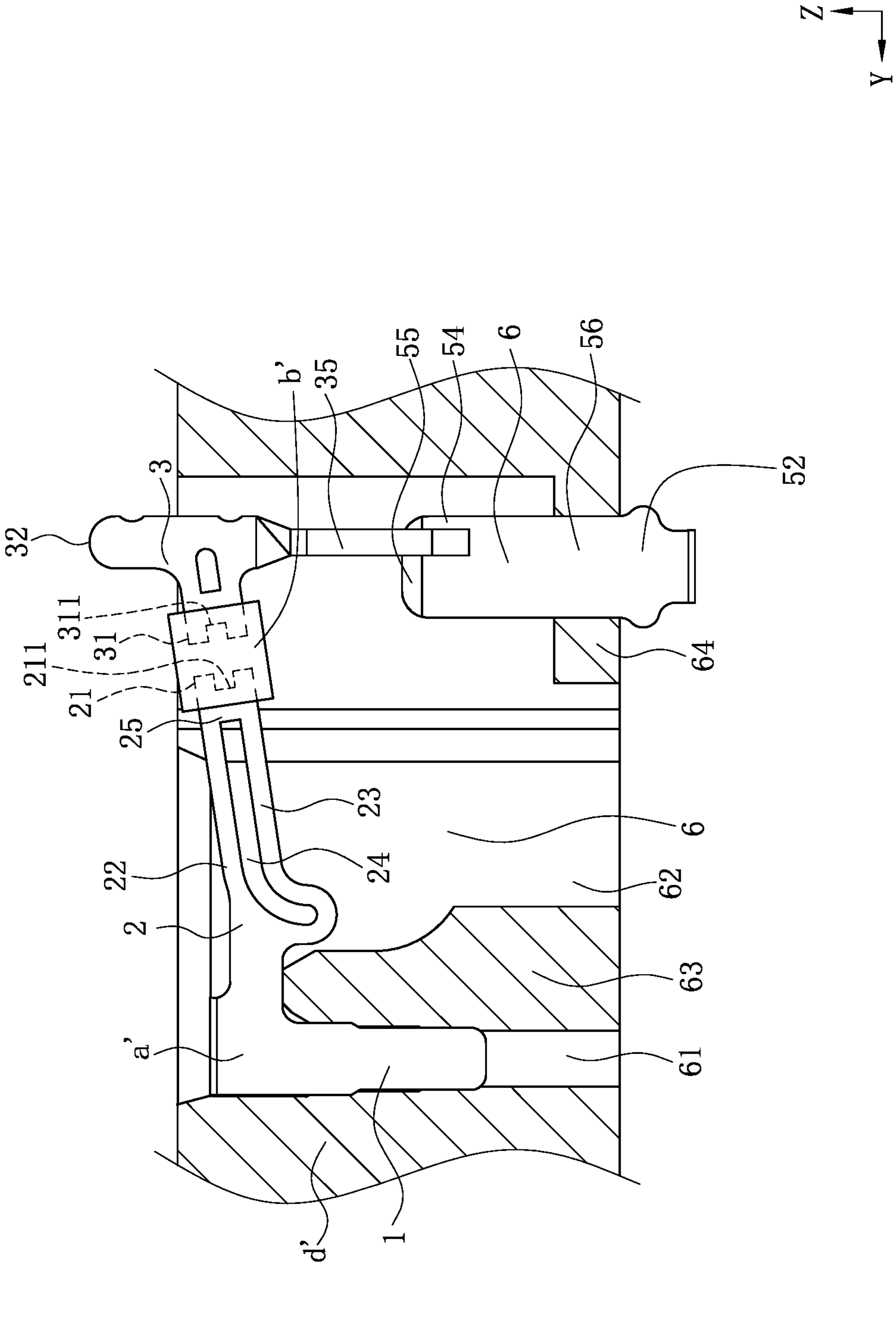
FIG. 24 is a sectional view of the terminal being installed in the accommodating slot of the electrical connector and the method of manufacturing the same according to certain embodiments of the present invention.

As shown in FIG. 23, in the step 4, then the extending section 2' and the connecting section 3' are cut, such that the terminal a' is not connected to any strip. As shown in FIG. 24, in the step 5, the terminal a' not being connected to any strip is then inserted into the accommodating slot 6 (and in other embodiments, it is possible to firstly insert the terminal a' being connected to the extending section 2' and the connecting section 3' into the accommodating slot 6, and then cut the extending section 2' and the connecting section 3').

Figure 30:
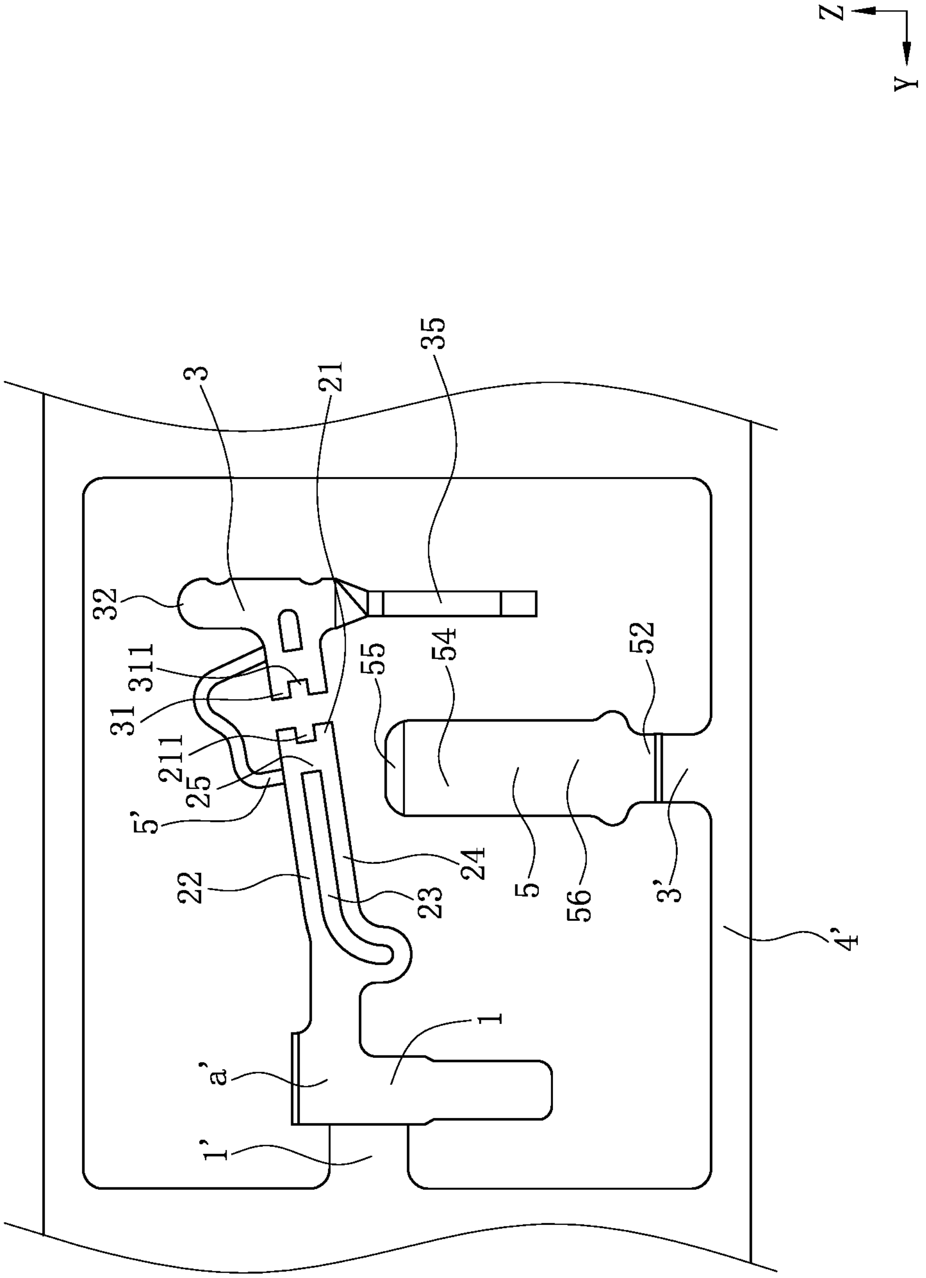
FIG. 30 is a schematic view of cutting and forming the terminal and the strip of an electrical connector and a method of manufacturing the same according to a ninth embodiment of the present invention.

FIG. 23 to FIG. 26 and FIG. 30 show an electrical connector A and a method of manufacturing the electrical connector A according to a ninth embodiment of the present invention, which are different from the electrical connector A and the method of manufacturing the electrical connector A according to the eighth embodiment of the present invention in that, with the remaining structures and connection relationships being identical to those of the eighth embodiment: as shown in FIG. 30, in the step 1, when forming the strip by punching and cutting, the strip formed by punching and cutting include a base strip 1', a connecting section 3' and a first sub strip 5', without forming the extending section 2' by punching. The base strip 1' is located at one side of the fixing portion 1 away from the elastic arm 2. That is, the base strip 1' is located at a left side of the fixing portion 1 (and in other embodiments, the base strip 1' may be located at other locations of the fixing portion 1, such as above or below the fixing portion 1).

As shown in FIG. 23, in the step 4, after cutting the first sub strip 5', the base strip 1' and the connecting section 3' are cut, such that the terminal a' is not connected to any strip.

Figure 31:
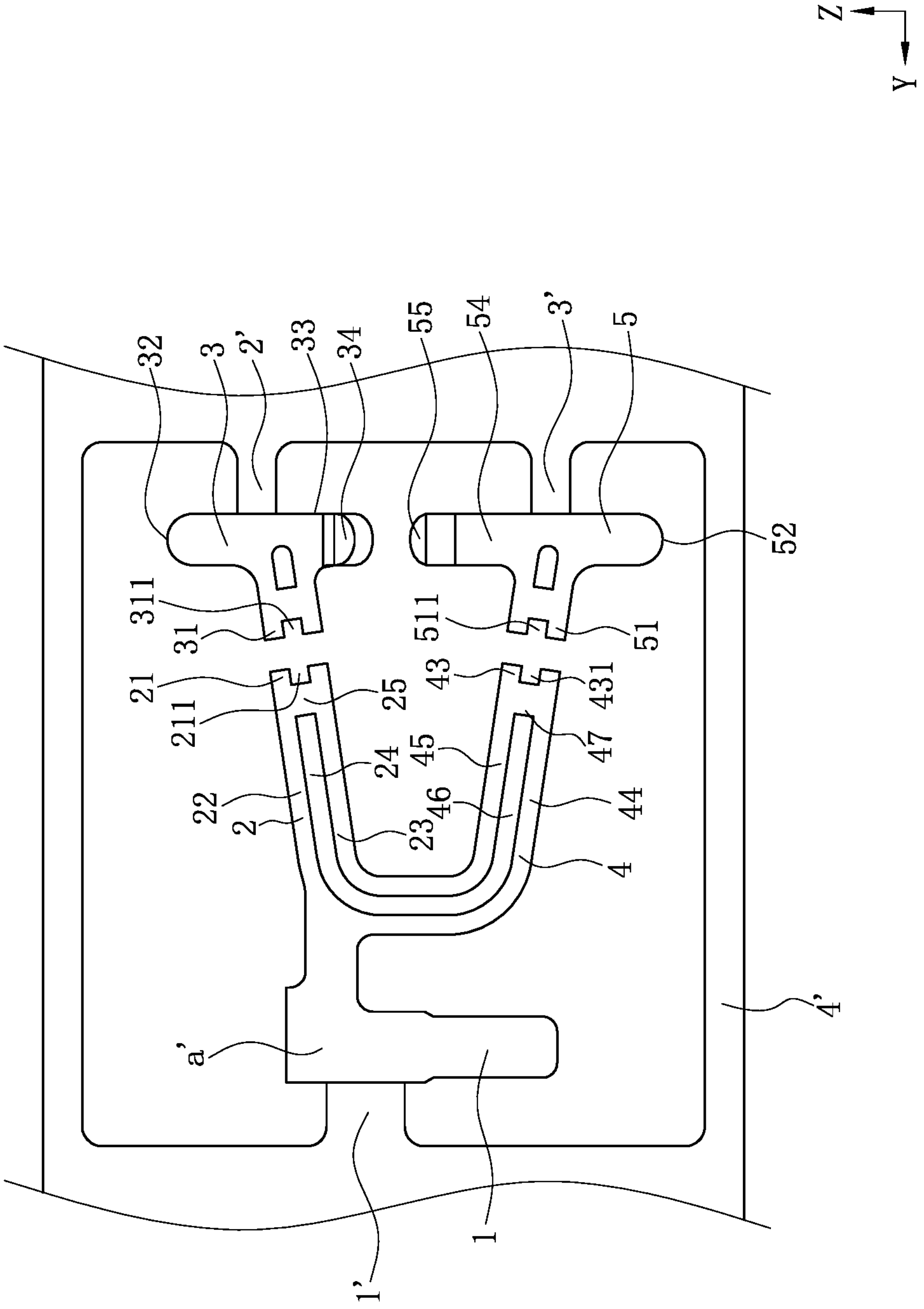
FIG. 31 is a schematic view of cutting and forming the terminal and the strip of an electrical connector and a method of manufacturing the same according to a tenth embodiment and a seventeenth embodiment of the present invention.

FIG. 31 to FIG. 35 show an electrical connector A and a method of manufacturing the electrical connector A according to a tenth embodiment of the present invention, which are different from the electrical connector A and the method of manufacturing the electrical connector A according to the fourth embodiment of the present invention in that, with the remaining structures and connection relationships being identical to those of the fourth embodiment: as shown in FIG. 31, in the step H1 (corresponding to the step 1 and the step 3 of claim 1), firstly, forming the terminals a' and the strip by punching and cutting. Each terminal a' is provided with a fixing portion 1, an elastic arm 2, a floating contact portion 3, a deformation arm 4 and a conducting portion 5. Along the left-right direction, the deformation arm 4 is located between the fixing portion 1 and the conducting portion 5. One end of the deformation arm 4 adjacent to the fixing portion 1 bends upward to be connected to the elastic arm 2, and one end of the deformation arm 4 away from the fixing portion 1 and the conducting portion 5 are provided to be separate.

As shown in FIG. 31, the deformation arm 4 is provided with a third elastic portion 44 and a fourth elastic portion 45 located at an inner side of the third elastic portion 44. An upper end of the third elastic portion 44 is connected to a lower end of the first elastic portion 22, and an upper end of the fourth elastic portion 45 is connected to a lower end of the second elastic portion 23. The widths of the first elastic portion 22, the second elastic portion 23, the third elastic portion 44 and the fourth elastic portion 45 are substantially equal, and the thicknesses of the first elastic portion 22, the second elastic portion 23, the third elastic portion 44 and the fourth elastic portion 45 are substantially equal. The deformation arm 4 is further provided with a connecting slot 46. The connecting slot 46 is located between the third elastic portion 44 and the fourth elastic portion 45, and an upper end of the connecting slot 46 is in communication with the elongated slot 24. The connecting slot 46 and the elongated slot 24 have similar functions. The connecting slot 46 allows the third elastic portion 44 or the fourth elastic portion 45 to deform relative to the fourth elastic portion 45 or the third elastic portion 44, further enhancing the elasticity of the deformation arm 4.

As shown in FIG. 31, the deformation arm 4 further has a stop portion 47. An upper end of the stop portion 47 is connected to the fourth elastic portion 45, and a lower end of the stop portion 47 is connected to the third elastic portion 44. The deformation arm 4 further has the third embedded portion 43, and the third embedded portion 43 is provided with a third through slot 431 runs through the third embedded portion 43 (and in other embodiments, there may be two or three third through slots 431). The stop portion 47 is located between the connecting slot 46 and the third through slot 431 to separate the connecting slot 46 and the third through slot 431.

As shown in FIG. 31, the upper end of the conducting portion 5 is provided with the second guiding portion 55 corresponding to the first guiding portion 34. The second guiding portion 55 is formed by bending, and the bending direction of the second guiding portion 55 is opposite to the bending direction of the first guiding portion 34. The conducting portion 5 is further provided with the second contact surface 54 corresponding to the first contact surface 33. The second contact surface 54 is located below the second guiding portion 55 to be in contact with the first contact surface 33.

As shown in FIG. 31, the lower end of the conducting portion 5 further has the lower contact portion 52, and the lower contact portion 52 is exposed downward to the accommodating slot 6 to abut the first electronic component B. One side of the conducting portion 5 adjacent to the deformation arm 4 further has the fourth embedded portion 51 extending. The fourth embedded portion 51 is provided with a fourth through slot 511 running through the fourth embedded portion 51 (and in other embodiments, there may be two or three fourth through slots 511).

Figure 32:
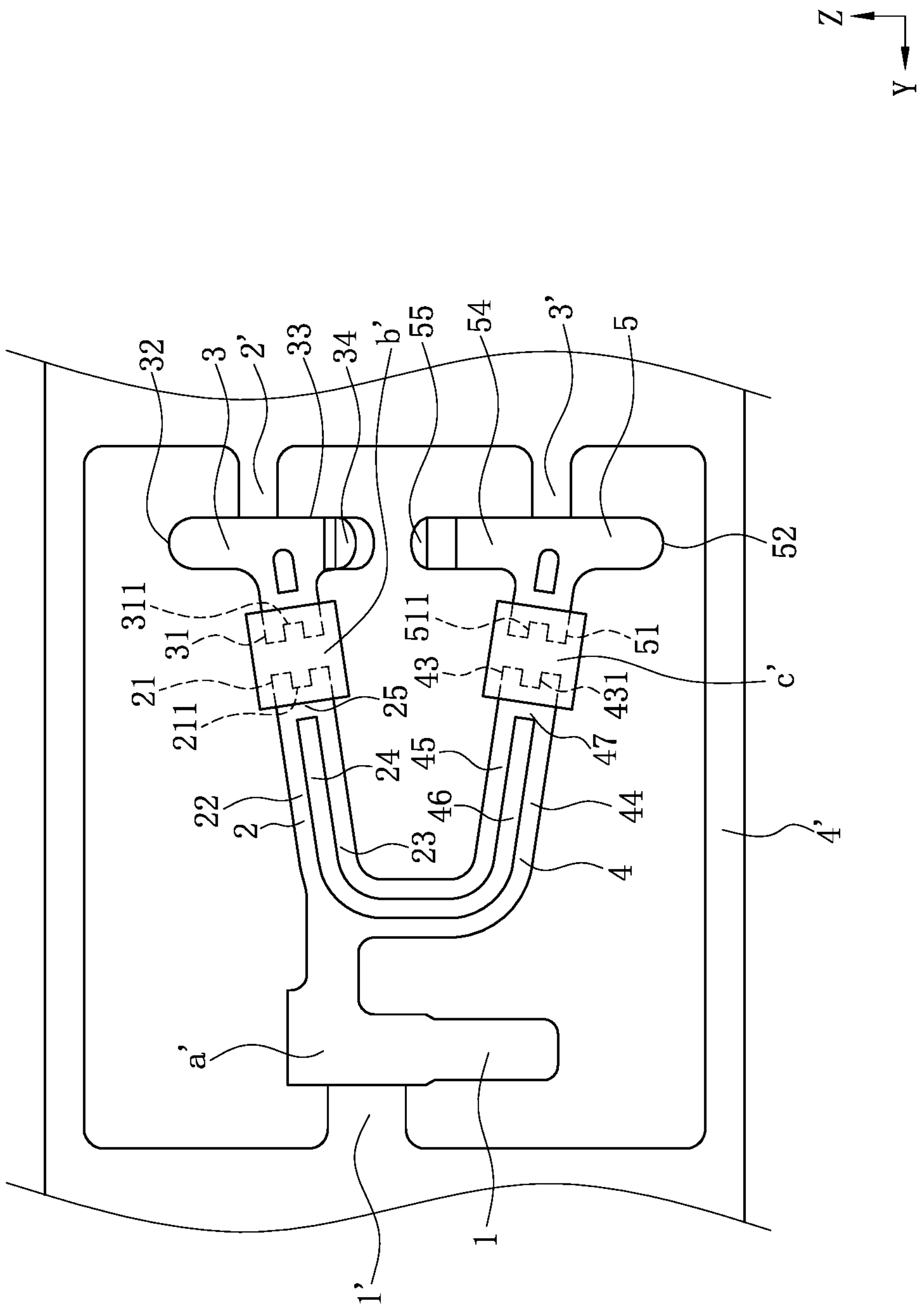
FIG. 32 is a schematic view of insert-molding the insulating block and the plastic block of the electrical connector and the method of manufacturing the same according to the tenth embodiment and the seventeenth embodiment of the present invention.

As shown in FIG. 32, in the step H2 (corresponding to the step 2 of claim 1): simultaneously when insert-molding the insulating block b', the plastic block c' is further insert-molded, such that the plastic block c' connects the deformation arm 4 and the conducting portion 5. Specifically, the plastic block c' is insert-molded between the deformation arm 4 and the conducting portion 5, such that the plastic block c' covers outside the third embedded portion 43 and a portion of the stop portion 47 (and in other embodiments, the plastic block c' may cover outside the whole stop portion 47). Portion of the plastic material of the plastic block c' pass through the third through slots 431, such that there is a strong bonding force between the plastic block c' and the deformation arm 4. The stop portion 47 may stop the plastic material of the plastic block c' from flowing into the connecting slot 46. The plastic block c' further covers outside the fourth embedded portion 51, and portions of the plastic material of the plastic block c' pass through the fourth through slots 511, such that there is a strong bonding force between the plastic block c' and the conducting portion 5.

Figure 33:
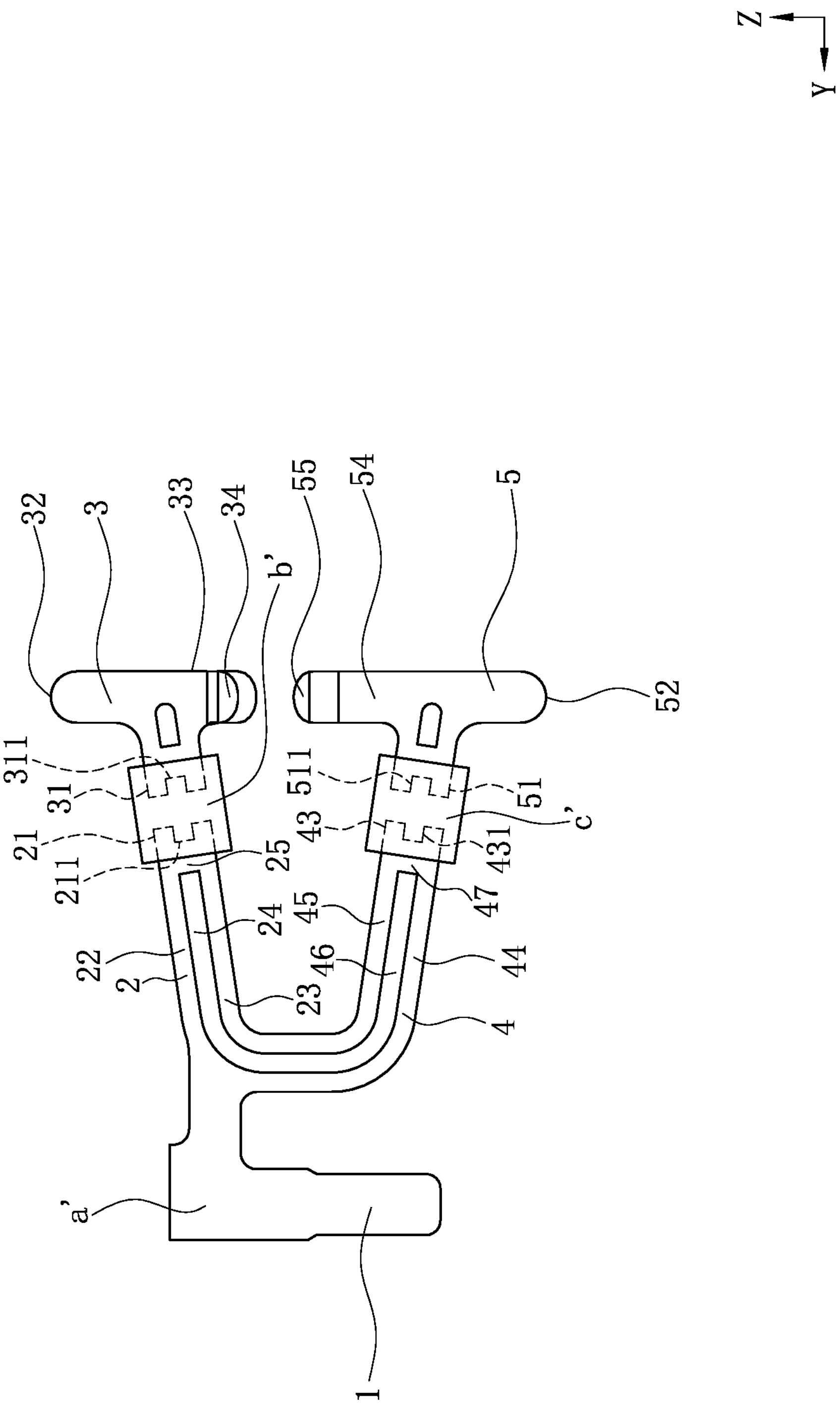
FIG. 33 is a schematic view of the terminal of the electrical connector and the method of manufacturing the same according to certain embodiments of the present invention.

As shown in FIG. 33, in the step H3 (corresponding to the step 4 of claim 1): the base strip 1', the extending section 2' and the connecting section 3' are cut, such that the terminal a' is not connected to any strip.

Figure 34:
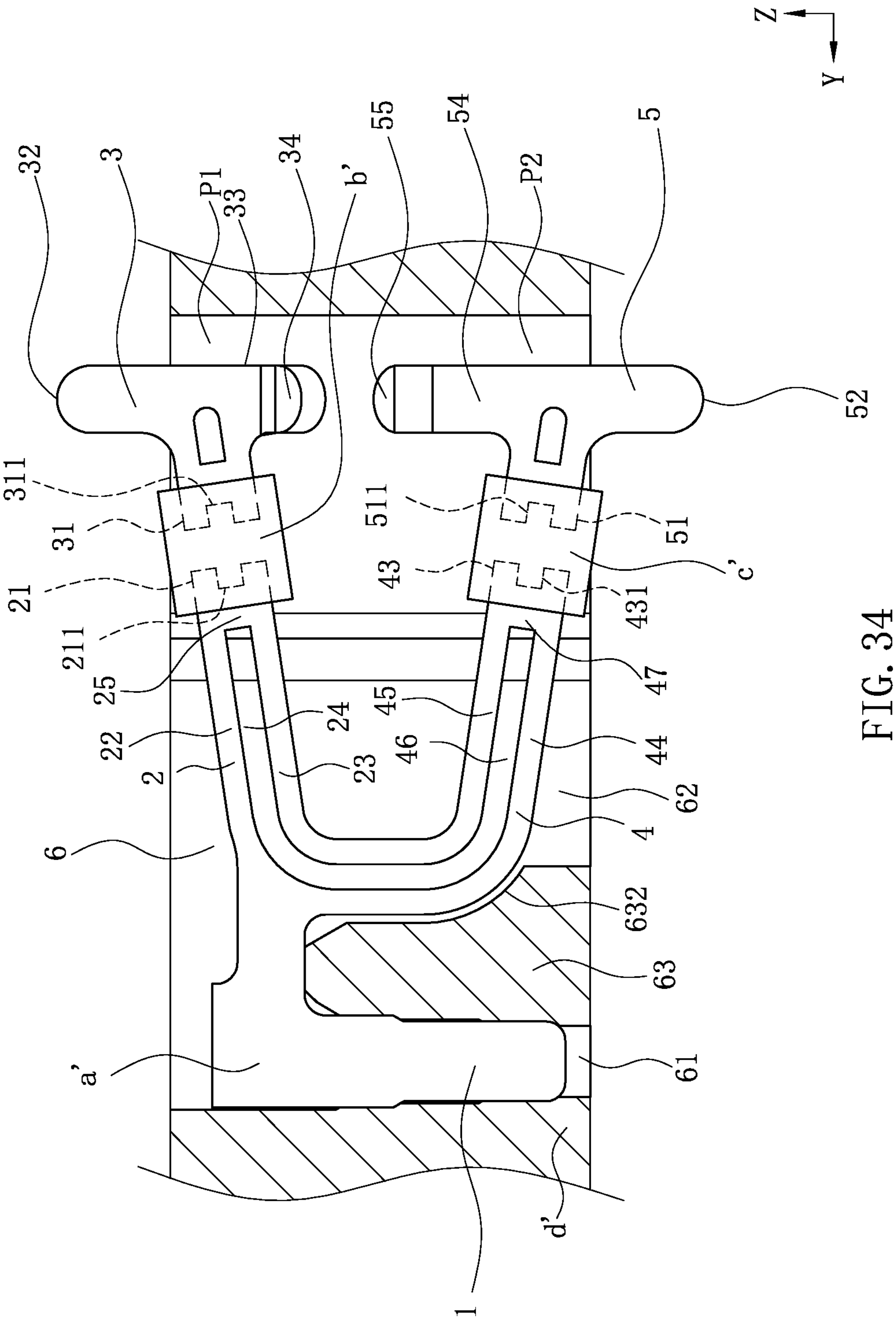
FIG. 34 is a sectional view of the terminal being installed in the accommodating slot of the electrical connector and the method of manufacturing the same according to certain embodiments of the present invention.

As shown in FIG. 34, in the step H4 (corresponding to the step 5 of claim 1), after cutting the base strip 1', the extending section 2' and the connecting section 3', the insulating body d' is further provided. The positioning post 63 in the accommodating slot 6 is further provided with a curve-shaped supporting portion 632 corresponding to the deformation arm 4, and the curve-shaped supporting portion 632 is used to support the deformation arm 4. The receiving cavity 62 is not provided with the retaining portion 64. The conducting portion 5 is connected to the deformation arm 4 through the plastic block c'. The second gap P2 exists between one side of the conducting portion 5 away from the deformation arm 4 and the inner wall surface of the accommodating slot 6, and the second gap P2 is reserved for the conducting portion 5.

Figure 35:
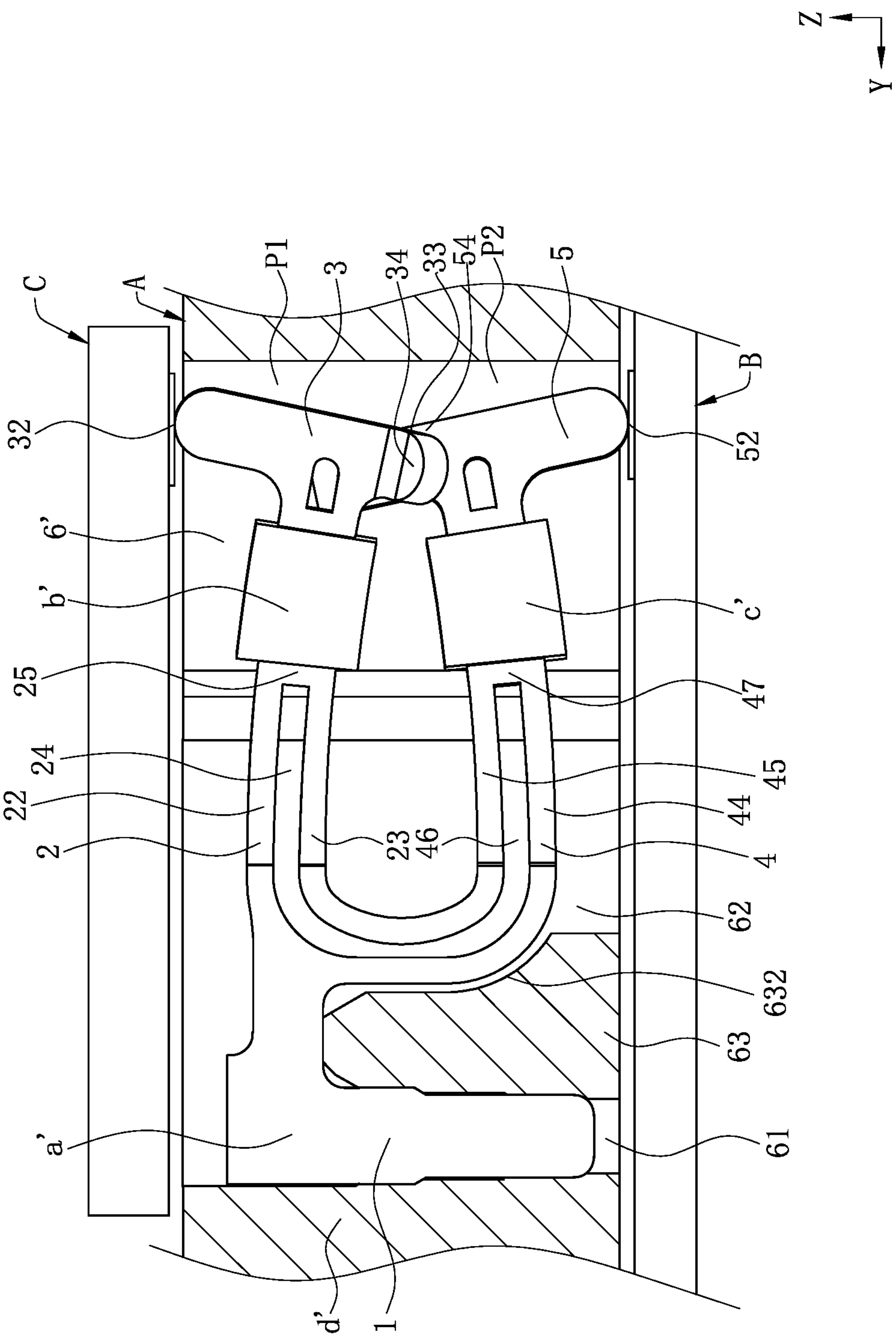
FIG. 35 is a sectional view of the electrical connector and the method of manufacturing the same when the electrical connector is mated with the first electronic component and the second electronic component according to certain embodiments of the present invention.

As shown in FIG. 35, when manufacturing of the electrical connector A is complete and the electrical connector A is mated with the first electronic component B and the second electronic component C, the lower contact portion 52 is exposed downward to a lower surface of the accommodating slot 6 and is electrically connected to the first electronic component B, and the conducting portion 5 may deflect along a counter-clockwise direction after being pressed and enter the second gap P2. Further, the deformation arm 4 is given a force to generate an elastic deformation, thus driving the conducting portion 5 to move upward through the plastic block c'. Thus, the first contact surface 33 of the floating contact portion 3 and the second contact surface 54 of the conducting portion 5 are in direct contact.

Figure 36:
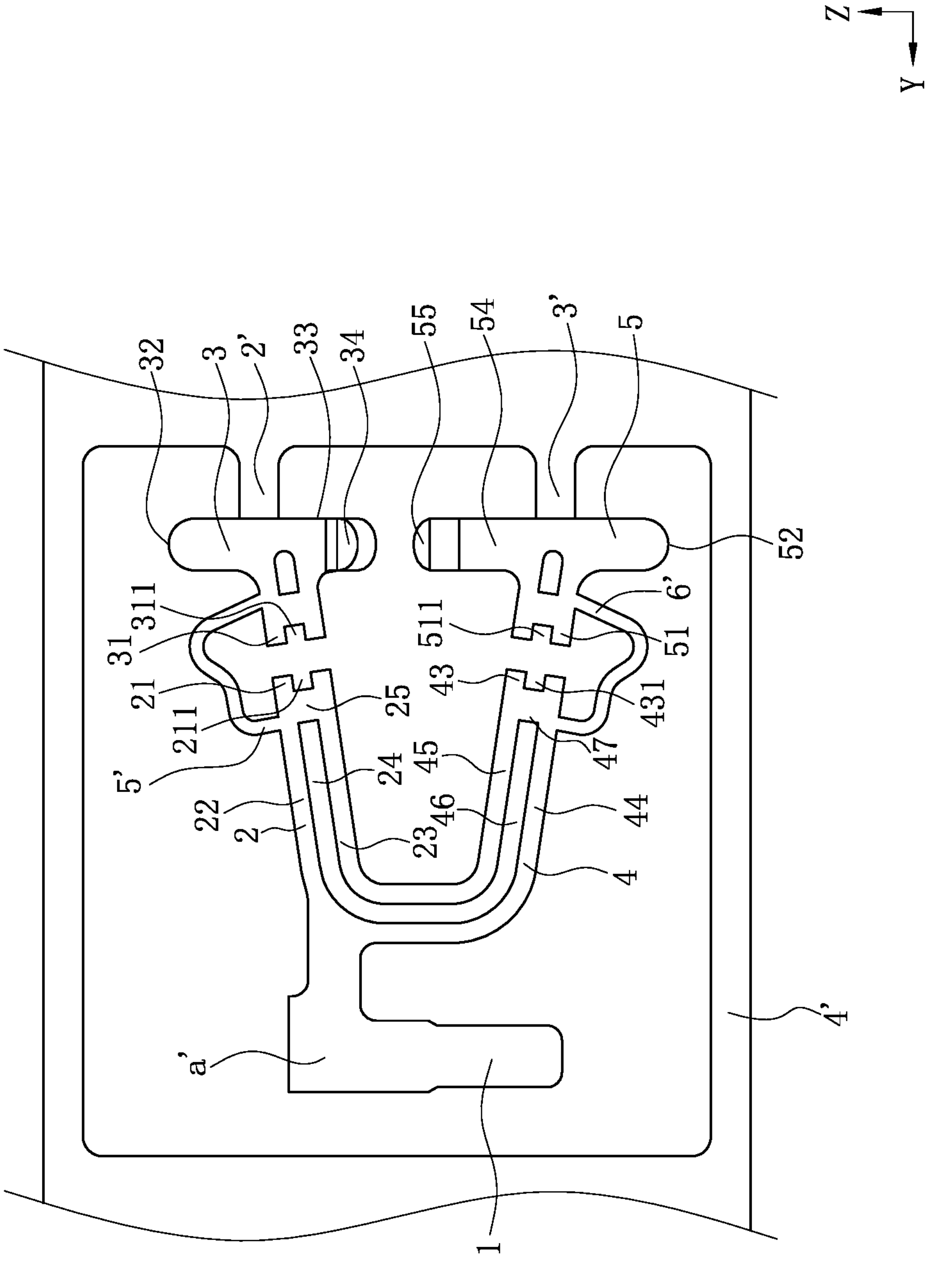
FIG. 36 is a schematic view of cutting and forming the terminal and the strip of an electrical connector and a method of manufacturing the same according to an eleventh embodiment of the present invention.

FIG. 33 to FIG. 38 show an electrical connector A and a method of manufacturing the electrical connector A according to an eleventh embodiment of the present invention, which are different from the electrical connector A and the method of manufacturing the electrical connector A according to the tenth embodiment of the present invention in that, with the remaining structures and connection relationships being identical to those of the tenth embodiment: as shown in FIG. 36, in the step 1, when forming the strip by punching and cutting, the strip formed by punching and cutting include an extending section 2', a connecting section 3', a first sub strip 5' and a second sub strip 6', without forming the base strip 1' by punching. The first sub strip 5' is substantially located above the elastic arm 2. One end of the first sub strip 5' is connected to the elastic arm 2, and another end thereof is connected to the floating contact portion 3. The second sub strip 6' is substantially located below the deformation arm 4. One end of the second sub strip 6' is connected to the deformation arm 4, and another end thereof is connected to the conducting portion 5.

Figure 37:
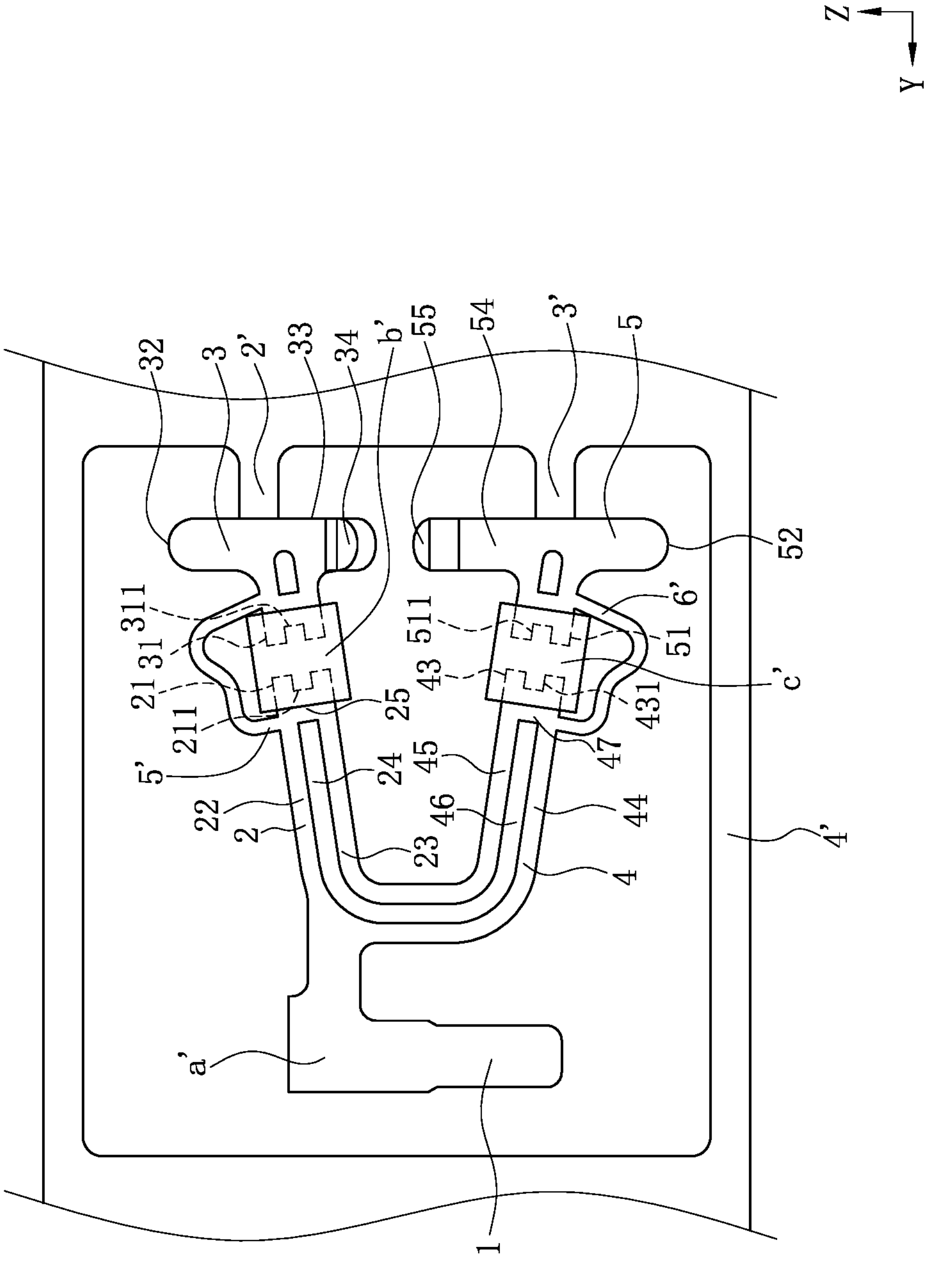
FIG. 37 is a schematic view of insert-molding the insulating block and the plastic block of the electrical connector and the method of manufacturing the same according to the eleventh embodiment of the present invention.

As shown in FIG. 37, in the step 2, when insert-molding the insulating block b' and the plastic block c', along the left-right direction, the insulating block b' is located between a connecting location of the first sub strip 5' and the elastic arm 2 and a connecting location of the first sub strip 5' and the floating contact portion 3. That is, the insulating block b' does not extend beyond the connecting location of the first sub strip 5' and the elastic arm 2, and the insulating block b' does not extend beyond the connecting location of the first sub strip 5' and the floating contact portion 3. Along the left-right direction, the plastic block c' is located between a connecting location of the second sub strip 6' and the deformation arm 4 and a connecting location of the second sub strip 6' and the conducting portion 5. That is, the plastic block c' does not extend beyond the connecting location of the second sub strip 6' and the deformation arm 4, and the plastic block c' does not extend beyond the connecting location of the second sub strip 6' and the conducting portion 5.

Figure 38:
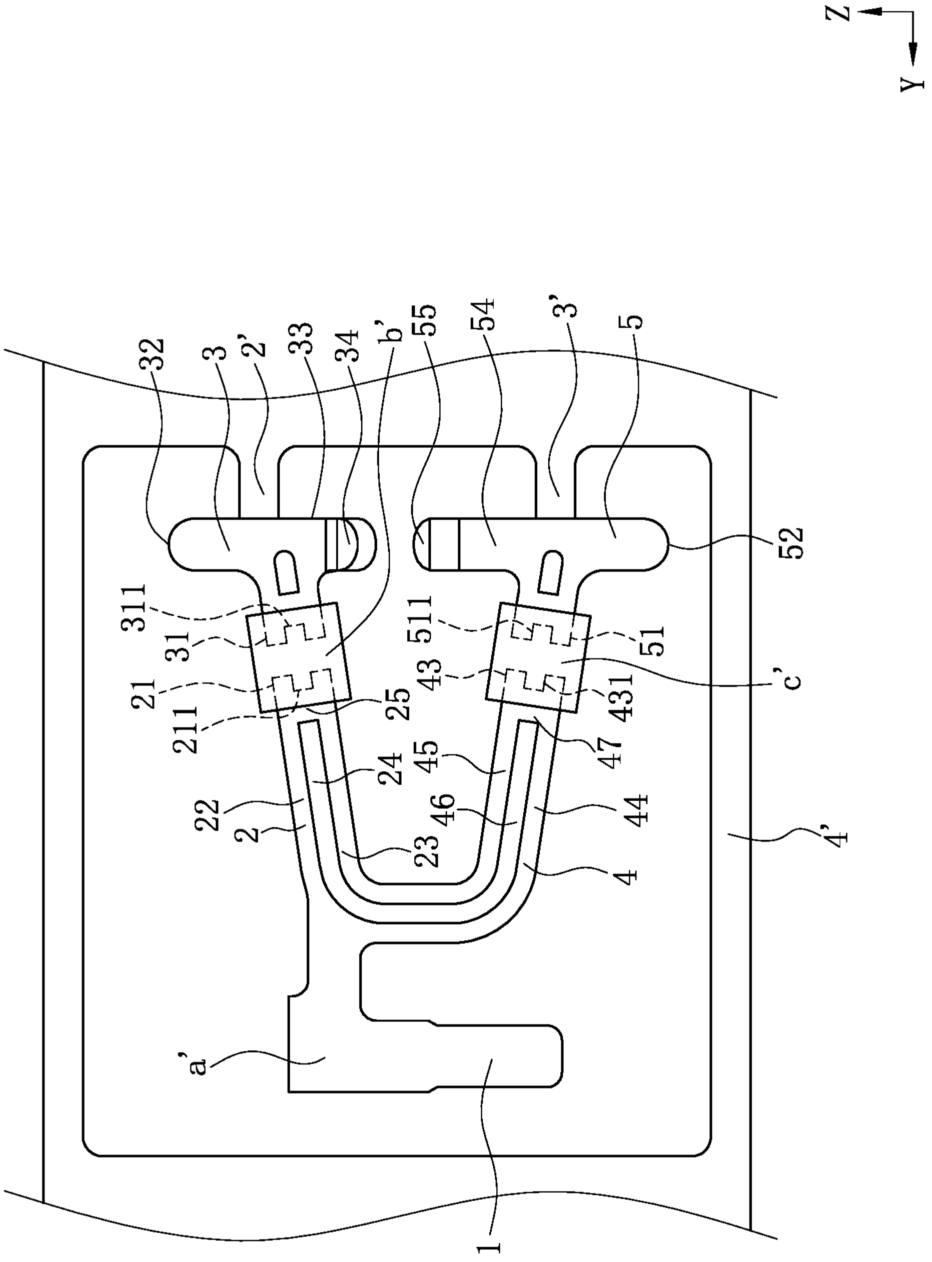
FIG. 38 is a schematic view of the terminal being connected to the extending section and the conducting section of an electrical connector and a method of manufacturing the same according to the eleventh embodiment of the present invention.

As shown in FIG. 38, in the step 3, after insert-molding the insulating block b', and prior to cutting the extending section 2' and the connecting section 3', the first sub strip 5' and the second sub strip 6' are cut, such that the floating contact portion 3 and the elastic arm 2 are indirectly connected through the insulating block b'. In other words, after cutting the first sub strip 5', the floating contact portion 3 and the elastic arm 2 are not electrically connected. The conducting portion 5 and the deformation arm 4 are indirectly connected through the plastic block c'. In other words, after cutting the second sub strip 6', the conducting portion 5 and the deformation arm 4 are not electrically connected.

As shown in FIG. 33, in the step 4, the extending section 2' and the connecting section 3' are cut, such that the terminal a' is not connected to any strip.

As shown in FIG. 34, in the step 5, the terminal a' not being connected to any strip is then inserted into the accommodating slot 6 (and in other embodiments, it is possible to firstly insert the terminal a' being connected to the extending section 2' and the connecting section 3' into the accommodating slot 6, and then cut the extending section 2' and the connecting section 3').

Figure 39:
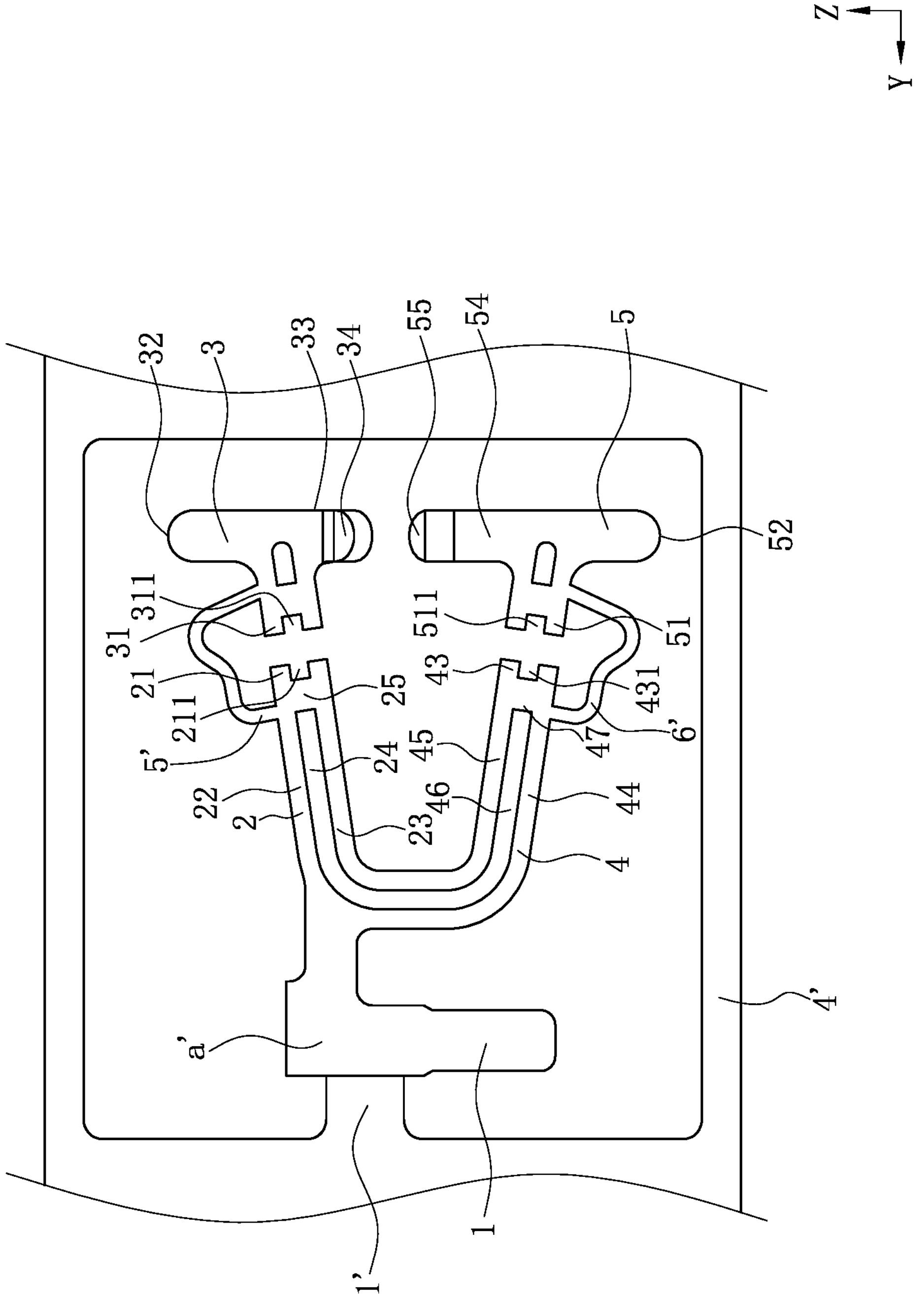
FIG. 39 is a schematic view of cutting and forming the terminal and the strip of an electrical connector and a method of manufacturing the same according to a twelfth embodiment of the present invention.

FIG. 33, FIG. 34, FIG. 35 and FIG. 39 show an electrical connector A and a method of manufacturing the electrical connector A according to a twelfth embodiment of the present invention, which are different from the electrical connector A and the method of manufacturing the electrical connector A according to the eleventh embodiment of the present invention in that, with the remaining structures and connection relationships being identical to those of the eleventh embodiment: as shown in FIG. 39, in the step 1, when forming the strip by punching and cutting, the strip formed by punching and cutting include a base strip 1', a first sub strip 5' and a second sub strip 6', without forming the extending section 2' and the connecting section 3' by punching. The base strip 1' is located at one side of the fixing portion 1 away from the elastic arm 2. That is, the base strip 1' is located at a left side of the fixing portion 1 (and in other embodiments, the base strip 1' may be located at other locations of the fixing portion 1, such as above or below the fixing portion 1).

As shown in FIG. 33, in the step 4, after cutting the first sub strip 5' and the second sub strip 6', the base strip 1' is cut, such that the terminal a' is not connected to any strip.

Figure 40:
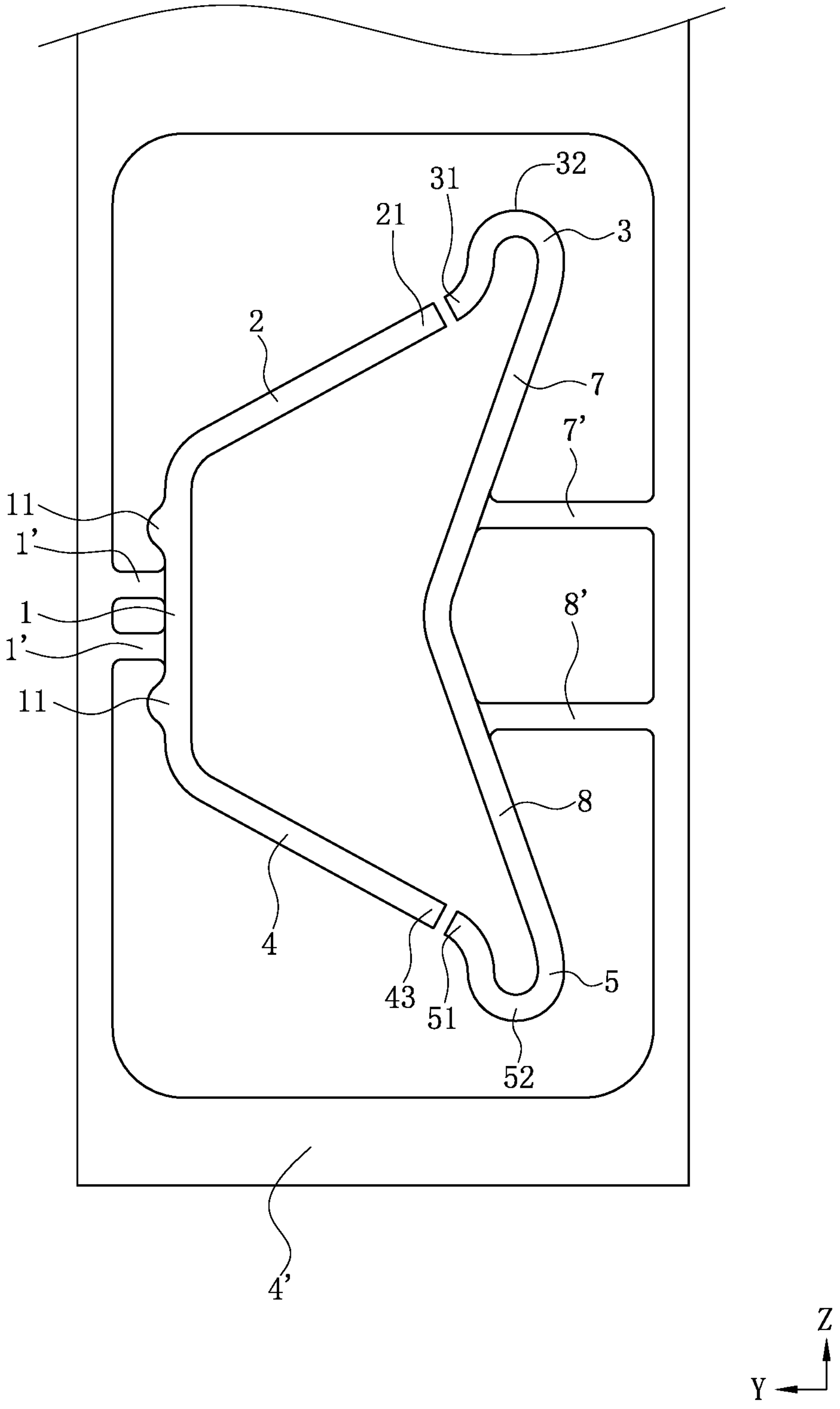
FIG. 40 is a schematic view of cutting and forming the terminal and the strip of an electrical connector and a method of manufacturing the same according to a thirteenth embodiment of the present invention.

FIG. 40 to FIG. 44 show an electrical connector A and a method of manufacturing the electrical connector A according to a thirteenth embodiment of the present invention, which are different from the electrical connector A and the method of manufacturing the electrical connector A according to the first embodiment of the present invention in that, with the remaining structures and connection relationships being identical to those of the first embodiment: as shown in FIG. 40, in the step J1 (corresponding to the step 1 and the step 3 of claim 1): forming the terminals a' and the strip by punching and cutting. Each terminal a' is provided with a fixing portion 1, an elastic arm 2, a floating contact portion 3, a deformation arm 4, a conducting portion 5, a first connecting portion 7 and a second connecting portion 8. The floating contact portion 3, the first connecting portion 7, the second connecting portion 8 and the conducting portion 5 are integrally provided. That is, the four components are integrally connected. The second connecting portion 8 is located below the first connecting portion 7 and is connected to the first connecting portion 7. An upper end of the first connecting portion 7 is connected to the lower end of the floating contact portion 3, and a lower end of the second connecting portion 8 is connected to the upper end of the conducting portion 5. The first connecting portion 7 and the second connecting portion 8 are provided to form an angle therebetween.

As shown in FIG. 40, one side of the fixing portion 1 away from the elastic arm 2 is protrudingly provided with two protruding portions 11, and the two protruding portions 11 are provided at an interval along the vertical direction.

As shown in FIG. 40, one end of the elastic arm 2 adjacent to the floating contact portion 3 is provided with the first embedded portion 21, and the first embedded portion 21 is not provided with the first through slot 211. The floating contact portion 3 is provided with the second embedded portion 31 corresponding to the first embedded portion 21, and the second embedded portion 31 is not provided with the second through slot 311. One end of the deformation arm 4 adjacent to the conducting portion 5 is provided with the third embedded portion 43, and the third embedded portion 43 is not provided with the third through slot 431. The conducting portion 5 is provided with the fourth embedded portion 51 corresponding to the third embedded portion 43, and the fourth embedded portion 51 is not provided with the fourth through slot 511.

As shown in FIG. 40, the strip formed by punching and cutting include two base strips 1', a first main strip 7' and a second main strip 8'. The two base strips 1' are located at one side of the fixing portion 1 away from the elastic arm 2 (and in other embodiments, the base strips 1' may be located at other locations of the fixing portion 1, such as above or below the fixing portion 1). One end of each base strip 1' adjacent to the fixing portion 1 is connected to the fixing portion 1, and the other end thereof is connected to the outer frame 4'. The first main strip 7' is located at one end of the first connecting portion 7 away from the elastic arm 2 (and in other embodiments, the first main strip 7' may be located at one end of the first connecting portion 7 adjacent to the elastic arm 2 or other locations). One end of the first main strip 7' adjacent to the first connecting portion 7 is connected to the first connecting portion 7, and another end thereof is connected to the outer frame 4'. The second main strip 8' is located at one end of the second connecting portion 8 away from the deformation arm 4 (and in other embodiments, the second main strip 8' may be located at one end of the second connecting portion 8 adjacent to the deformation arm 4 or other locations). One end of the second main strip 8' adjacent to the second connecting portion 8 is connected to the second connecting portion 8, and another end thereof is connected to the outer frame 4'.

Figure 41:
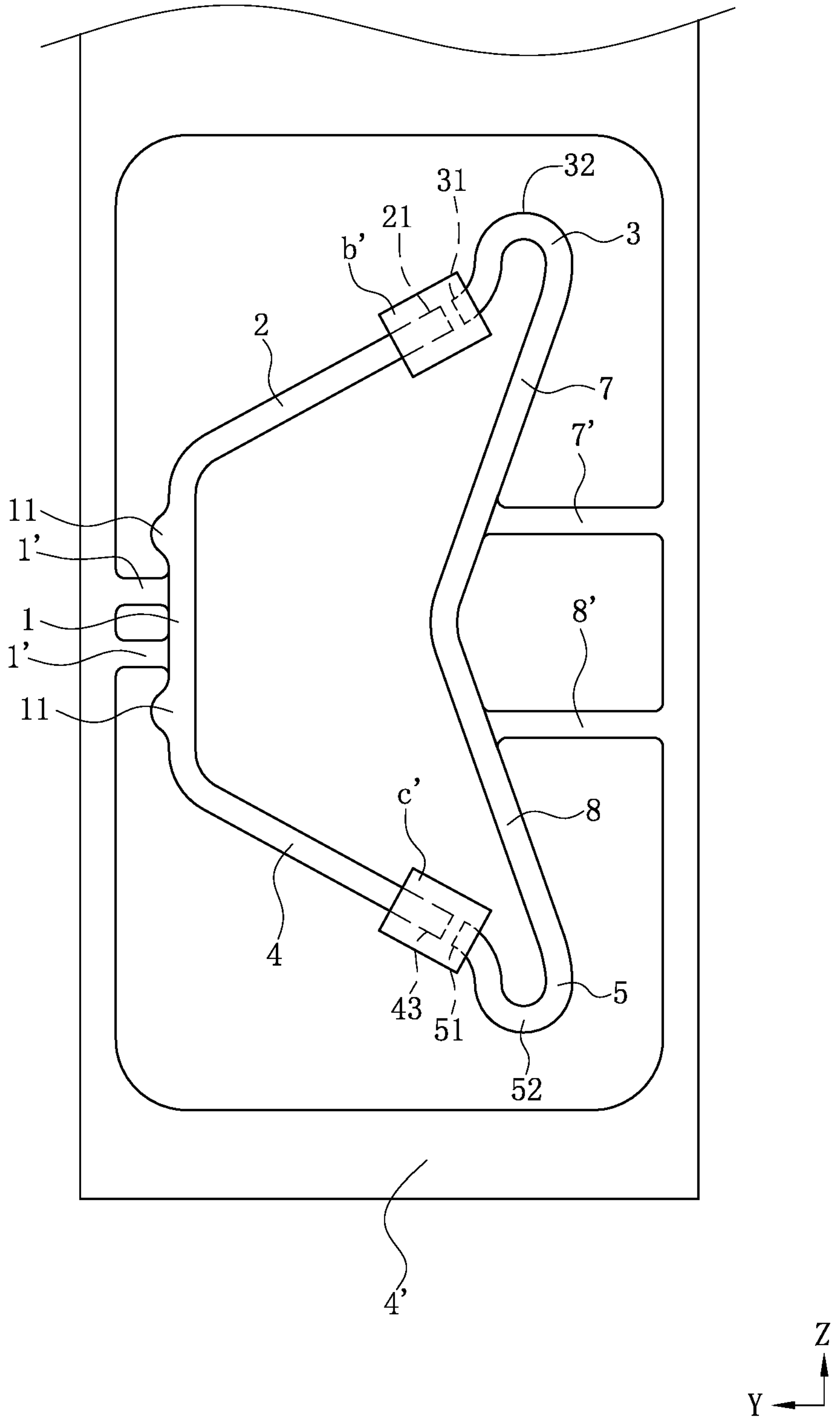
FIG. 41 is a schematic view of insert-molding the insulating block and the plastic block of the electrical connector and the method of manufacturing the same according to the thirteenth embodiment of the present invention.

As shown in FIG. 41, in the step J2 (corresponding to the step 2 of claim 1), the insulating block b' and the plastic block c' are insert-molded.

Figure 42:
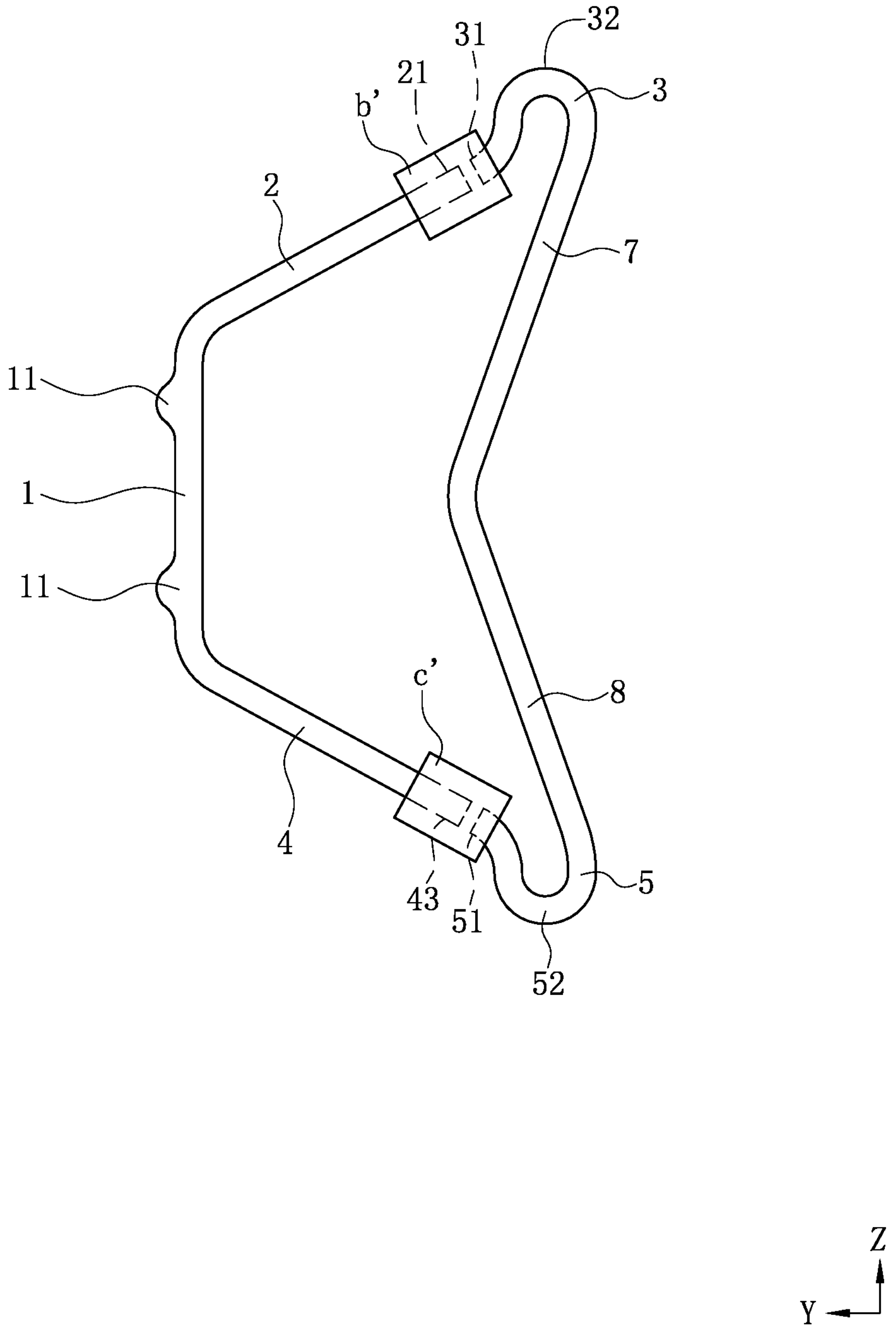
FIG. 42 is a schematic view of the terminal of the electrical connector and the method of manufacturing the same according to the thirteenth embodiment of the present invention.

As shown in FIG. 42, in the step J3 (corresponding to the step 4 of claim 1), after insert-molding the insulating block b' and the plastic block c', the two base strips 1' are cut, such that the two base strips 1' and the fixing portion 1 are separate; the first main strip 7' is cut, such that the first main strip 7' and the first connecting portion 7 are separate; and the second main strip 8' is cut, such that the second main strip 8' and the second connecting portion 8 are separate.

Figure 43:
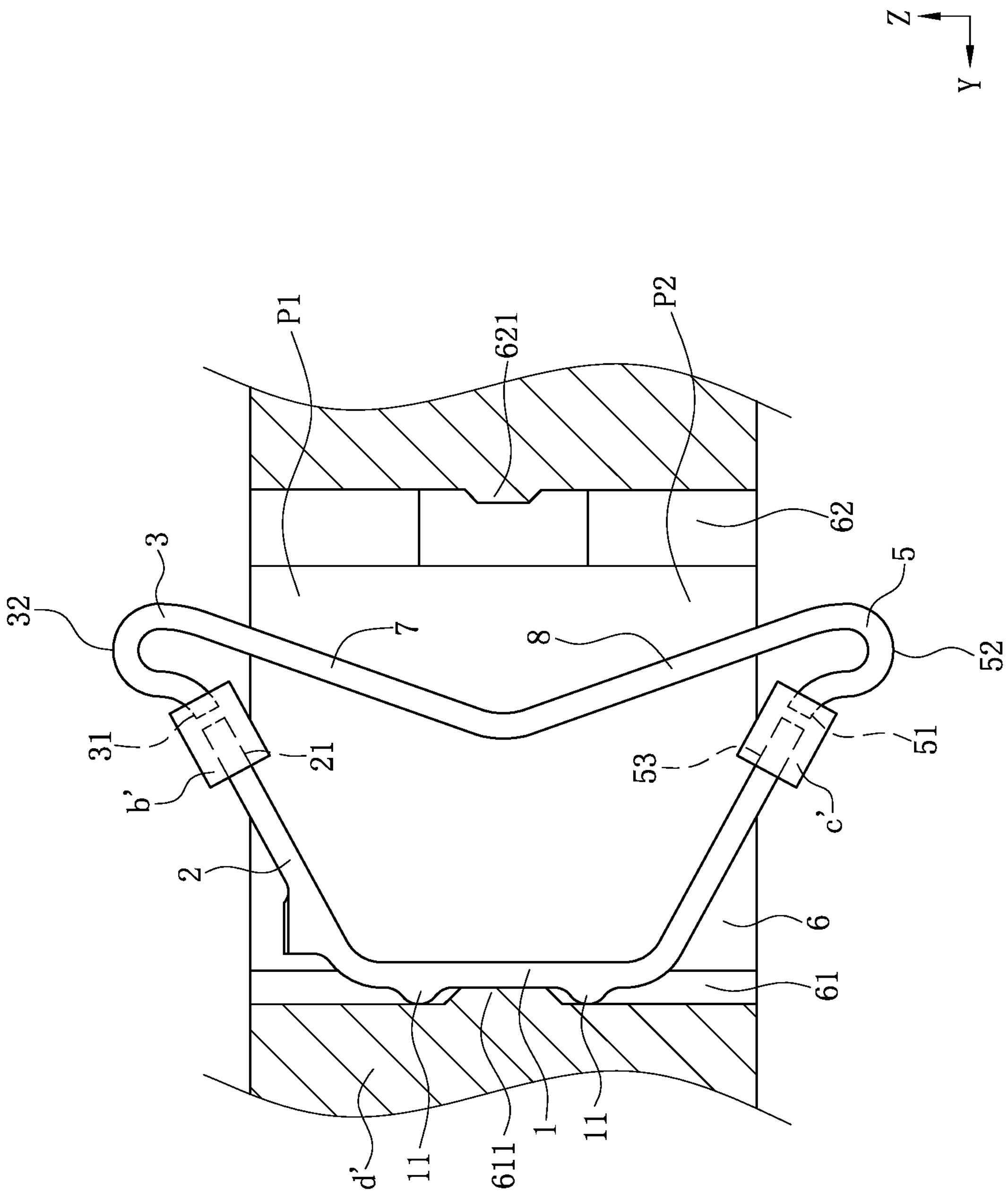
FIG. 43 is a sectional view of the terminal being installed in the accommodating slot of the electrical connector and the method of manufacturing the same according to the thirteenth embodiment of the present invention.

As shown in FIG. 43, in the step J4 (corresponding to the step 5 of claim 1), after this, the insulating body d' is provided. The insulating body d' is formed with a plurality of accommodating slots 6 running vertically through the insulating body d', and the terminals a' are inserted into the accommodating slots 6. Each accommodating slot 6 has the fixing cavity 61 and the receiving cavity 62 in communication with each other. However, the accommodating slot 6 is not provided with the positioning post 63. The inner wall of the fixing cavity 61 away from the receiving cavity 62 is protrudingly provided with a position limiting portion 611 toward one side adjacent to the receiving cavity 62, and along the vertical direction, the position limiting portion 611 is located between the two protruding portions 11 to limit the terminal a' from moving vertically.

The inner wall surface of the receiving cavity 62 away from the fixing cavity 61 is protrudingly provided with a separating portion 621 toward one side adjacent to the fixing cavity 61, and the separating portion 621 is used to prevent the terminal a' from being excessively pressed and damaged.

Figure 44:
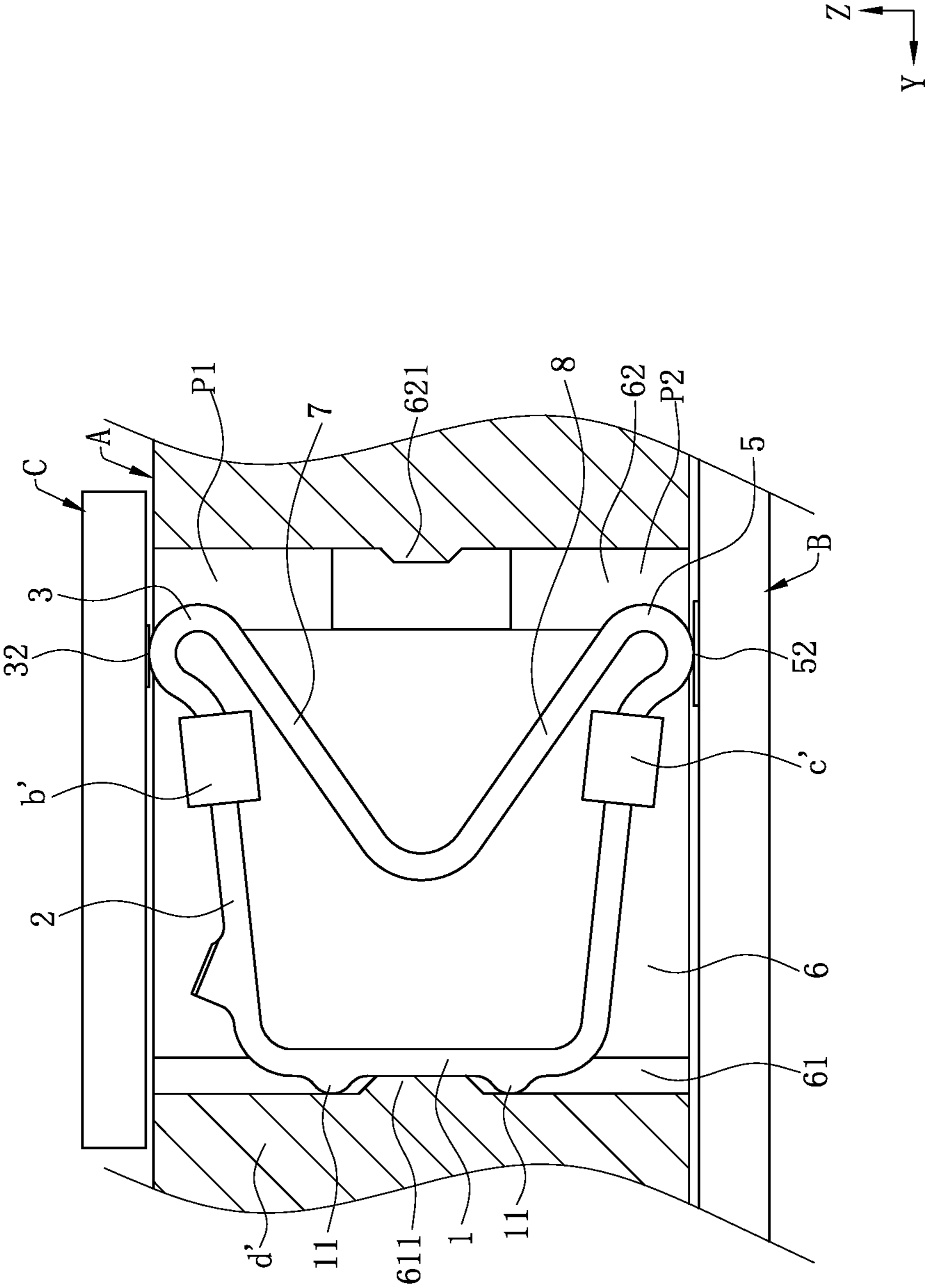
FIG. 44 is a sectional view of the electrical connector and the method of manufacturing the same when the electrical connector is mated with the first electronic component and the second electronic component according to the thirteenth embodiment of the present invention.

As shown in FIG. 44, when the terminal a' is mated with the first electronic component B and the second electronic component C, the upper contact portion 32 upward abuts the second electronic component C, and the floating contact portion 3 is pressed to move and protrude into the first gap P1. The lower contact portion 52 is in downward contact with the first electronic component B, and the conducting portion 5 is pressed to move and protrude into the second gap P2. The angle between the first connecting portion 7 and the second connecting portion 8 gradually becomes smaller, and the first connecting portion 7 becomes gradually closer to the fixing portion 1, but there is always a gap between the first connecting portion 7 and the fixing portion 1, thus preventing the first connecting portion 7 and the fixing portion 1 from being in contact with each other. The second connecting portion 8 also becomes gradually closer to the fixing portion 1, but there is always a gap between the second connecting portion 8 and the fixing portion 1, thus preventing the second connecting portion 8 and the fixing portion 1 from being in contact with each other. The separating portion 621 is located between the floating contact portion 3 and the conducting portion 5. When the terminal a' is pressed, the floating contact portion 3 and an upper end of the separating portion 621 abut each other, and the conducting portion 5 and a lower end of the separating portion 621 abut each other, further preventing the terminal a' from being pressed and continuously deform to be damaged.

Figure 45:
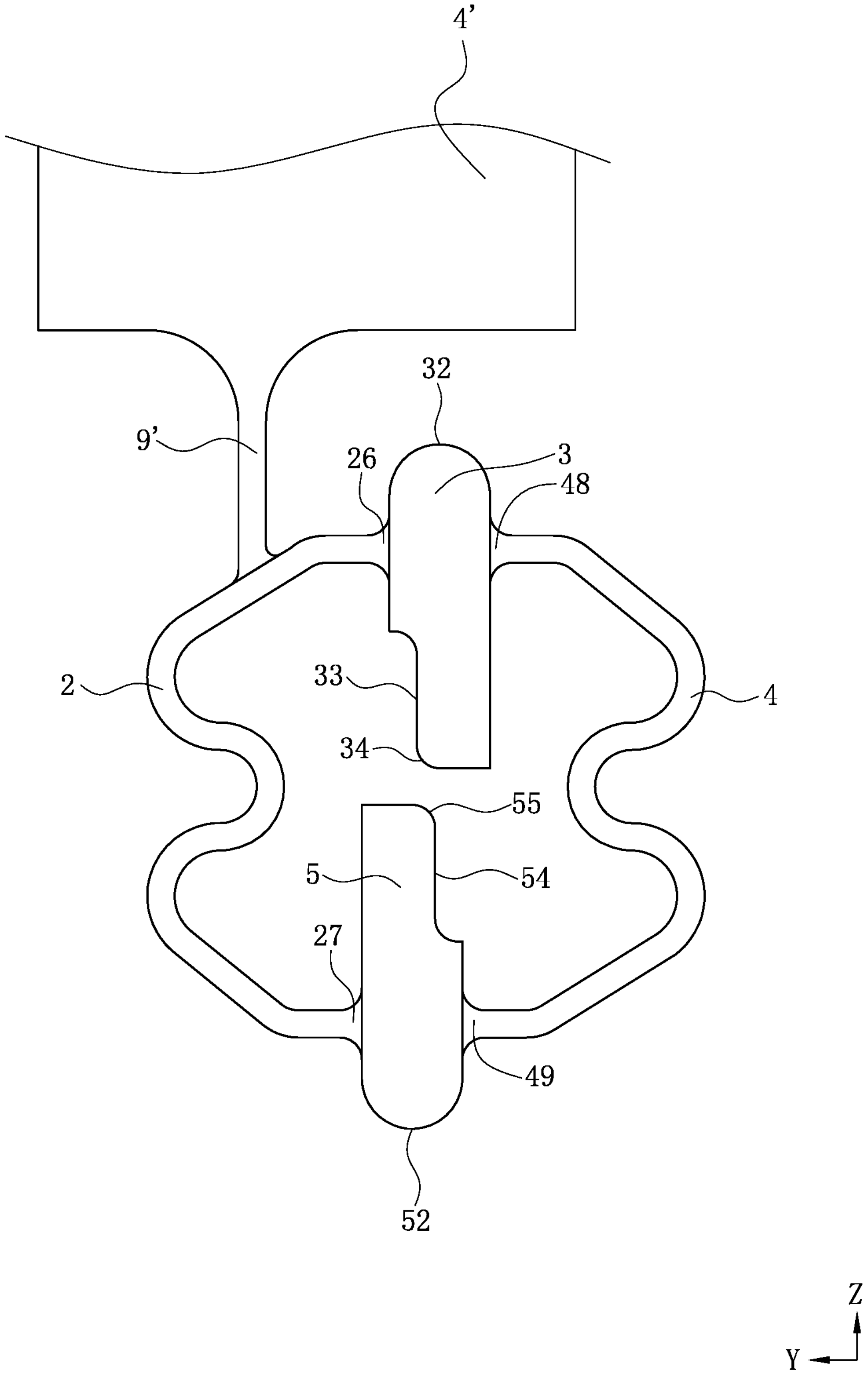
FIG. 45 is a schematic view of cutting and forming the terminal and the strip of an electrical connector and a method of manufacturing the same according to a fourteenth embodiment of the present invention.

FIG. 45 to FIG. 50 show an electrical connector A and a method of manufacturing the electrical connector A according to a fourteenth embodiment of the present invention, which are different from the electrical connector A and the method of manufacturing the electrical connector A according to the first embodiment of the present invention in that, with the remaining structures and connection relationships being identical to those of the first embodiment: as shown in FIG. 45, in the step 1, the terminal a' is provided with an elastic arm 2, a floating contact portion 3, a conducting portion 5 and a deformation arm 4. The floating contact portion 3 is located above the conducting portion 5, and the upper contact portion 32 of the floating contact portion 3 and the lower contact portion 52 of the conducting portion 5 are staggered along the horizontal direction. Along the left-right direction, the floating contact portion 3 is located between the elastic arm 2 and the deformation arm 4, and the conducting portion 5 is also located between the elastic arm 2 and the deformation arm 4. Specifically, the elastic arm 2 is located at a left side of the floating contact portion 3, and the upper end of the elastic arm 2 is connected to the floating contact portion 3 through a first bridging portion 26. The deformation arm 4 is located at a right side of the floating contact portion 3, and the upper end of the deformation arm 4 is connected to the floating contact portion 3 through a second bridging portion 48. The elastic arm 2 is located at a left side of the conducting portion 5, and the lower end of the elastic arm 2 is connected to the conducting portion 5 through a third bridging portion 27. The deformation arm 4 is located at a right side of the conducting portion 5, and the lower end of the deformation arm 4 is connected to the conducting portion 5 through a fourth bridging portion 49.

As shown in FIG. 45, the strip formed by punching and cutting is an extending portion 9'. The extending portion 9' is located above the elastic arm 2 (and in other embodiments, the extending portion 9' may be located below the elastic arm 2 or at other locations thereof). A lower end of the extending portion 9' is connected to the elastic arm 2, and an upper end thereof is connected to the outer frame 4'.

Figure 46:
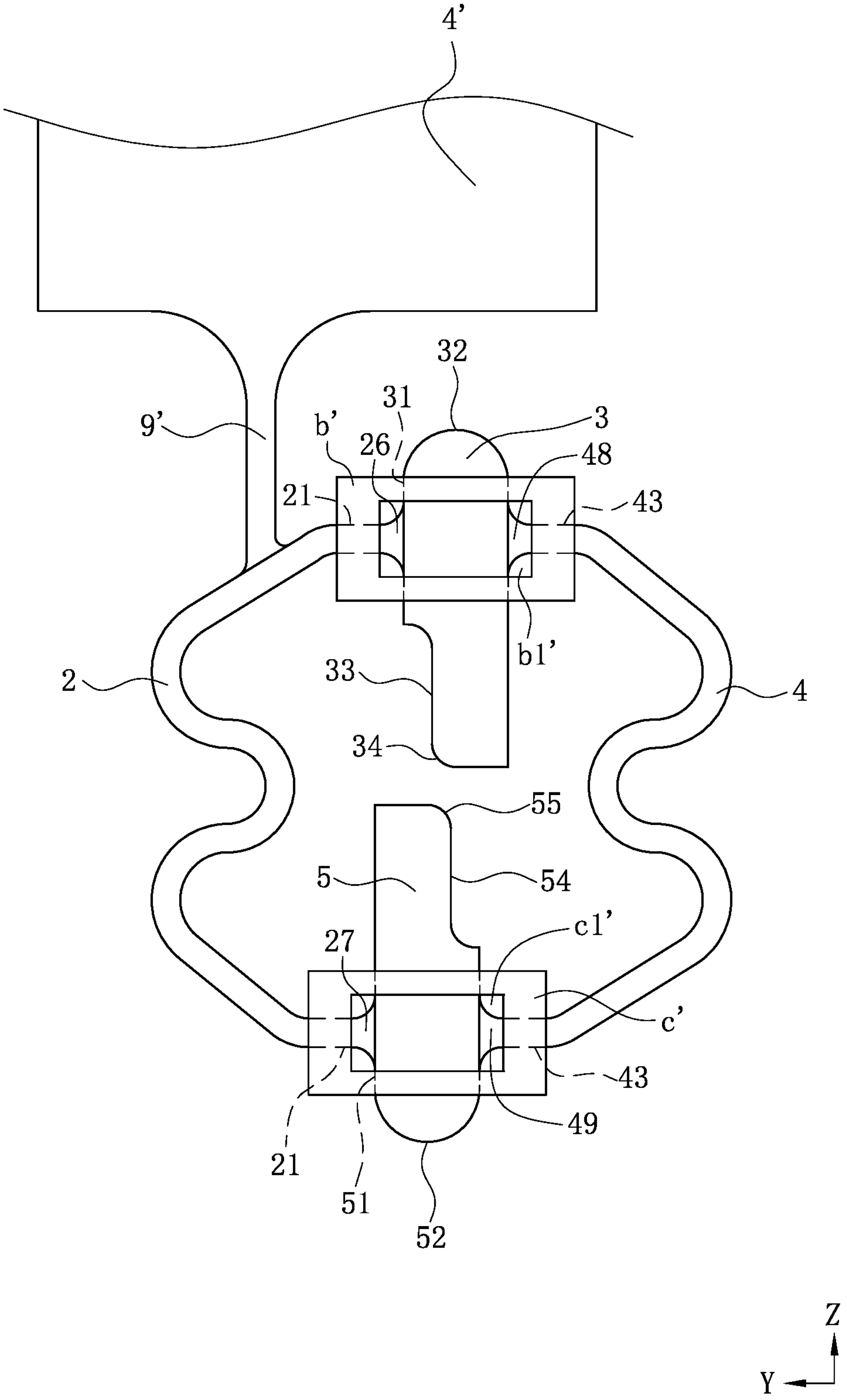
FIG. 46 is a schematic view of insert-molding the insulating block and the plastic block of the electrical connector and the method of manufacturing the same according to the fourteenth embodiment of the present invention.

As shown in FIG. 46, in the step 2, further insert-molding the insulating block b', such that an upper end of the elastic arm 2, an upper end of the deformation arm 4 and a portion of the floating contact portion 3 are all embedded in the insulating block b'. The insulating block b' is provided with a first hollow hole b1'. The first hollow hole b1' runs through the insulating block b', and the first bridging portion 26 and the second bridging portion 48 are exposed in the first hollow hole b1'.

As shown in FIG. 46, in the step 2, insert-molding the plastic block c' simultaneously when insert-molding the insulating block b', such that a lower end of the elastic arm 2, a lower end of the deformation arm 4 and a portion of the conducting portion 5 are all embedded in the plastic block c'. The plastic block c' is provided with a second hollow hole c1'. The second hollow hole c1' runs through the insulating block b', and the third bridging portion 27 and the fourth bridging portion 49 are exposed in the second hollow hole c1'.

Figure 47:
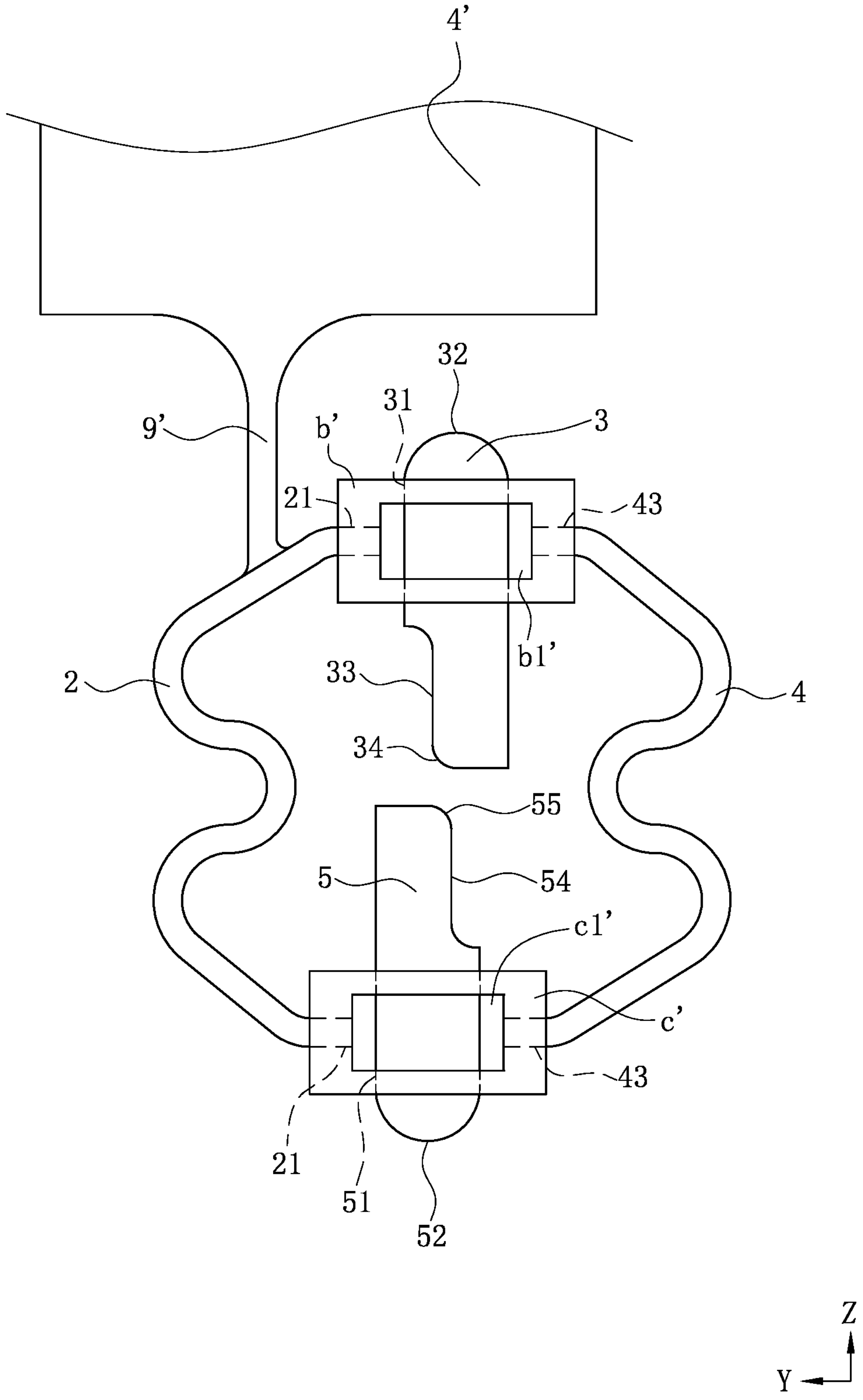
FIG. 47 is a schematic view of cutting the first bridging portion, the second bridging portion, the third bridging portion and the fourth bridging portion of the terminal of the electrical connector and the method of manufacturing the same according to the fourteenth embodiment of the present invention.

As shown in FIG. 47, in the step 3, the first bridging portion 26 and the second bridging portion 48 being exposed in the first hollow hole b1' are cut, such that the elastic arm 2 and the floating contact portion 3 are separate from each other, and the deformation arm 4 and the floating contact portion 3 are separate from each other. Meanwhile, the third bridging portion 27 and the fourth bridging portion 49 being exposed in the second hollow hole c1' are cut, such that the elastic arm 2 and the conducting portion 5 are separate from each other, and the deformation arm 4 and the conducting portion 5 are separate from each other.

Figure 48:
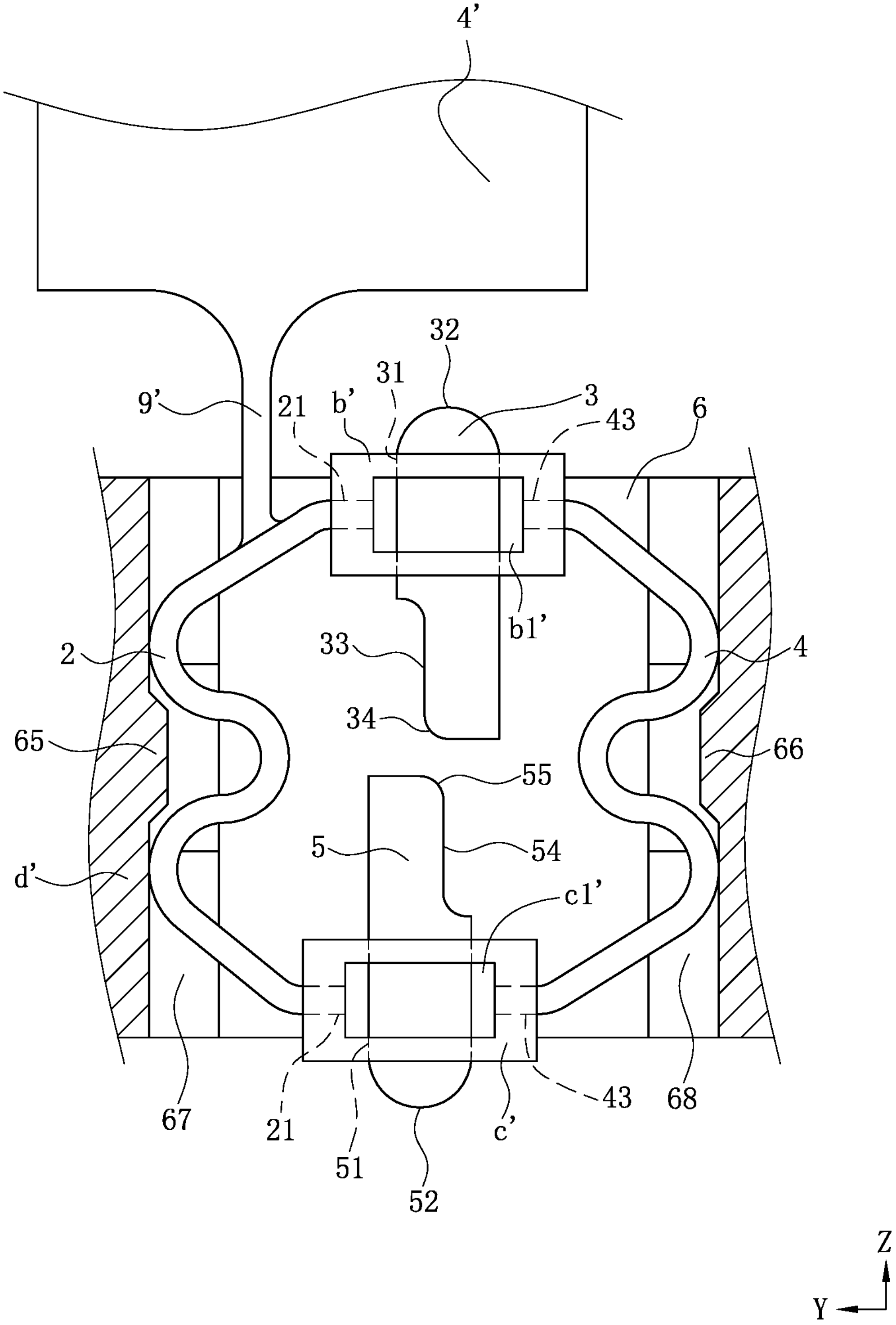
FIG. 48 is a schematic view of the terminal being connected to the extending portion and installed in the accommodating slot of the electrical connector and the method of manufacturing the same according to the fourteenth embodiment of the present invention.

As shown in FIG. 48, in the step 4, further providing the insulating body d'. The insulating body d' is provided with the accommodating slots 6 running vertically through the insulating body d'. An inner wall surface of each accommodating slot 6 adjacent to the elastic arm 2 is provided with a first bump 65, and the first bump 65 is used to limit the position of the elastic arm 2 vertically. An inner wall surface of each accommodating slot 6 adjacent to the deformation arm 4 is provided with a second bump 66, and the second bump 66 is used to limit the position of the deformation arm 4 vertically. The accommodating slot 6 is further provided with a first position limiting cavity 67 and a second position limiting cavity 68. The elastic arm 2 protrudes into the first position limiting cavity 67, and the first position limiting cavity 67 is used to limit the elastic arm 2 from shaking along a direction perpendicular to a plate surface of the terminal a' (that is, the front-rear direction). The deformation arm 4 protrudes into the second position limiting cavity 68, and the second position limiting cavity 68 is used to limit the deformation arm 4 from shaking along a direction perpendicular to a plate surface of the terminal a' (that is, the front-rear direction). Thus, the terminal a' may be stably fixed in the receiving cavity 62.

Figure 49:
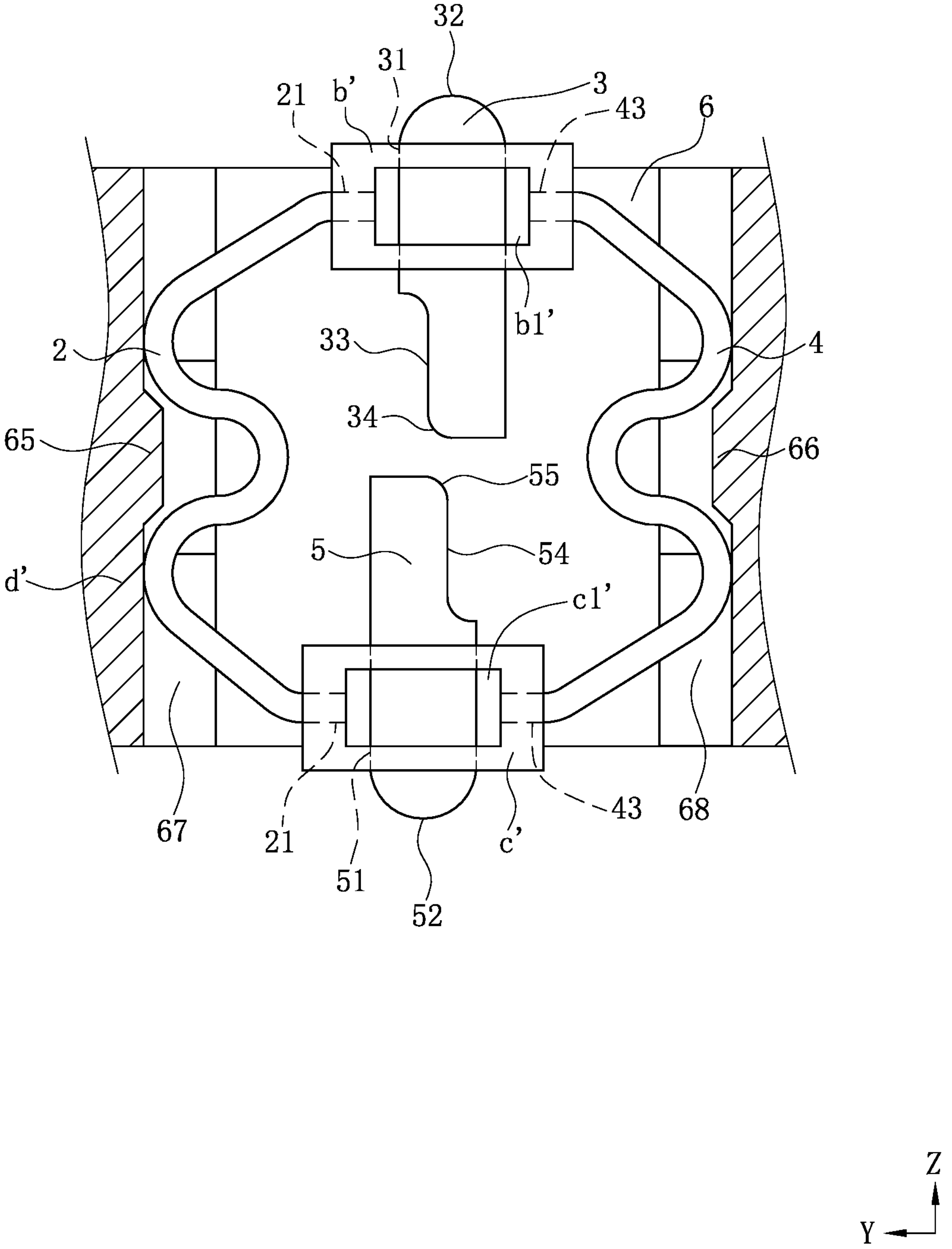
FIG. 49 is a sectional view of removing the extending portion of the electrical connector and the method of manufacturing the same according to the fourteenth embodiment of the present invention.

As shown in FIG. 49, in the step 5, after this, the extending portion 9' is cut, such that the elastic arm 2 and the extending portion 9' are separate from each other (and in other embodiments, it is possible to firstly fold and cut the extending portion 9', and then insert the terminal a' not connected to any strip into the accommodating slot 6).

Figure 50:
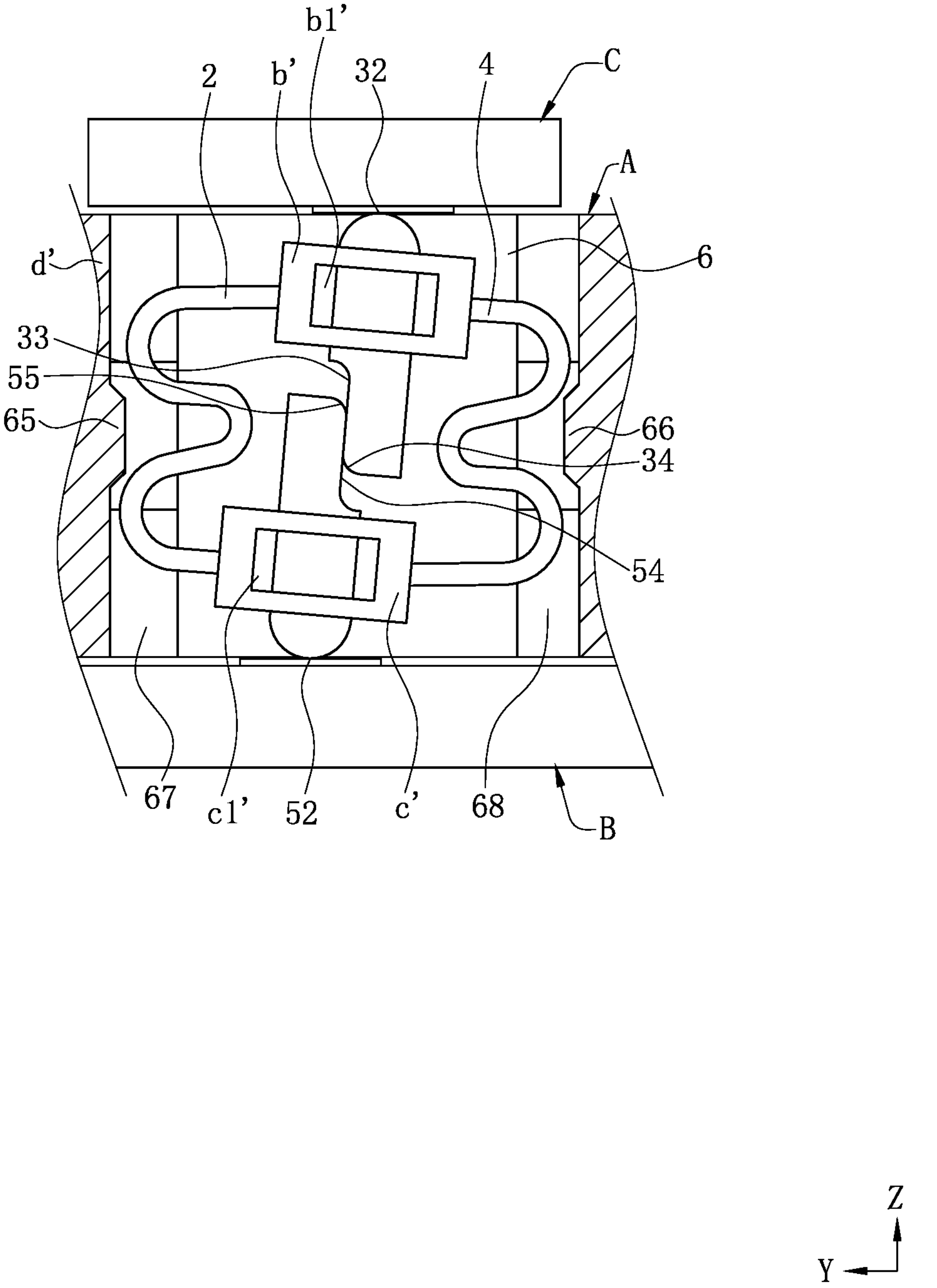
FIG. 50 is a sectional view of the electrical connector and the method of manufacturing the same when the electrical connector is mated with the first electronic component and the second electronic component according to the fourteenth embodiment of the present invention.

As shown in FIG. 50, when manufacturing of the electrical connector A is complete and the electrical connector A is mated with the first electronic component B and the second electronic component C, the upper contact portion 32 is exposed upward to an upper surface of the accommodating slot 6 and abuts the second electronic component C, and the lower contact portion 52 is exposed downward to a lower surface of the accommodating slot 6 and abuts the first electronic component B. Since the upper contact portion 32 and the lower contact portion 52 are provided to be staggered along the horizontal direction, the upper contact portion 32 may generate a leftward scratching force to the second electronic component C, such that the upper contact portion 32 may scratch the particles on the second electronic component C, such that the contact between the upper contact portion 32 and the second electronic component C is more stable. The lower contact portion 52 may generate a rightward scratching force to the first electronic component B, such that the lower contact portion 52 may scratch the particles on the first electronic component B, such that the contact between the lower contact portion 52 and the first electronic component B is more stable.

As shown in FIG. 50, when manufacturing of the electrical connector A is complete and the electrical connector A is mated with the first electronic component B and the second electronic component C, the elastic arm 2 and the deformation arm 4 are given forces to generate elastic deformations, thus driving the floating contact portion 3 to move along the vertical direction through the insulating block b', and driving the conducting portion 5 to move along the vertical direction through the plastic block c', such that the first contact surface 33 of the floating contact portion 3 and the second contact surface 54 of the conducting portion 5 are in direct contact. Thus, the first electronic component B and the second electronic component C may perform signal exchange through the direct contact of the floating contact portion 3 and the conducting portion 5.

Figure 51:
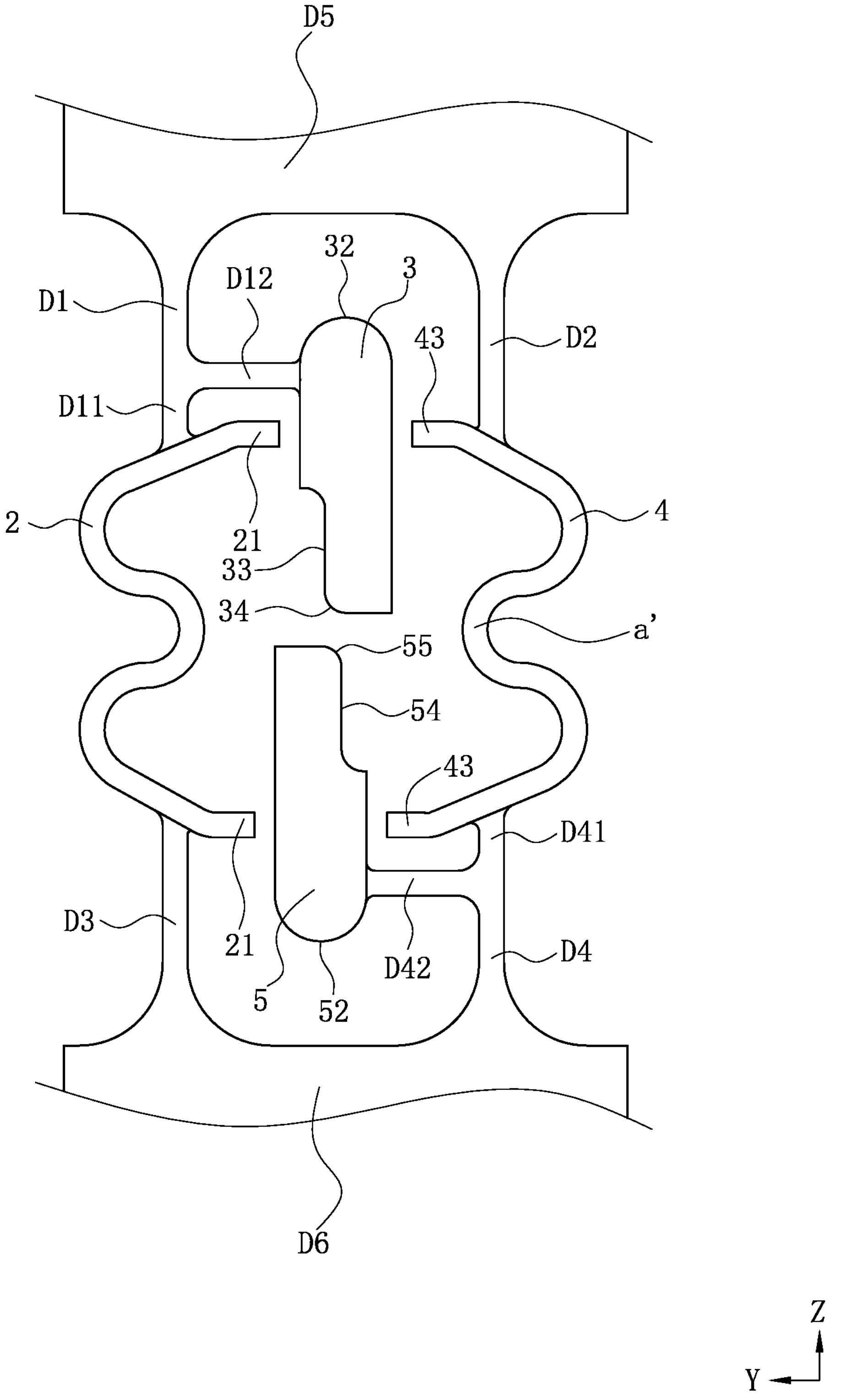
FIG. 51 is a schematic view of cutting and forming the terminal and the strip of an electrical connector and a method of manufacturing the same according to a fifteenth embodiment of the present invention.

FIG. 51 to FIG. 55 show an electrical connector A and a method of manufacturing the electrical connector A according to a fifteenth embodiment of the present invention, which are different from the electrical connector A and the method of manufacturing the electrical connector A according to the fourteenth embodiment of the present invention in that, with the remaining structures and connection relationships being identical to those of the fourteenth embodiment: as shown in FIG. 51, in the step K1 (corresponding to the step 1 and the step 3 of claim 1), forming the terminal a' by punching and cutting. Along the left-right direction, the floating contact portion 3 is located between the elastic arm 2 and the deformation arm 4. The floating contact portion 3 and the elastic arm 2 are provided at an interval, and the floating contact portion 3 and the deformation arm 4 are provided at an interval. Along the left-right direction, the conducting portion 5 is located between the elastic arm 2 and the deformation arm 4. The conducting portion 5 and the elastic arm 2 are provided at an interval, and the conducting portion 5 and the deformation arm 4 are provided at an interval.

As shown in FIG. 51, the strip formed by punching and cutting include a first upper strip D1, a second upper strip D2, a first lower strip D3 and a second lower strip D4.

As shown in FIG. 51, the first upper strip D1 is located above the elastic arm 2, and the first upper strip D1 is provided with an upper vertical strip D11 and an upper horizontal strip D12. A lower end of the upper vertical strip D11 is connected to the elastic arm 2, and one end of the upper horizontal strip D12 adjacent to the floating contact portion 3 is connected to the floating contact portion 3. One end of the upper vertical strip D11 not being connected to the terminal a' and one end of the upper horizontal strip D12 not being connected to the terminal a' are connected to each other, and an upper end of the first upper strip Dlis connected to an upper frame D5.

As shown in FIG. 51, the second upper strip D2 is located above the deformation arm 4 (and in other embodiments, the second upper strip D2 may be located at one side of the deformation arm 4 away from the floating contact portion 3 or other locations thereof). A lower end of the second upper strip D2 is connected to the deformation arm 4, and an upper end of the second upper strip D2 is connected to the upper frame D5.

As shown in FIG. 51, the first lower strip D3 is located below the elastic arm 2 (and in other embodiments, the first lower strip D3 may be located at one side of the elastic arm 2 away from the conducting portion 5 or other locations thereof). An upper end of the first lower strip D3 is connected to the elastic arm 2, and a lower end of the first lower strip D3 is connected to a lower frame D6.

As shown in FIG. 51, the second lower strip D4 is located below the deformation arm 4, and the second lower strip D4 is provided with a lower vertical strip D41 and a lower horizontal strip D42. An upper end of the lower vertical strip D41 is connected to the deformation arm 4, and one end of the lower horizontal strip D42 adjacent to the conducting portion 5 is connected to the conducting portion 5. One end of the lower vertical strip D41 not being connected to the terminal a' and one end of the lower horizontal strip D42 not being connected to the terminal a' are connected to each other, and an upper end of the second lower strip D4 is connected to the lower frame D6.

Figure 52:
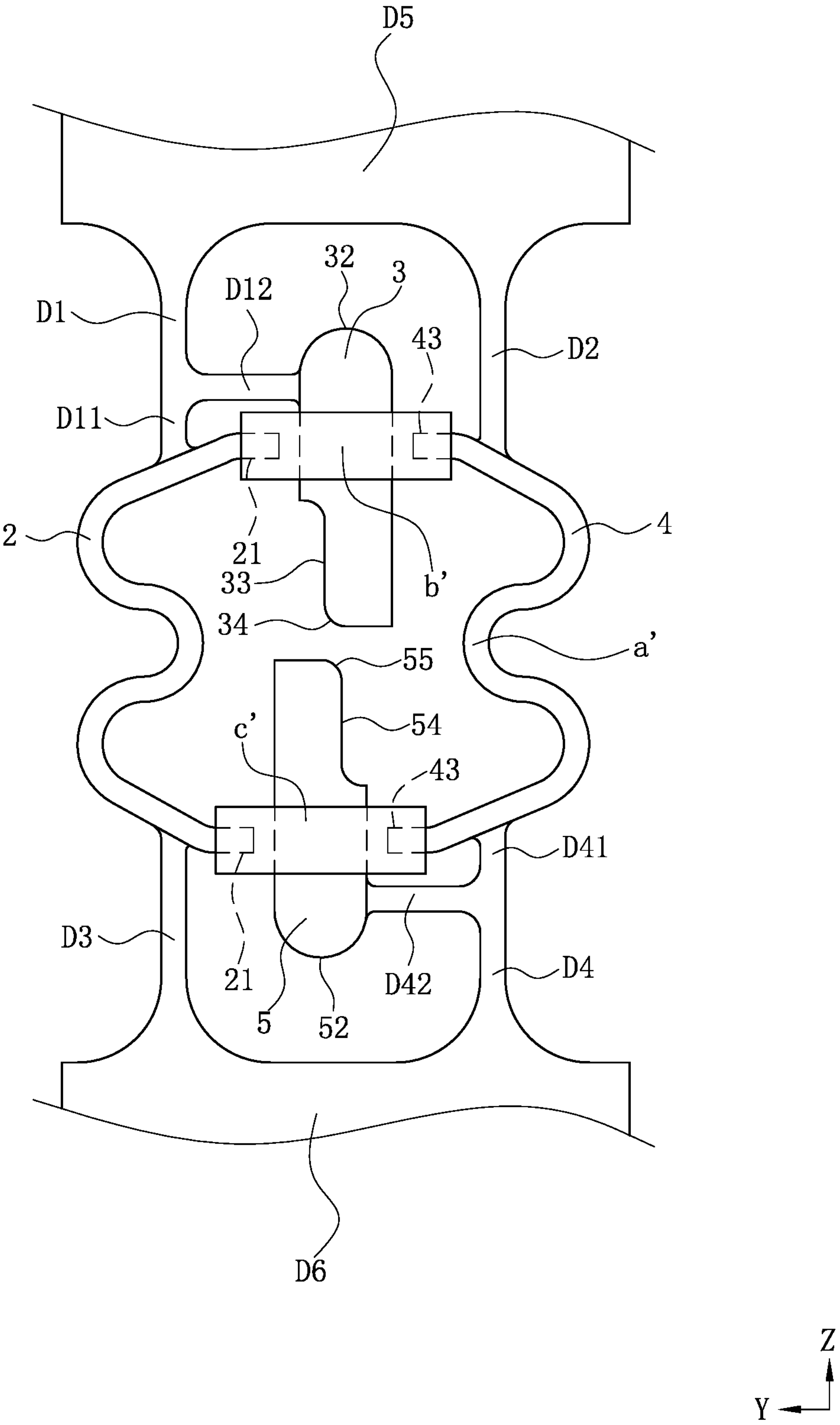
FIG. 52 is a schematic view of insert-molding the insulating block and the plastic block of the electrical connector and the method of manufacturing the same according to the fifteenth embodiment of the present invention.

As shown in FIG. 52, in the step K2 (corresponding to the step 2 of claim 1), afterwards, further insert-molding the insulating block b', such that an upper end of the elastic arm 2, an upper end of the deformation arm 4 and a portion of the floating contact portion 3 are all embedded in the insulating block b'. The insulating block b' is not provided with the first hollow hole b1'. Simultaneously, insert-molding the plastic block c', such that a lower end of the elastic arm 2, a lower end of the deformation arm 4 and a portion of the conducting portion 5 are all embedded in the plastic block c'. The plastic block c' is not provided with the second hollow hole c1'.

Figure 53:
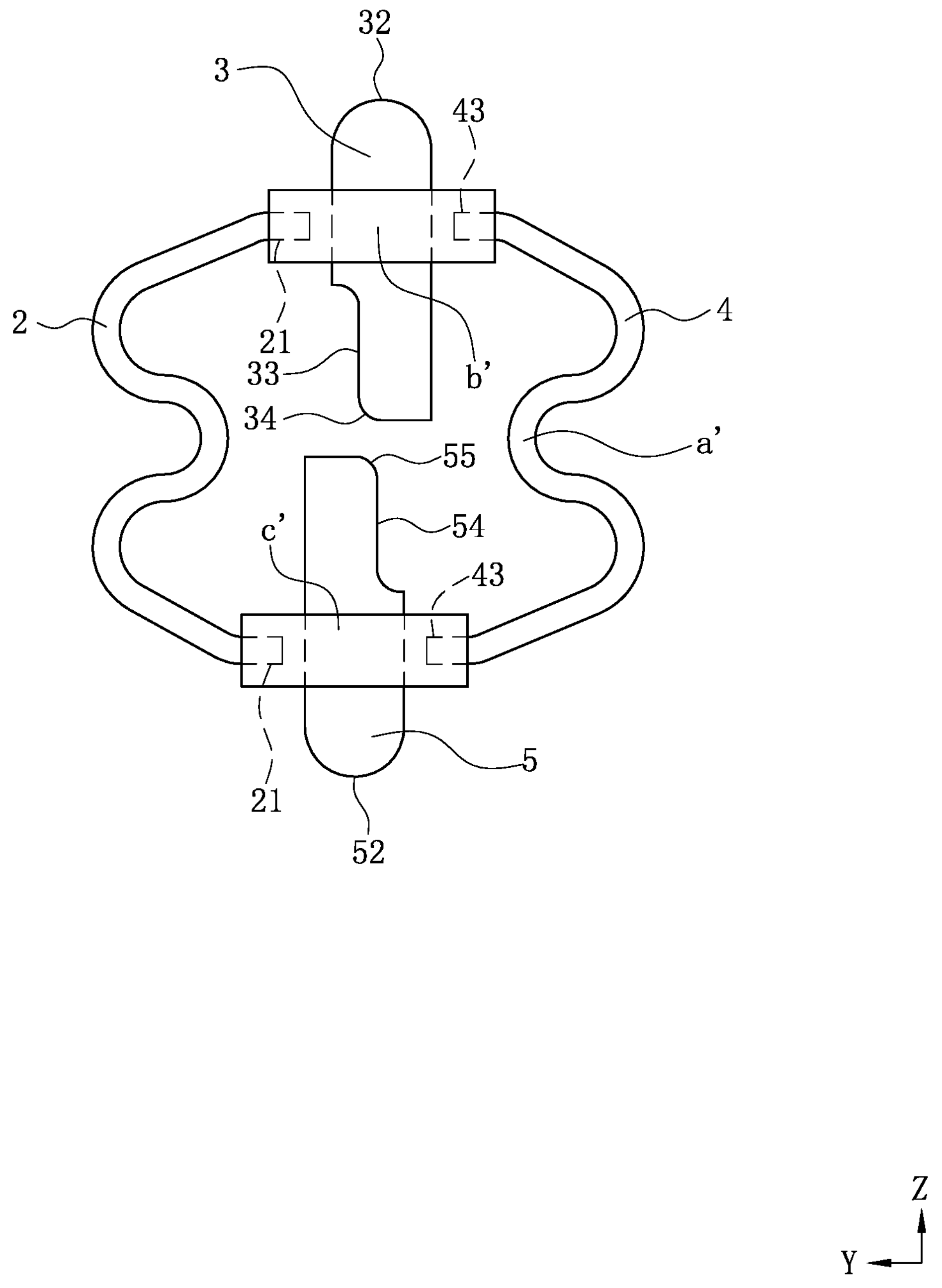
FIG. 53 is a schematic view of the terminal of the electrical connector and the method of manufacturing the same according to the fifteenth embodiment of the present invention.

As shown in FIG. 53, in the step K3 (corresponding to the step 4 of claim 1), the first upper strip D1, the second upper strip D2, the first lower strip D3 and the second lower strip D4 are cut, such that the first upper strip D1 and the elastic arm 2 are separate from each other, the first upper strip D1 and the floating contact portion 3 are separate from each other, the second upper strip D2 and the deformation arm 4 are separate from each other, the first lower strip D3 and the elastic arm 2 are separate from each other, the second lower strip D4 and the conducting portion 5 are separate from each other, and the second lower strip D4 and the deformation arm 4 are separate from each other.

Figure 54:
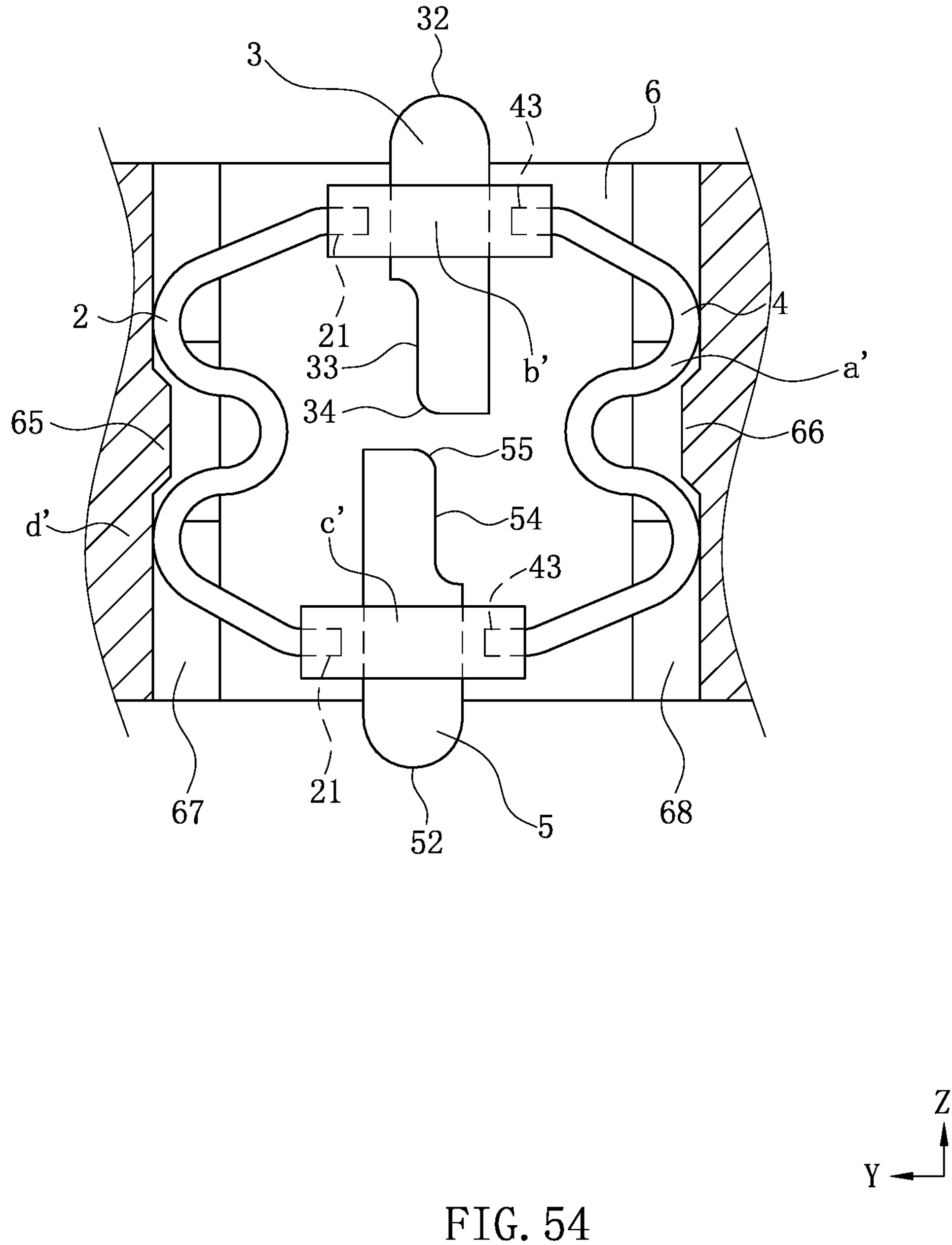
FIG. 54 is a sectional view of the terminal being installed in the accommodating slot of the electrical connector and the method of manufacturing the same according to the fifteenth embodiment of the present invention.
Figure 55:
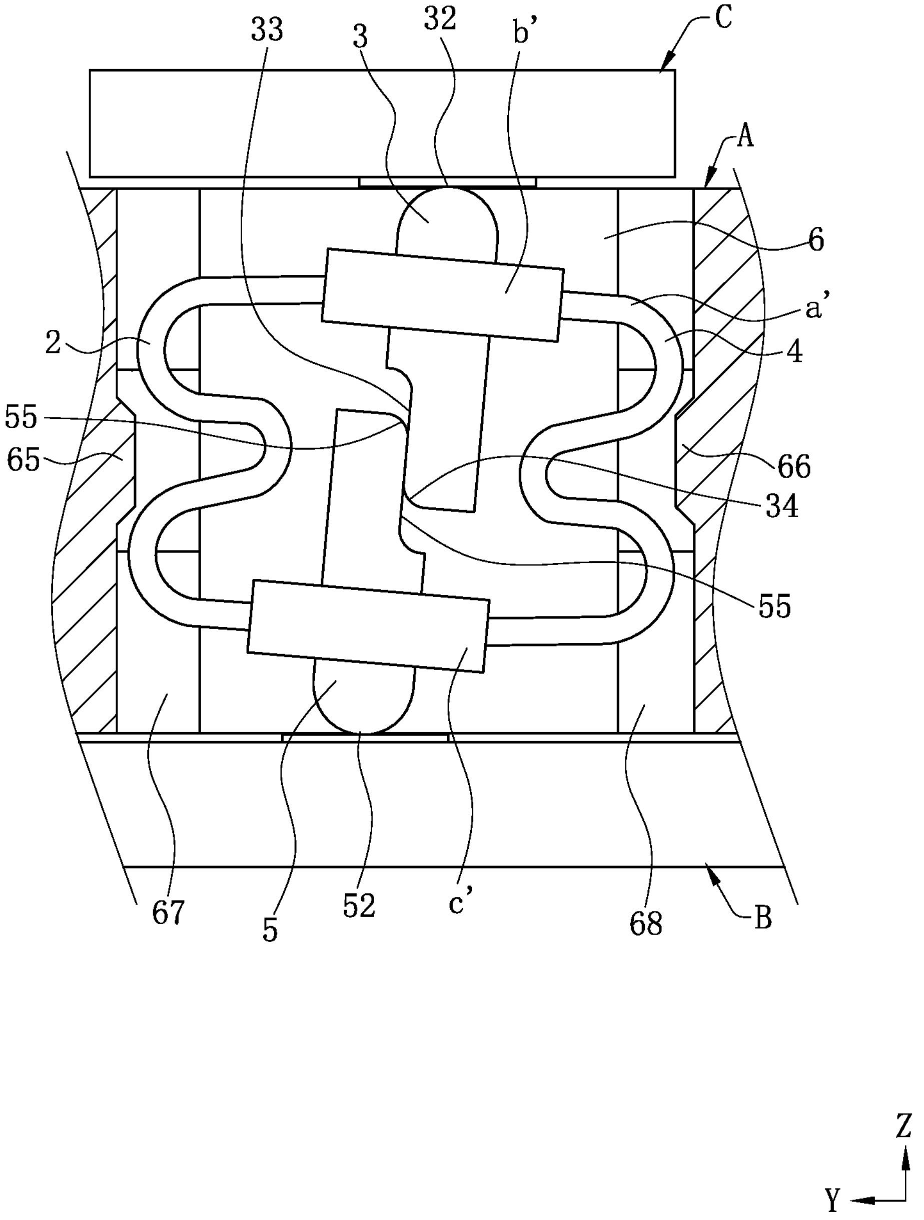
FIG. 55 is a sectional view of the electrical connector and the method of manufacturing the same when the electrical connector is mated with the first electronic component and the second electronic component according to the fifteenth embodiment of the present invention.

As shown in FIG. 54, in the step K4 (corresponding to the step 5 of claim 1), further providing the insulating body d'. The insulating body d' is provided with the accommodating slots 6 running vertically through the insulating body d'. The terminal a' not being connected to any strip is inserted into the accommodating slot 6 (and in other embodiments, it is possible to firstly cut the first upper strip D1 and the second upper strip D2, then to insert the terminal a' being connected to the first lower strip D3 and the second lower strip D4 into the accommodating slot 6, and then to cut the first lower strip D3 and the second lower strip D4; or to firstly cut the first lower strip D3 and the second lower strip D4, then to insert the terminal a' being connected to the first upper strip D1 and the second upper strip D2 into the accommodating slot 6, and then to cut the first upper strip D1 and the second upper strip D2; or to firstly insert the terminal a' being connected to the first upper strip D1, the second upper strip D2, the first lower strip D3 and the second lower strip D4 into the accommodating slot 6, and then to cut the first upper strip D1, the second upper strip D2, the first lower strip D3 and the second lower strip D4).

Figure 56:
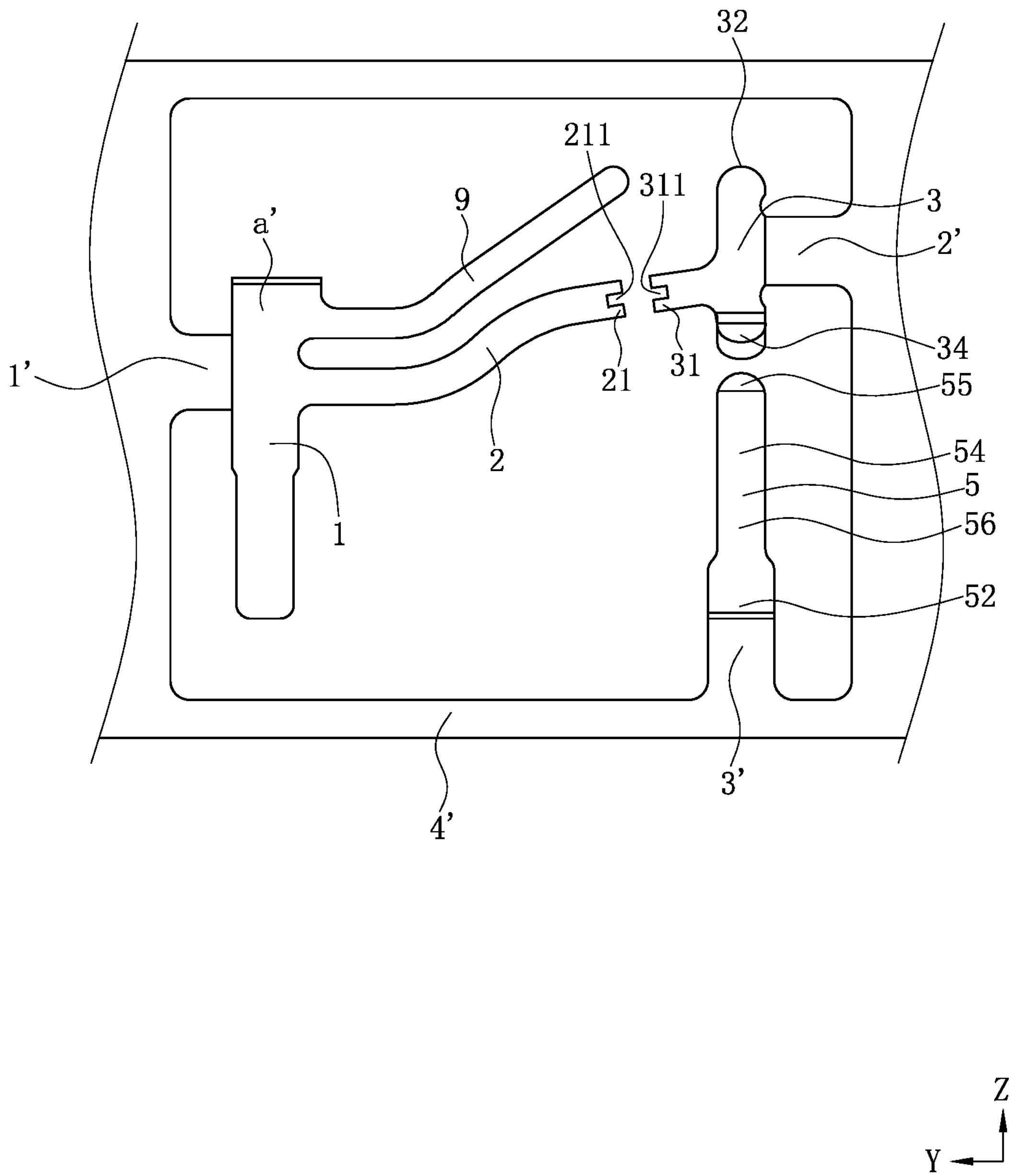
FIG. 56 is a schematic view of cutting and forming the terminal and the strip of an electrical connector and a method of manufacturing the same according to a sixteenth embodiment of the present invention.

FIG. 56 to FIG. 60 show an electrical connector A and a method of manufacturing the electrical connector A according to a sixteenth embodiment of the present invention, which are different from the electrical connector A and the method of manufacturing the electrical connector A according to the fourth embodiment of the present invention in that, with the remaining structures and connection relationships being identical to those of the fourth embodiment: as shown in FIG. 56, in the step L1 (corresponding to the step 1 and the step 3 of claim 1): firstly, forming the terminals a' and the strip by punching and cutting. Each terminal a' is provided with a fixing portion 1, an abutting arm 9, an elastic arm 2, a floating contact portion 3 and a conducting portion 5. The abutting arm 9 is located above the elastic arm 2, and one end of the abutting arm 9 adjacent to the fixing portion 1 is connected to the fixing portion 1. The elastic arm 2 is not provided with the elongated slot 24 and the stopping portion 25. That is, the elastic arm 2 is single-beam type. The elastic arm 2 and the floating contact portion 3 are provided at an interval.

Figure 57:
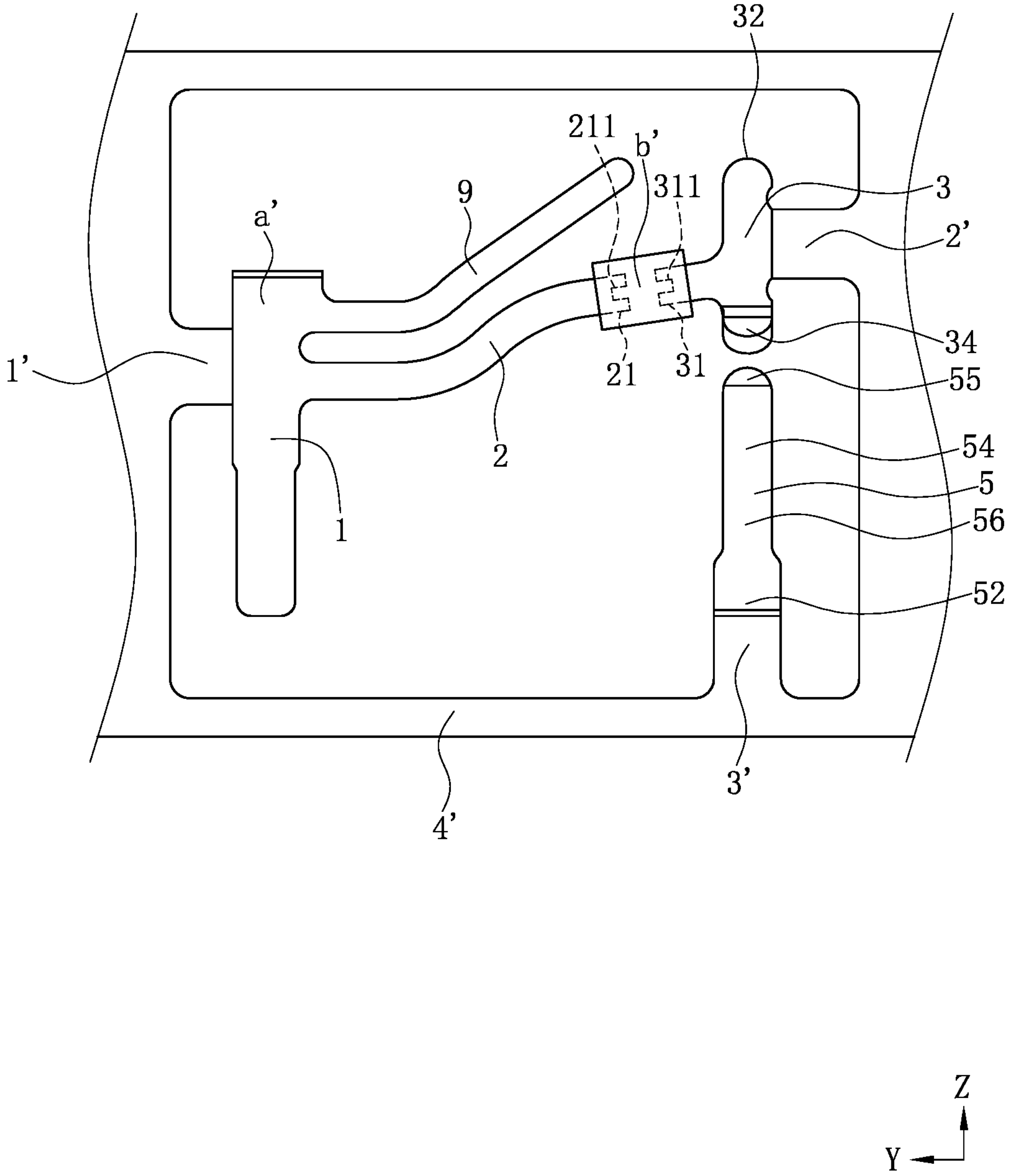
FIG. 57 is a schematic view of insert-molding the insulating block of the electrical connector and the method of manufacturing the same according to the sixteenth embodiment of the present invention.

As shown in FIG. 57, in the step L2 (corresponding to the step 2 of claim 1), the insulating block b' is insert-molded.

Figure 58:
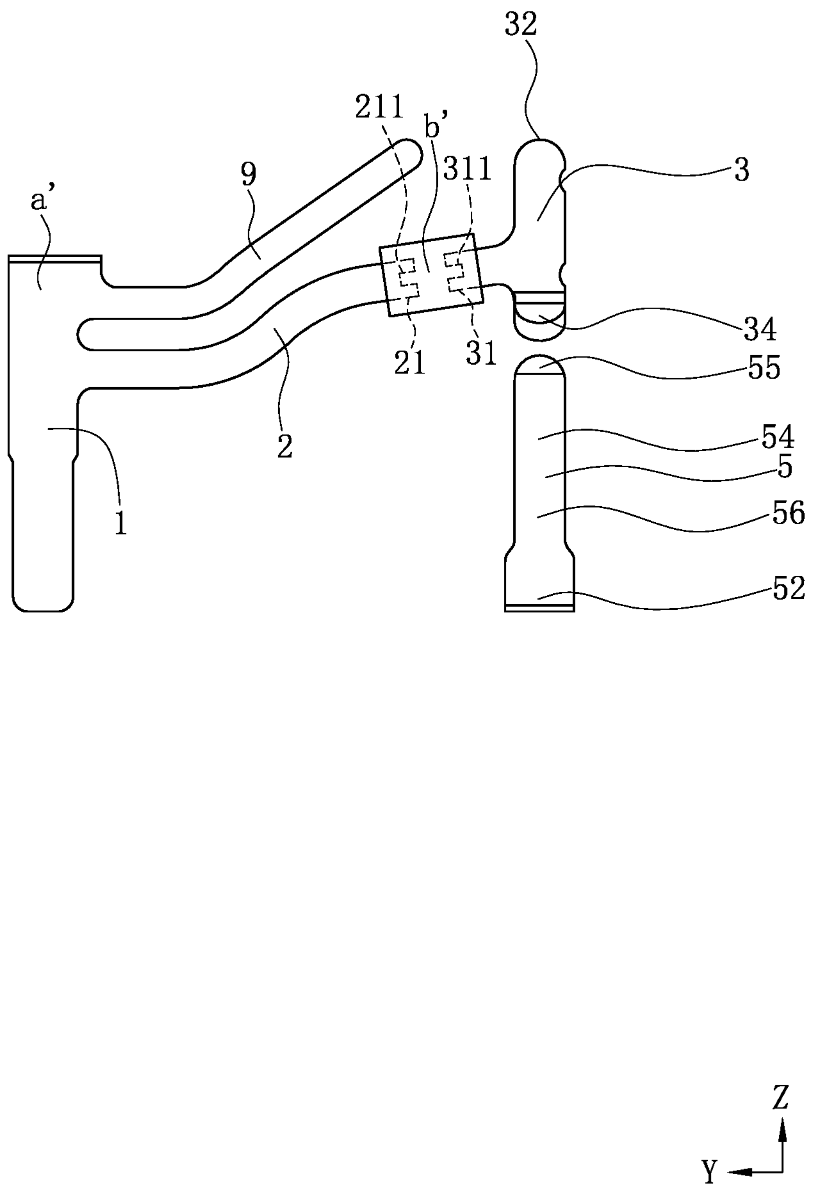
FIG. 58 is a schematic view of the terminal of the electrical connector and the method of manufacturing the same according to the sixteenth embodiment of the present invention.

As shown in FIG. 58, in the step L3 (corresponding to the step 4 of claim 1), the base strip 1', the extending section 2' and the connecting section 3' are cut.

Figure 59:
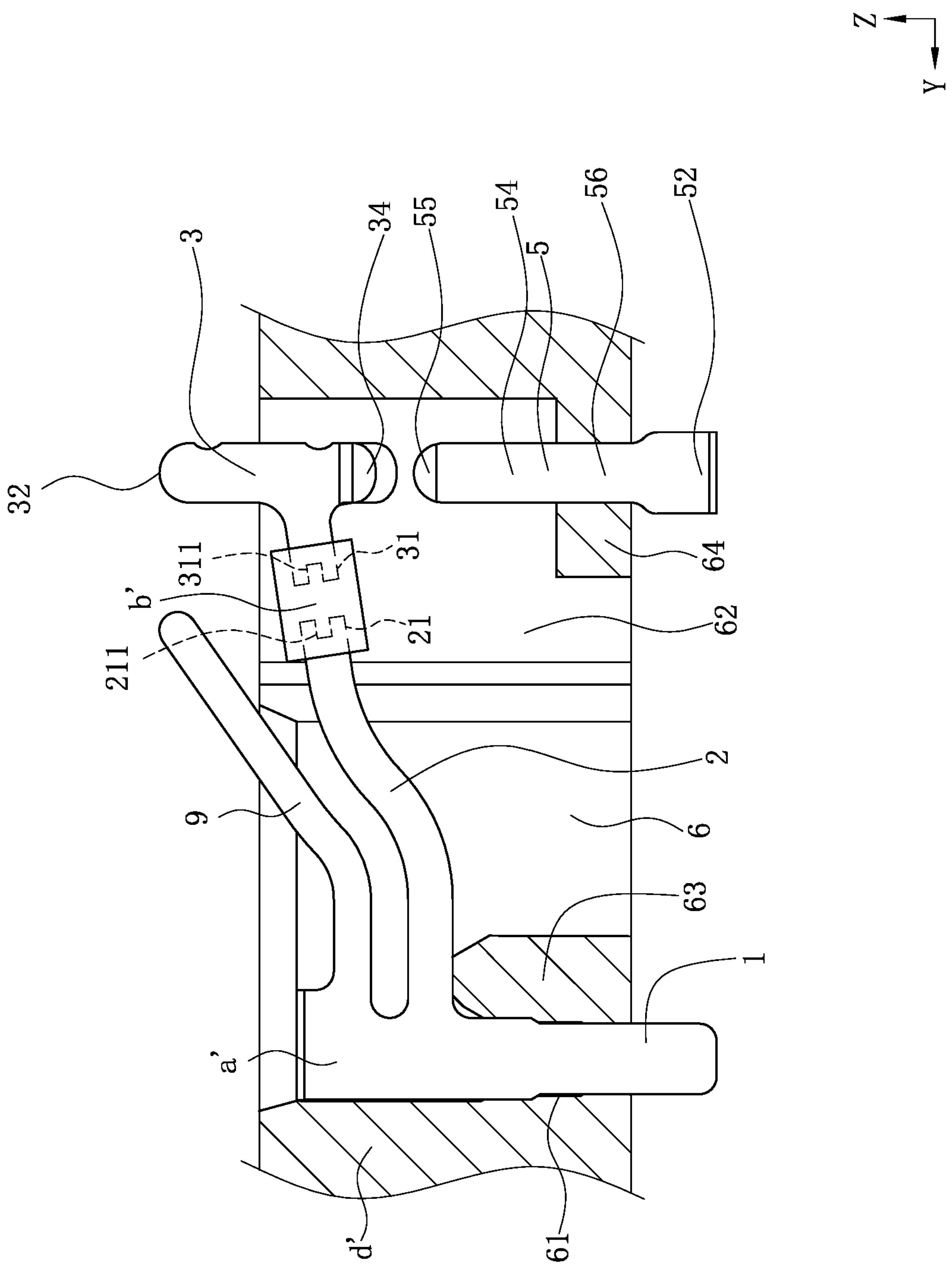
FIG. 59 is a sectional view of the terminal being installed in the accommodating slot of the electrical connector and the method of manufacturing the same according to the sixteenth embodiment of the present invention.

As shown in FIG. 59, in the step L4 (corresponding to the step 5 of claim 1): after cutting the strip, further providing the insulating body d', where the insulating body d' is provided with a plurality of accommodating slots 6 running vertically through the insulating body d', and inserting the terminals a' into the accommodating slots 6. The lower end of the fixing portion 1 is exposed downward out of the fixing cavity 61, an upper end of the abutting arm 9 is exposed upward out of the receiving cavity 62, and the upper contact portion 32 is exposed upward out of the receiving cavity 62. The conducting portion 5 is retained by the retaining portion 64, and the lower contact portion 52 is exposed downward out of the receiving cavity 62.

Figure 60:
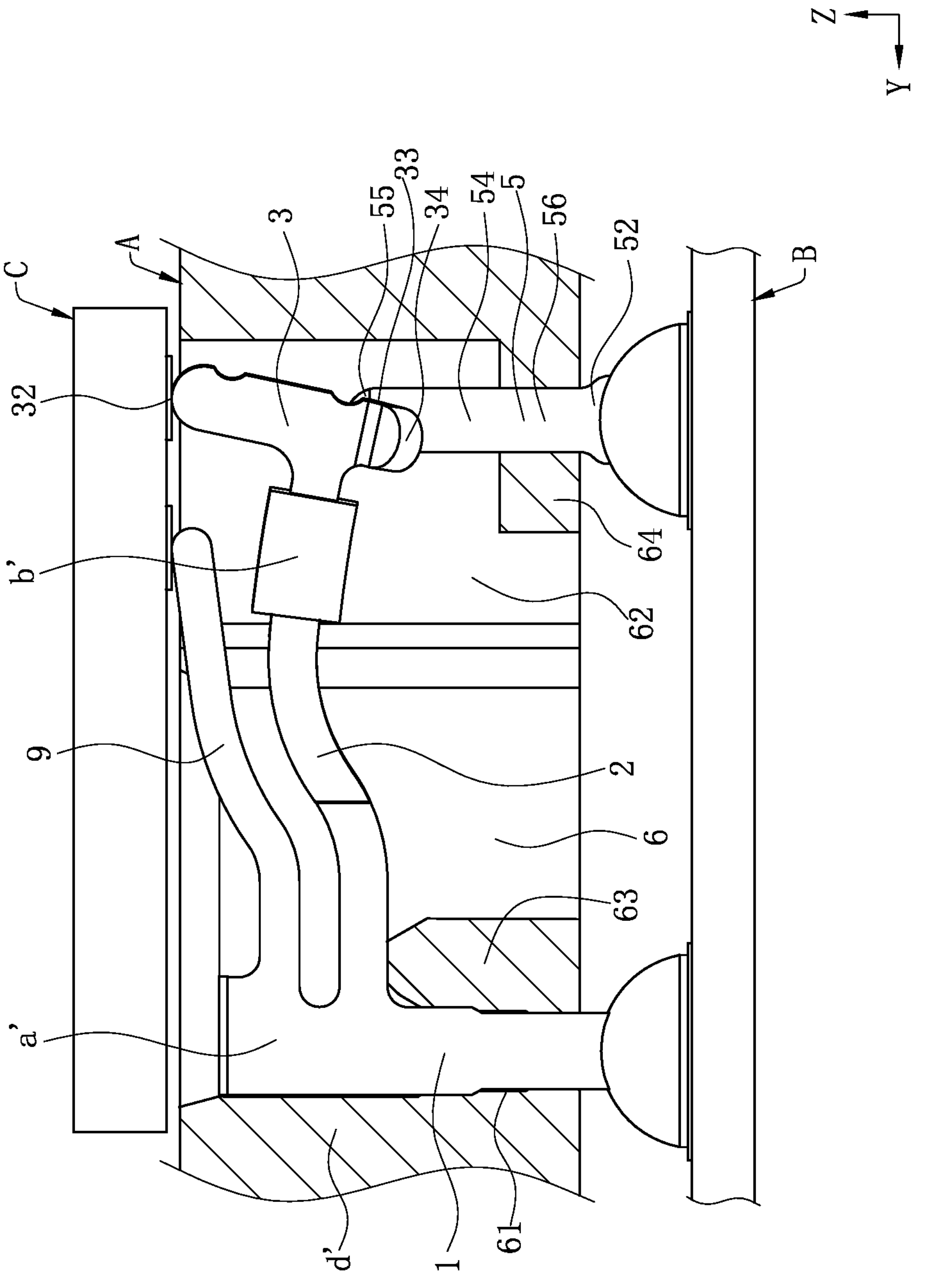
FIG. 60 is a sectional view of the electrical connector and the method of manufacturing the same when the electrical connector is mated with the first electronic component and the second electronic component according to the sixteenth embodiment of the present invention.

As shown in FIG. 60, when manufacturing of the electrical connector A is complete and the electrical connector A is mated with the first electronic component B and the second electronic component C, an upper end of the abutting arm 9 and a grounding pad of the second electronic component C are in contact with each other, and a lower end of the fixing portion 1 and a grounding pad of the first electronic component B are in contact with each other through the solder, such that the grounding signals of the first electronic component B and the grounding signals of the second electronic component C may be transmitted through the abutting arm 9 and the fixing portion 1. The floating contact portion 3 abuts the signal contact point of the second electronic component C through the upper contact portion 32, the conducting portion 5 is in contact with the first electronic component B through the lower contact portion 52, and the first contact surface 33 of the floating contact portion 3 is in direct contact with the second contact surface 54 of the conducting portion 5, such that the signals of the first electronic component B and the signals of the second electronic component C may be transmitted through the floating contact portion 3 and the conducting portion 5.

Figure 61:
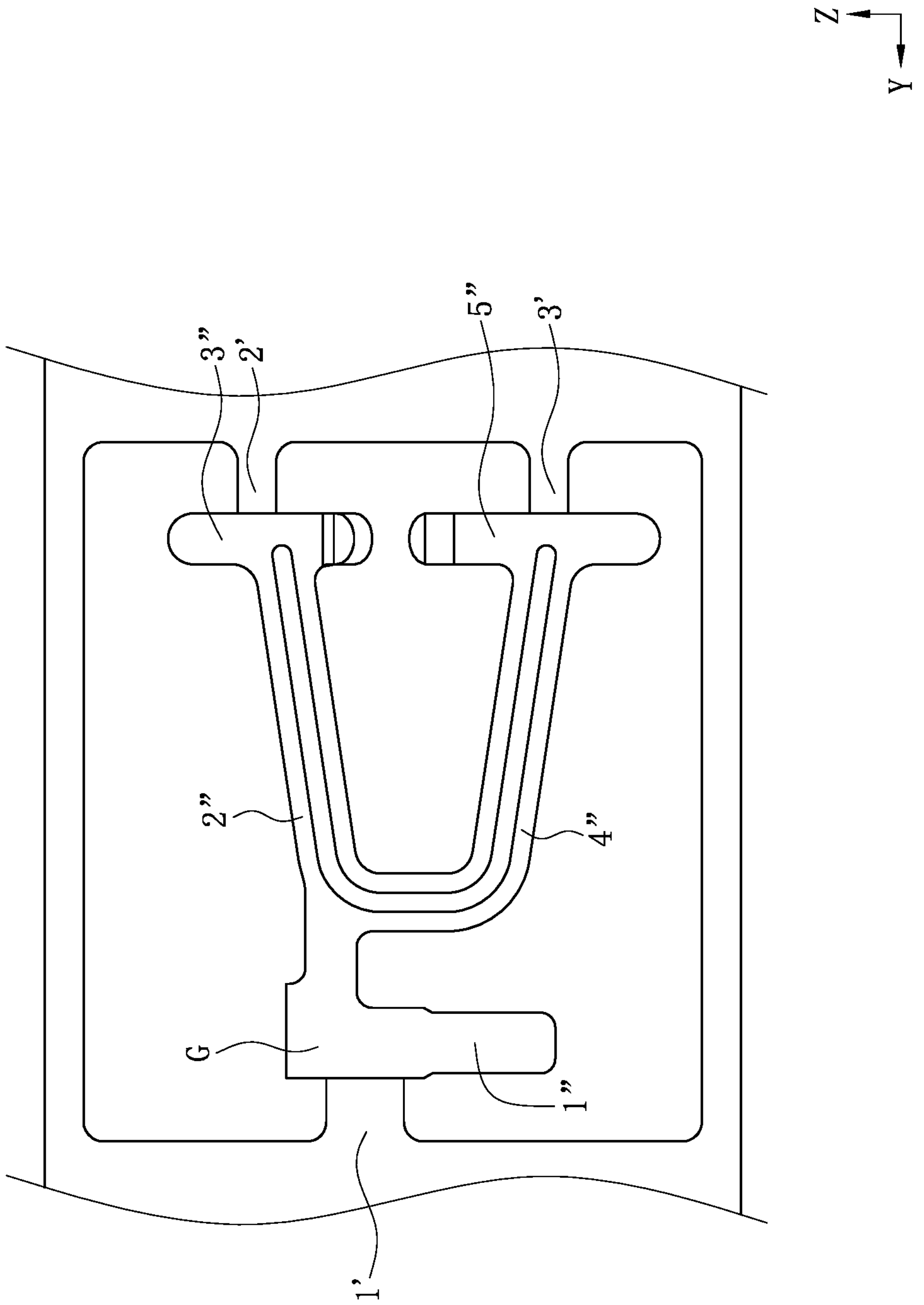
FIG. 61 is a schematic view of cutting and forming the ground contact and the strip of an electrical connector and a method of manufacturing the same according to the seventeenth embodiment of the present invention.

FIG. 31, FIG. 32, FIG. 33 and FIG. 61 to FIG. 64 show an electrical connector A and a method of manufacturing the electrical connector A according to a seventeenth embodiment of the present invention, which are different from the electrical connector A and the method of manufacturing the electrical connector A according to the tenth embodiment of the present invention in that, with the remaining structures and connection relationships being identical to those of the tenth embodiment: as shown in FIG. 31 and FIG. 61, in the step M1 (corresponding to the step 1 and the step 3 of claim 1): firstly, forming the terminals a', the strip and a plurality of ground contacts G by punching and cutting. The structure and connecting relationship of each terminal a' are completely identical to the structure and connecting relationship of the terminal a' according to the tenth embodiment. That is, the elastic arm 2 and the floating contact portion 3 of each terminal a' are separate from each other, and the deformation arm 4 and the conducting portion 5 of each terminal a' are separate from each other (and in other embodiments, it is possible that in the step 1, the elastic arm 2 and the floating contact portion 3 of each terminal a' are connected through the first sub strip 5', and the deformation arm 4 and the conducting portion 5 of each terminal a 'are connected through the second sub strip 6'). The terminals a' and the ground contacts G are respectively connected to a base strip 1', an extending section 2', and a connecting section 3'.

As shown in FIG. 61, the structure of each ground contact G is different from the structure of the terminal a' according to the tenth embodiment. Each ground contact G has a grounding fixing portion 1", a grounding elastic arm 2", a movable contact portion 3", a grounding deformation arm 4" and a grounding conducting portion 5". That is, the grounding elastic arm 2" of each ground contact G and the movable contact portion 3" of each ground contact G are connected to each other, and the grounding deformation arm 4" of each ground contact G and the grounding conducting portion 5" of each ground contact G are connected to each other.

As shown in FIG. 32, in the step M2 (corresponding to the step 2 of claim 1), insert-molding the plastic block c' simultaneously when insert-molding the insulating block b', such that the insulating block b' connects the elastic arm 2 and the floating contact portion 3 of each terminal a', and the plastic block c' connects the deformation arm 4 and the conducting portion 5 of each terminal a'.

Figure 62:
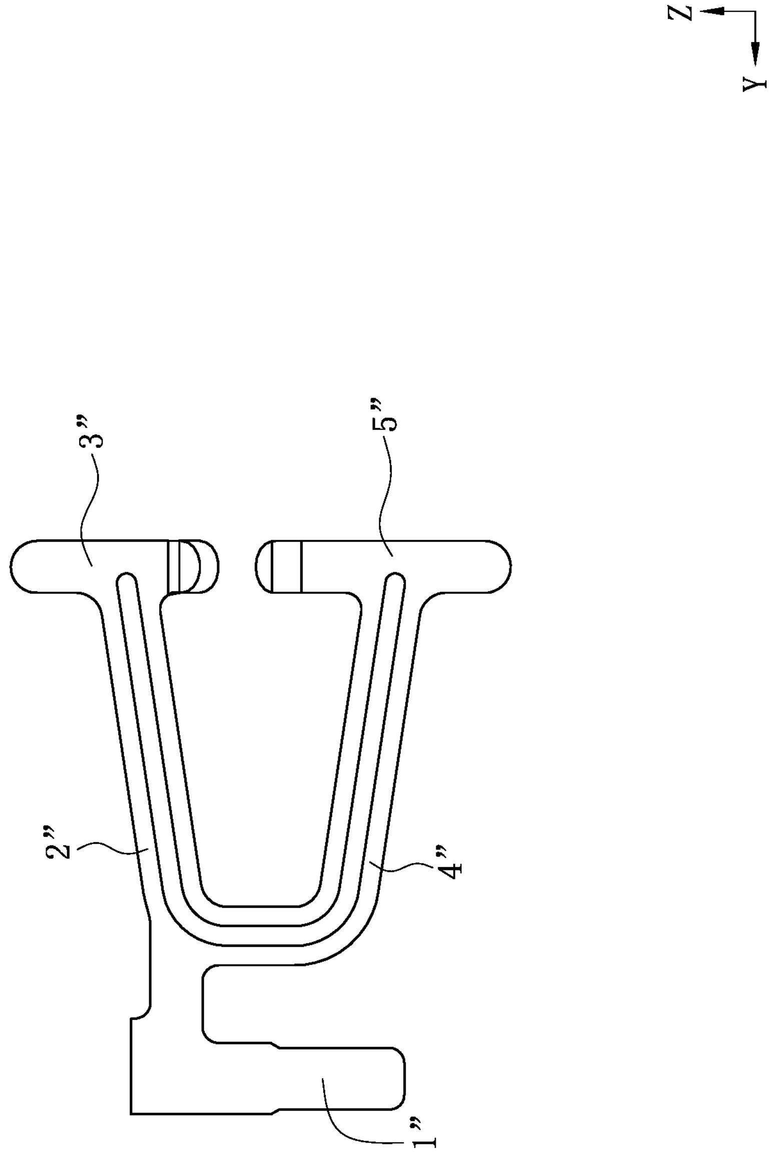
FIG. 62 is a schematic view of the ground contact of the electrical connector and the method of manufacturing the same according to the seventeenth embodiment of the present invention.

As shown in FIG. 33 and FIG. 62, in the step M3 (corresponding to the step 4 of claim 1), the base strip 1', the extending section 2' and the connecting section 3' connected to the terminals a' and the ground contacts G are cut, such that each of the terminals a' and the ground contacts G is not connected to any strip.

Figure 63:
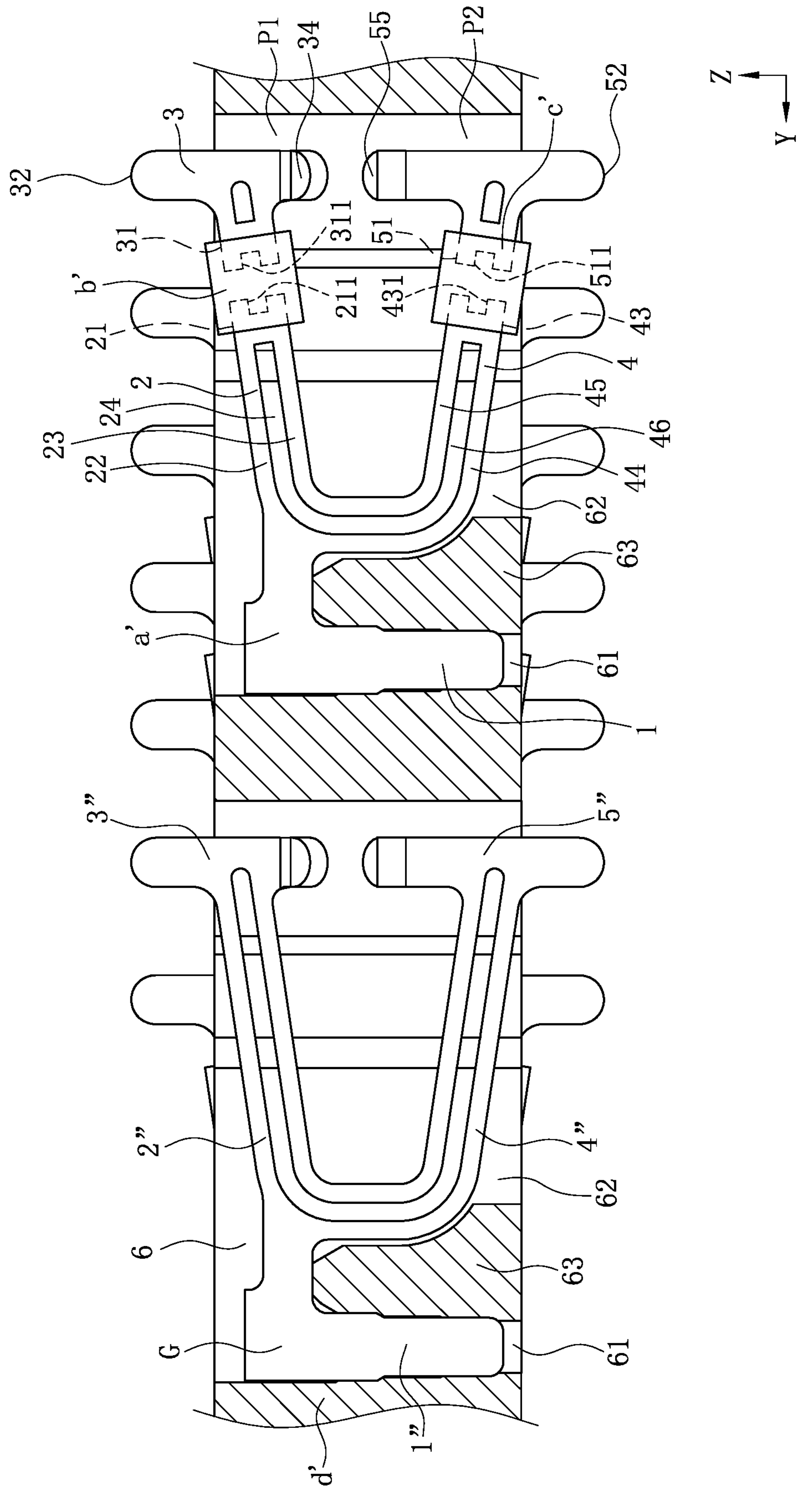
FIG. 63 is a sectional view of the terminal and the ground contact being installed in the accommodating slot of the electrical connector and the method of manufacturing the same according to the seventeenth embodiment of the present invention.

As shown in FIG. 63, in the step 5, the terminals a' and the ground contacts G are inserted into the accommodating slots 6 of the insulating body d', such that the terminals a' and the ground contacts G are provided to be adjacent to each other. Specifically, each of a left side and a right side of a terminal a' is provided with a ground contact G, and each of a front side and a rear side of the terminal a' is also provided with a ground contact G (and in other embodiments, it is possible that each of the left side and the right side of a terminal a' is provided with a ground contact G, and there is no ground contact G at each of the front side and the rear side of the terminal a'; or that there is no ground contact G at each of the left side and the right side of the terminal a', and each of the front side and the rear side of the terminal a' is provided with a ground contact G).

As shown in FIG. 64, when manufacturing of the electrical connector A is complete and the electrical connector A is mated with the first electronic component B and the second electronic component C, the floating contact portion 3 of each terminal a' abuts a signal contact point of the second electronic component C through the upper contact portion 32, and the conducting portion 5 of each terminal a' abuts a signal contact point of the first electronic component B through the lower contact portion 52, such that the signals of the first electronic component B and the signals of the second electronic component C may be transmitted through the floating contact portion 3 and the conducting portion 5 of each terminal a'. The movable contact portion 3" of each ground contact G abuts a grounding pad of the second electronic component C, and the movable contact portion 3" may directly transmit the grounding signals of the second electronic component C to the grounding elastic arm 2" and the grounding conducting portion 5". The grounding conducting portion 5" of each ground contact G abuts a grounding pad of the first electronic component B, and the grounding conducting portion 5" may directly transmit the grounding signals of the first electronic component B to the grounding deformation arm 4" and the movable contact portion 3". Thus, the grounding signals of the first electronic component B and the grounding signals of the second electronic component C may be transmitted through the movable contact portion 3", the grounding elastic arm 2", the grounding conducting portion 5" and the grounding deformation arm 4" of the ground contact G. Further, each of the front and rear sides and each of the left and right sides of one terminal a' is provided with a ground contact G. Thus, the ground contacts G may shield the signal interference between two adjacent terminals a', such that the electrical connector A has good high frequency characteristics.

In sum, the electrical connector A and the method of manufacturing the electrical connector A according to certain embodiments of the present invention have the following beneficial effects:

(1) The elastic arm 2 and the floating contact portion 3 are provided at an interval, and one end of the elastic arm 2 is connected with the floating contact portion 3 through the insulating block b'. Thus, the signals of the first electronic component B and the signals the second electronic component C are not transmitted to the elastic arm 2, further preventing the signals from being transmitted to the elastic arm 2 and diffusing to the surrounding to interfere with signals of the adjacent terminals a', such that the electrical connector A has good high frequency characteristics. Further, when the terminal a' is mated with the first electronic component B and the second electronic component C, the elastic arm 2 provides an elastic force such that the floating contact portion 3 moves downward, and the floating contact portion 3 and the conducting portion 5 are directly electrically connected. Thus, the signals of the first electronic component B and the signals the second electronic component C are transmitted only through the floating contact portion 3 and the conducting portion 5, without requiring the floating contact portion 3 and the conducting portion 5 to be mated with a third component, thus preventing from the case where the floating contact portion 3 and the third component are not in stable contact and the conducting portion 5 and the third component are not in stable contact, such that the electrical connector A has good high frequency characteristics.

(2) The conducting portion 5 and the elastic arm 2 are not electrically connected, thus preventing the conducting portion 5 from transmitting the signals of the first electronic component B and the signals the second electronic component C to the elastic arm 2 and causing crosstalk to the adjacent terminals a'. Further, when manufacturing of the electrical connector A is complete and the electrical connector A is mated with the first electronic component B and the second electronic component C, the conducting portion 5 is exposed downward out of the accommodating slot 6 to be soldered to the first electronic component B, such that the contact between the conducting portion 5 and the first electronic component B is more stable.

(3) In the step 5: the first gap P1 exists between one side of the floating contact portion 3 away from the elastic arm 2 and the inner wall surface of the accommodating slot 6, and the second gap P2 exists between one side of the conducting portion 5 away from the deformation arm 4 and the inner wall surface of the accommodating slot 6.

When the terminal a' is mated with the first electronic component B and the second electronic component C, the floating contact portion 4 deflects along the clockwise direction and protrudes into the first gap P1, and the conducting portion 6 deflects along the counter-clockwise direction and protrudes into the second gap P2. Thus, the first gap P1 may be reserved for the floating contact portion 3, and the second gap P2 may be reserved for the conducting portion 5. The floating contact portion 3 deflects along the clockwise direction, which may scratch the particles on the second electronic component C, such that the contact between the floating contact portion 3 and the second electronic component C is more stable. The conducting portion 5 deflects along the counter-clockwise direction, which may scratch the particles on the first electronic component B, such that the contact between the conducting portion 5 and the first electronic component B is more stable.

(4) The first contact surface 33 is located between the insulating block b' and the second contact surface 54, thus preventing the floating contact portion 3 and the conducting portion 5 from being in contact with the elastic arm 2 when being pressed, and further preventing the signals of the first electronic component B and the signals the second electronic component C from being transmitted to the elastic arm 2 and causing crosstalk to the adjacent terminals a'.

(5) In the step 1, the base strip 1' and the fixing portion 1 are connected to each other, the extending section 2' and the floating contact portion 3 are connected to each other, and the connecting section 3' and the conducting portion 5 are connected to each other. Any two of the elastic arm 2, the floating contact portion 3 and the conducting portion 5 are separate from each other. Thus, the elastic arm 2, the floating contact portion 3 and the conducting portion 5 may be better positioned, such that the insulating block b' may be insert-molded accurately between the elastic arm 2 and the floating contact portion 3, and there is no need to perform second cutting to the terminal a', thus simplifying the manufacturing process.

(6) In the step 1, the elastic arm 2 is connected to the floating contact portion 3 through the first sub strip 5', and the deformation arm 4 is connected to the conducting portion 5 through the second sub strip 6'. In the step 3, the first sub strip 5' is cut, such that the elastic arm 2 and the floating contact portion 3 are separate from each other, and the second sub strip 6' is cut, such that the deformation arm 4 and the conducting portion 5 are separate from each other. Thus, the first sub strip 5' may stably position the elastic arm 2 and the floating contact portion 3 without interfering with the forming of the insulating block b', and the second sub strip 6' may stably position the deformation arm 4 and the conducting portion 5 without interfering with the forming of the plastic block c'.

(7) The conducting portion 5 and the floating contact portion 3 are integrally provided, and the first connecting portion 7 and the second connecting portion 8 are provided to form an angle therebetween, thus providing elastic forces to the floating contact portion 3 and the conducting portion 5, such that the floating contact portion 3 and the conducting portion 5 may move.

(8) In the step 2, the insulating block b' is provided with a first hollow hole b1' running through the insulating block b', and the first bridging portion 26 and the second bridging portion 48 are exposed in the first hollow hole b1'. The plastic block c' is provided with a second hollow hole c1' running through the insulating block b', and the third bridging portion 27 and the fourth bridging portion 49 are exposed in the second hollow hole c1'. In the step 3, the first bridging portion 26 and the second bridging portion 48 are cut, such that the elastic arm 2 and the floating contact portion 3 are separate from each other, and the deformation arm 4 and the floating contact portion 3 are separate from each other; and the third bridging portion 27 and the fourth bridging portion 49 are cut, such that the elastic arm 2 and the conducting portion 5 are separate from each other, and the deformation arm 4 and the conducting portion 5 are separate from each other. Thus, the first bridging portion 26, the second bridging portion 48, the third bridging portion 27 and the fourth bridging portion 49 allow the elastic arm 2, the floating contact portion 3, the deformation arm 4 and the conducting portion 5 to be stably positioned, which is convenient for forming the insulating block b' and the plastic block c'. Further, the first hollow hole b1' and the second hollow hole c1' allow cutting of the first bridging portion 26, the second bridging portion 48, the third bridging portion 27 and the fourth bridging portion 49.

(9) The first upper strip D1 has the upper vertical strip D11 and the upper horizontal strip D12 connected to the upper vertical strip D11. The upper vertical strip D11 is connected to the elastic arm 2, and the upper horizontal strip D12 is connected to the floating contact portion 3. The second lower strip D4 has the lower vertical strip D41 and the lower horizontal strip D42 being connected to the lower vertical strip D41. The lower vertical strip D41 is connected to the deformation arm 4, and the lower horizontal strip D42 is connected to the conducting portion 5. Thus, the elastic arm 2, the floating contact portion 3, the deformation arm 4 and the conducting portion 5 may be accurately positioned through the first upper strip D1 and the second lower strip D4, which is convenient for forming the insulating block b' and the plastic block c'.

(10) When the terminal a' is mated with the first electronic component B and the second electronic component C, the fixing portion 1 and the first electronic component B are electrically connected, and the abutting arm 9 and the second electronic component C are electrically connected, such that the grounding signals of the first electronic component B and the grounding signals of the second electronic component C may be transmitted through the abutting arm 9 and the fixing portion 1.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method of manufacturing an electrical connector, the electrical connector being configured to electrically connect a first electronic component to a second electronic component, the method comprising:

step 1: providing at least one terminal and a strip, wherein the strip is connected to the terminal, and the terminal is provided with an elastic arm, a floating contact portion and a conducting portion;

step 2: after the step 1, insert-molding at least one insulating block, such that the insulating block connects the elastic arm and the floating contact portion;

step 3: after the step 1, separating the elastic arm and the floating contact portion;

step 4: after the step 2 and the step 3, further cutting the strip, such that the terminal is separated from the strip; and step 5: after the step 2 and the step 3, providing an insulating body, wherein the insulating body is formed with at least one accommodating slot running vertically through the insulating body, and inserting the terminal into the accommodating slot;

wherein when manufacturing of the electrical connector is complete and the electrical connector is mated with the first electronic component and the second electronic component, the conducting portion is conductively connected to the first electronic component, the floating contact portion is electrically connected to the second electronic component, the elastic arm provides an elastic force such that the floating contact portion moves downward, and the floating contact portion and the conducting portion are directly electrically connected.

2. The method according to claim 1, wherein in the step 1, the floating contact portion has two clamping portions; and when manufacturing of the electrical connector is complete and the electrical connector is mated with the first electronic component and the second electronic component, the conducting portion is located between the two clamping portions, and the conducting portion is respectively in contact with the two clamping portion.

3. The method according to claim 1, wherein in the step 5, a first gap is formed between one side of the floating contact portion away from the elastic arm and an inner wall of the accommodating slot, and a second gap is formed between one side of the conducting portion away from the elastic arm and the inner wall of the accommodating slot; and when manufacturing of the electrical connector is complete and the electrical connector is mated with the first electronic component and the second electronic component, the floating contact portion deflects along a clockwise direction and enters the first gap, and the conducting portion deflects along a counterclockwise direction and enters the second gap.

4. The method according to claim 1, wherein:

in the step 1, one side of the floating contact portion away from the elastic arm is cut to form a first contact surface, the conducting portion is cut to form a second contact surface corresponding to the first contact surface;

in the step 2, along the vertical direction, a lower end of the floating contact portion does not pass downward beyond the insulating block, and the first contact surface is located between the insulating block and the second contact surface; and when manufacturing of the electrical connector is complete and the electrical connector is mated with the first electronic component and the second electronic component, the first contact surface is in contact with the second contact surface.

5. The method according to claim 1, wherein in the step 1, the strip comprises a base strip, an extending section and a connecting section, the terminal has a fixing portion, the fixing portion is connected to the elastic arm, the base strip is connected to the fixing portion, the extending section is connected to the floating contact portion, the connecting section is connected to the conducting portion, and any two of the elastic arm, the floating contact portion and the conducting portion are separate from each other; and in the step 4, the base strip, the extending section and the connecting section are cut.

6. The method according to claim 1, wherein:

in the step 1, the terminal is cut to form a deformation arm;

in the step 2, a plastic block is insert-molded, such that the plastic block connects the deformation arm and the conducting portion;

in the step 3, the conducting portion and the deformation arm are separate from each other; and when manufacturing of the electrical connector is complete and the electrical connector is mated with the first electronic component and the second electronic component, the deformation arm provides an elastic force such that the conducting portion moves upward.

7. The method according to claim 6, wherein:

in the step 1, the strip comprises an extending section, a connecting section, a first sub strip and a second sub strip, the extending section is connected to the floating contact portion, the connecting section is connected to the conducting portion, the elastic arm is connected to the floating contact portion through the first sub strip, and the deformation arm is connected to the conducting portion through the second sub strip;

in the step 3, the first sub strip is cut such that the elastic arm and the floating contact portion are separate from each other, and the second sub strip is cut such that the deformation arm and the conducting portion are separate from each other; and in the step 4, the extending section and the connecting section are cut.

8. The method according to claim 6, wherein:

in the step 1, the strip comprises a base strip, a first sub strip and a second sub strip, the terminal has a fixing portion, the fixing portion is connected to the elastic arm, the base strip is connected to the fixing portion, the elastic arm is connected to the floating contact portion through the first sub strip, and the deformation arm is connected to the conducting portion through the second sub strip;

in the step 3, the first sub strip is cut such that the elastic arm and the floating contact portion are separate from each other, and the second sub strip is cut such that the deformation arm and the conducting portion are separate from each other; and in the step 4, the base strip is cut.

9. The method according to claim 1, wherein the terminal is provided with a fixing portion and the floating contact portion and the conducting portion integrally connected, the fixing portion is located at one end of the elastic arm away from the floating contact portion and is connected to the elastic arm, the terminal is further provided with a first connecting portion and a second connecting portion, the second connecting portion is located below the first connecting portion and is connected to a lower end of the first connecting portion, an upper end of the first connecting portion is connected to a lower end of the floating contact portion, a lower end of the second connecting portion is connected to the conducting portion, and the first connecting portion and the second connecting portion are provided to form an angle therebetween; and when manufacturing of the electrical connector is complete and the electrical connector is mated with the first electronic component and the second electronic component, the first connecting portion and the second connecting portion forming the angle therebetween provide elastic forces, such that the floating contact portion moves downward and the conducting portion moves upward.

10. The method according to claim 9, wherein in the step 1, the strip comprises at least one base strip, a first main strip and a second main strip, one end of the base strip is connected to the fixing portion, the first main strip is connected to the first connecting portion, and the second main strip is connected to the second connected portion; and in the step 4, the base strip, the first main strip and the second main strip are cut.

11. The method according to claim 1, wherein in the step 1, the terminal is provided with a deformation arm, a first bridging portion and a second bridging portion, the floating contact portion is located between the elastic arm and the deformation arm, an upper end of the elastic arm is connected to the floating contact portion through the first bridging portion, and an upper end of the deformation arm is connected to the floating contact portion through the second bridging portion.

12. The method according to claim 11, wherein in the step 2, the insulating block is insert-molded, such that the upper end of the elastic arm and the upper end of the deformation arm are embedded in the insulating block, the insulating block is provided with a first hollow hole running through the insulating block, and the first bridging portion and the second bridging portion are exposed in the first hollow hole; and in the step 3, the first bridging portion and the second bridging portion are cut, such that the elastic arm and the floating contact portion are separate from each other, and the deformation arm and the floating contact portion are separate from each other.

13. The method according to claim 11, wherein in the step 1, the terminal is cut to form the deformation arm, a third bridging portion and a fourth bridging portion, the conducting portion is located between the elastic arm and the deformation arm, a lower end of the elastic arm is connected to the conducting portion through the third bridging portion, and a lower end of the deformation arm is connected to the conducting portion through the fourth bridging portion.

14. The method according to claim 13, wherein in the step 2, the insulating block and a plastic block are insert-molded, such that the insulating block is provided with a first hollow hole running through the insulating block, one end of the plastic block is connected to the lower end of the elastic arm, the conducting portion is partially embedded in the plastic block, another end of the plastic block is connected to the lower end of the deformation arm, the plastic block is provided with a second hollow hole running through the plastic block, and the third bridging portion and the fourth bridging portion are exposed in the second hollow hole; and in the step 3, the third bridging portion and the fourth bridging portion are cut, such that the elastic arm and the conducting portion are separate from each other, and the deformation arm and the conducting portion are separate from each other.

15. The method according to claim 1, wherein in the step 1, the strip comprises an extending portion, and the extending portion is connected to the elastic arm; and in the step 4, the extending portion is cut.

16. The method according to claim 1, wherein in the step 1, the terminal is cut to form a deformation arm, the floating contact portion is located above the conducting portion, the floating contact portion is located between the elastic arm and the deformation arm, the floating contact portion and the elastic arm are separate from each other, the floating contact portion and the deformation arm are separate from each other, the conducting portion is located between the elastic arm and the deformation arm, the conducting portion and the elastic arm are separate from each other, and the conducting portion and the deformation arm are separate from each other.

17. The method according to claim 16, wherein in the step 1, the strip comprises a first upper strip and a second upper strip, the first upper strip is located above the elastic arm, the first upper strip has an upper vertical strip and an upper horizontal strip connected to the upper vertical strip, the upper vertical strip is connected to the elastic arm, the upper horizontal strip is connected to the floating contact portion, and the second upper strip is located above the deformation arm and is connected to the deformation arm; and in the step 4, the first upper strip and the second upper strip are cut.

18. The method according to claim 16, wherein in the step 1, the strip comprises a first lower strip and a second lower strip, the first lower strip is located below the elastic arm and is connected to the elastic arm, the second lower strip is located below the deformation arm, the second lower strip has a lower vertical strip and a lower horizontal strip connected to the lower vertical strip, the lower vertical strip is connected to the deformation arm, and the lower horizontal strip is connected to the conducting portion; and in the step 4, the first lower strip and the second lower strip are cut.

19. The method according to claim 16, wherein in the step 2, the insulating block is insert-molded, such that an upper end of the deformation arm is embedded in the insulating block; and a plastic block is insert-molded simultaneously, such that one end of the plastic block is connected to the elastic arm, the conducting portion is partially embedded in the plastic block, and another end of the plastic block is connected to the deformation arm.

20. The method according to claim 1, wherein in the step 1, the terminal is provided with a fixing portion and an abutting arm, one end of the abutting arm adjacent to the fixing portion is connected to the fixing portion; and when manufacturing of the electrical connector is complete and the electrical connector is mated with the first electronic component and the second electronic component, the fixing portion is upward exposed to the accommodating slot to be electrically connected to the first electronic component, and the abutting arm is downward exposed to the accommodating slot to be electrically connected to the second electronic component.

* * * * *